United States Patent
Rope et al.

(10) Patent No.: US 12,500,668 B1
(45) Date of Patent: Dec. 16, 2025

(54) SETUP AND TRAINING OF LINKS BETWEEN HOST DEVICES AND OPTICAL MODULES INCLUDING MENU-BASED AND MULTI-STAGE LINK TRAINING

(71) Applicant: MARVELL ASIA PTE LTD, Singapore (SG)

(72) Inventors: Todd Rope, Thousand Oaks, CA (US); Ali Ghiasi, Cupertino, CA (US); Whay Sing Lee, Milpitas, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 312 days.

(21) Appl. No.: 18/217,252

(22) Filed: Jun. 30, 2023

Related U.S. Application Data

(60) Provisional application No. 63/357,712, filed on Jul. 1, 2022.

(51) Int. Cl.
*H04B 10/079* (2013.01)
*H04B 10/54* (2013.01)

(52) U.S. Cl.
CPC ....... *H04B 10/0799* (2013.01); *H04B 10/541* (2013.01)

(58) Field of Classification Search
None
See application file for complete search history.

(56) References Cited

U.S. PATENT DOCUMENTS 9,634,760 B1 * 4/2017 Rope ................ H04B 10/07955
10,747,688 B2 * 8/2020 Jen ...................... G06F 13/4022
12,009,951 B2 * 6/2024 Rope ................ H04B 10/07953
2004/0126107 A1 7/2004 Jay et al.
2010/0124418 A1 * 5/2010 Noble ................ H04B 10/0779
398/9

(Continued)

FOREIGN PATENT DOCUMENTS

KR 20200012945 A 2/2020

OTHER PUBLICATIONS

International Preliminary Report on Patentability issued in corresponding International PCT Patent Application PCT/US2021/041807 dated Jan. 24, 2023.
IA Title: Common Electrical I/O (CEI)—Electrical and Jitter Interoperability agreements for 6G+ bps, 11G+ bps, 25G+ bps, 56G+ bps and 112G+ bps I/O, OIF Implementation Agreement OIF-CEI-05.0, Common Electrical I/O (CEI) dated May 5, 2022.

(Continued)

*Primary Examiner* — Jai M Lee

(57) ABSTRACT

A host device includes a transmitter, an out-of-band electrical interface and a processor. The transmitter transmits in-band signals on an in-band electrical interface from the host device to an optical module. The in-band signals are data signals transmitted to test a link between the host device and the optical module. The out-of-band electrical interface transmits first out-of-band messages from the host device to the optical module, and receives second out-of-band messages from the optical module. The first and second out-of-band messages being control messages for testing the link. The processor performs tests to test the link and selects a set of transmitter settings based on the tests. The processor: i) subsequent to performing the tests, receives via the out-of-band electrical interface one of the second out-of-band messages including an indication of the selected set; and ii) in response to receiving the indication, sets the transmitter according to the selected set.

44 Claims, 24 Drawing Sheets

(56) References Cited

U.S. PATENT DOCUMENTS

| | | |
|---|---|---|
| 2012/0008938 A1 | 1/2012 | Tang et al. |
| 2013/0071119 A1 | 3/2013 | Liu et al. |
| 2013/0163989 A1 | 6/2013 | Wu et al. |
| 2013/0236138 A1 | 9/2013 | Yamamoto |
| 2016/0191275 A1 | 6/2016 | Lyubomirsky et al. |
| 2016/0373186 A1 | 12/2016 | Alshinnawi et al. |
| 2018/0083964 A1 | 3/2018 | Guo et al. |
| 2018/0113828 A1 | 4/2018 | Ellis et al. |
| 2019/0044763 A1 | 2/2019 | Shah et al. |
| 2019/0319741 A1* | 10/2019 | Smith .................. H04L 1/0065 |
| 2020/0076651 A1 | 3/2020 | Sun et al. |
| 2020/0228229 A1 | 7/2020 | Farjadrad et al. |
| 2020/0259936 A1* | 8/2020 | Lusted ................ H04L 49/3054 |
| 2020/0412586 A1 | 12/2020 | McLoughlin |
| 2021/0006330 A1 | 1/2021 | Mcloughlin |
| 2022/0029865 A1 | 1/2022 | Rope et al. |
| 2022/0191124 A1 | 6/2022 | Degrace et al. |
| 2024/0039689 A1 | 2/2024 | Meltser et al. |

OTHER PUBLICATIONS

IEEE P802.3ck™/D3.3, Draft Standard for Ethernet Amendment 4: Physical Layer Specifications and Management Parameters for 100 Gb/s, 200 Gb/s, and 400 Gb/s Electrical Interfaces Based on 100 Gb/s Signaling, prepared by the LAN/MAN Standards Committee of the IEEE Computer Society, dated Jun. 10, 2022.

Supplementary European Search Report issued in corresponding European Patent Application 21846554.0 dated Nov. 16, 2023.

Ali Ghiasi et al., "Link Training for AUI Based on OB Signaling," IEEE 802.3df Task Force, Montreal, Jul. 13, 2022.

Adee Ran et al., "AUI link training," P802.3df Electrical ad hoc, Jun. 17, 2022.

International Search Report and Written Opinion issued in related PCT Application PCT/US2023/031613 dated Dec. 12, 2023.

U.S. Appl. No. 18/239,819, filed Aug. 30, 2023, Lee et al.

U.S. Appl. No. 17/186,897, filed Feb. 26, 2021, Rope et al.

U.S. Appl. No. 17/186,897, filed Feb. 26, 2021, Todd Rope.

* cited by examiner

SETUP AND TRAINING OF LINKS BETWEEN HOST DEVICES AND OPTICAL MODULES INCLUDING MENU-BASED AND MULTI-STAGE LINK TRAINING

CROSS-REFERENCE TO RELATED APPLICATIONS

This application claims the benefit of U.S. Provisional Application No. 63/357,712, filed on Jul. 1, 2022. The entire disclosure of the application referenced above is incorporated herein by reference.

FIELD

The present disclosure relates to optical modules, and more particularly, to electrical interfaces and corresponding communication between host devices and optical modules on host printed circuit boards (PCBs).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Host PCBs, such as packet optical transport platforms (P-OTPs), can include host devices and optical modules. As an example, a host PCB can include one or more host devices and corresponding optical modules. Each of the optical modules of the first host device communicates with an optical module of one or more remotely located host devices of one or more other host PCBs. Communication between the optical modules is over corresponding optical links (or optical channels) via optical media, such as fiber optic cables. The host device(s) and optical module(s) of a single host PCB are referred to as local devices that communicate with each other using short range electrical interfaces.

SUMMARY

A host device is disclosed and includes a transmitter, an out-of-band electrical interface and a processor. The transmitter is configured to transmit in-band signals on an in-band electrical interface from the host device to an optical module. The in-band signals are data signals transmitted to test a link between the host device and the optical module. The out-of-band electrical interface is configured to transmit first out-of-band messages from the host device to the optical module, and receive second out-of-band messages from the optical module. The first out-of-band messages and the second out-of-band messages being control messages for testing the link. The processor is configured to perform tests to test the link and to select a set of transmitter settings for the transmitter from among finite plurality of sets of transmitter settings based on a result of the of the tests. Each of the finite plurality of sets of transmitter settings includes respective values for corresponding different transmitter parameters. Each of the tests includes the processor: a) setting the transmitter according to a respective one of the finite plurality of sets of transmitter settings; b) transmitting via the out-of-band electrical interface a respective one of the first out-of-band messages to the optical module to tune the optical module for reception of a respective one of the in-band signals on the in-band electrical interface; and c) transmitting the respective one of the in-band signals via the transmitter to the optical module, the respective one of the first out-of-band messages including an indication of the respective one of the finite plurality of sets of transmitter settings to test for a current one of the tests. The processor is further configured to: i) subsequent to performing the tests, receive via the out-of-band electrical interface one of the second out-of-band messages including an indication of the selected set of transmitter settings; and ii) in response to receiving the indication of the selected set of transmitter settings, set the transmitter according to the selected set of transmitter settings. The indication of the selected set of transmitter settings includes at least one of an index value, a preset, and the selected set of transmitter settings.

In other features, the processor is configured to test each of the finite plurality of sets of transmitter settings to determine which set of transmitter settings results in a signal integrity value that is greater than signal integrity values exhibited by the other ones of the finite plurality of sets of transmitter settings, each of the signal integrity values being indicative of at least one of signal amplitude, a signal-to-noise ratio, and a bit error rate.

In other features, the processor is configured to, for each current one of the tests, transmit via the out-of-band electrical interface a respective one of the first out-of-band messages including at least one of i) an index value indicative of a respective one of the finite plurality of sets of transmitter settings to test for the current one of the tests, and ii) the respective one of the finite plurality of sets of transmitter settings to test for the current one of the tests.

In other features, the processor is configured to receive via the out-of-band electrical interface one of the index values as the indication of the selected set of transmitter settings. In other features, the one of the index values is a testing iteration number indicating a number of the one of the tests associated with the selected set of transmitter settings.

In other features, the processor is configured, for each of the tests, to test a respective set of filter parameter values of the transmitter. In other features, the transmitter includes a finite impulse response filter. The processor is configured, for at least one of the tests, to test respective pre-cursor values and post cursor values of corresponding taps of the finite impulse response filter.

In other features, the processor is configured, for at least one of the tests, to test one or more amplitudes of the transmitter for transmission of a respective one of the in-band signals. In other features, the processor is configured, for at least one of the tests, to test filter parameters of the transmitter for transmission of a respective one of the in-band signals. In other features, the processor is configured, for at least one of the tests, to test a predetermined set of parameters of the transmitter or a custom programmed set of parameters of the transmitter.

In other features, the processor is configured, for each respective one of the tests, to transmit via the transmitter a respective one of the first out-of-band messages from the host device to the optical module. The respective one of the first out-of-band messages includes an index value identifying the set of transmitter settings of the transmitter for the respective one of the tests being performed.

In other features, the processor is configured, for each respective one of the tests, to transmit via the transmitter a respective one of the first out-of-band messages from the host device to the optical module. The respective one of the first out-of-band messages includes the set of transmitter settings of the transmitter for the respective one of the tests being performed.

In other features, the processor is configured i) for each respective one of the tests, to transmit via the out-of-band electrical interface a respective index value from the host device to the optical module identifying the respective one of the tests, ii) to receive via the out-of-band electrical interface and at completion of the tests, the one of the index values identifying the selected set of transmitter settings of the transmitter, and iii) in response to receiving the one of the index values, to adjust one or more parameters of the transmitter according to one or more setting values corresponding to the one of the index values.

In other features, the processor is configured to i) transmit from the host device to the optical module and via the out-of-band electrical interface a total number of sets of transmitter settings to be tested, and, prior to each of the tests, an index value for a next one of the tests to be performed, ii) at completion of testing the total number of sets of transmitter settings, to receive via the out-of-band electrical interface one of the index values for the selected set of transmitter settings, and iii) in response to receiving the one of the index values for the selected set of transmitter settings, to adjust one or more parameters of the transmitter according to one or more setting values associated with the one of the index values.

In other features, the processor is configured to i) transmit from the host device to the optical module and via the out-of-band electrical interface a total number of sets of transmitter settings to be tested, and, prior to each of the tests, a testing iteration number for a next one of the tests to be performed, ii) at completion of testing the total number of sets of transmitter settings, to receive via the out-of-band electrical interface the testing iteration number indicative of the one of the tests associated with testing the selected set of transmitter settings, and iii) in response to receiving the testing iteration number, to adjust one or more parameters of the transmitter according to one or more setting values associated with the selected set of transmitter settings.

In other features, the host device further includes a transceiver, separate from the transmitter, and configured to transmit and receive other in-band signals via another in-band electrical interface from another device cascaded with the host device. The out-of-band electrical interface is configured to send and receive out-of-band messages over an out-of-band link between the host device and the another device to train the another in-band electrical interface.

In other features, the transceiver is configured to perform clock data recovery to detect a frequency of a clock signal embedded in one of the other in-band signals, and to synchronize a clock of the transceiver to the frequency of the clock signal.

In other features, a communication system is disclosed and includes: the host device; and another device cascaded with the host device and including a first transceiver and a second transceiver, the first transceiver configured to receive a first in-band data signal via another link. The first in-band data signal includes data and an embedded clock signal. The second transceiver is configured to synchronize with the embedded clock signal and transmit a second in-band data signal to the host device via the link being tested. The second in-band data signal includes the data and the embedded clock signal. The another device is configured to perform link training for the another link with the host device via the out-of-band electrical interface or another out-of-band electrical interface.

In other features, a communication system is disclosed and includes: the host device; and another device cascaded with the host device and including a first transceiver and a second transceiver, The first transceiver is configured to receive a first in-band data signal via the in-band electrical interface. The first in-band data signal includes data and an embedded clock signal. The second transceiver is configured to synchronize with the embedded clock signal and transmit a second in-band data signal via another in-band electrical interface. The second in-band data signal includes the data and the embedded clock signal. The another device is configured to perform link training for the another in-band electrical interface with the host device via the out-of-band electrical interface or another out-of-band electrical interface.

In other features, a communication system is disclosed and includes: the host device; and the optical module transmitting data received from the host device via the in-band electrical interface to another optical module via an optical interface.

In other features, an optical module is disclosed and includes an out-of-band interface, a receiver and a processor. The out-of-band interface is configured to receive first out-of-band messages on an out-of-band electrical interface transmitted from a host device to the optical module, and transmit second out-of-band messages from the optical module to the host device on the out-of-band electrical interface, the first out-of-band messages and the second out-of-band messages being control messages for testing a link between the host device and the optical module. The receiver is configured to receive in-band signals on an in-band electrical interface transmitted from the host device to the optical module, the in-band signals being data signals transmitted to test the link. The processor is configured to perform tests to test the link and to select a set of transmitter settings for a transmitter of the host device from among a finite plurality of sets of transmitter settings based on a result of the tests. Each of the finite plurality of sets of transmitter settings includes values respectively for different transmitter parameters. Each of the tests includes the processor: a) receiving, via the receiver and on the out-of-band electrical interface, a respective one of the first out-of-band messages from the host device to tune the optical module for reception of a respective one of the in-band signals on the in-band electrical interface; and b) receiving the respective one of the in-band signals via the receiver from the host device, the respective one of the first out-of-band messages including an indication of a respective one of the finite plurality of sets of transmitter settings of the host device to test for a current one of the tests. The processor is further configured to: i) determine the selected set of transmitter settings that provides a signal integrity value greater than other signal integrity values provided respectively by the other ones of the finite plurality of sets of transmitter settings; and ii) transmit via the out-of-band electrical interface one of the second out-of-band messages including an indication of the selected set of transmitter settings. The indication of the selected set of transmitter settings includes at least one of an index value, a preset, and the selected set of transmitter settings. Each of the signal integrity values is indicative of at least one of a signal amplitude, a signal-to-noise ratio, and a bit error rate.

In other features, the processor is configured to, for each current one of the tests, receive a respective one of the first out-of-band messages including at least one of a) an index value identifying a respective one of the finite plurality of sets of transmitter settings of the host device to test for a current one of the tests, and b) the respective one of the finite plurality of sets of transmitter settings of the host device to test for a current one of the tests.

In other features, the processor is configured to transmit via the out-of-band electrical interface the one of the index values of the one of the tests providing the signal integrity value greater than the other signal integrity values. In other features, the one of the index values is a testing iteration number indicating a number of the one of the tests providing the signal integrity value greater than the other signal integrity values.

In other features, the optical module further includes: a transmitter element configured to convert an electrical signal, received from the in-band electrical interface via the receiver, to an optical signal and to transmit the optical signal, the receiver of the optical module being tuned to the selected set of transmitter settings of the transmitter of the host device during reception of the electrical signal; and a receiver element configured to receive another optical signal and to convert the another optical signal to another electrical signal for transmission to the host device via the in-band electrical interface.

In other features, the processor is configured, for each respective one of the tests, to receive via the receiver a respective one of the first out-of-band messages from the host device. The respective one of the first out-of-band messages includes an index value identifying the transmitter setting of the transmitter for the respective one of the tests being performed.

In other features, the processor is configured, for each respective one of the tests, to receive via the receiver a respective one of the first out-of-band messages from the host device. The respective one of the first out-of-band messages includes the set of transmitter settings of the transmitter for the respective one of the tests being performed.

In other features, the processor is configured i) for each respective one of the tests, to receive a respective index value from the host device identifying the respective one of the tests, and ii) to transmit, at completion of the tests via the out-of-band interface. The one of the index values identifies the transmitter setting of the transmitter of the host device for the one of the tests providing the signal integrity value greater than the other signal integrity values.

In other features, the processor is configured to i) receive from the host device and via the receiver a total number of sets of transmitter settings of the host device to be tested, and, prior to each of the tests, an index value for a next one of the tests to be performed, and ii) at completion of testing the total number of sets of transmitter settings, to transmit via the out-of-band electrical interface the one of the index values for the selected set of transmitter settings.

In other features, the processor is configured to i) receive from the host device and via the receiver a total number of sets of transmitter settings of the host device to be tested, and, prior to each of the tests, a test iteration number for a next one of the tests to be performed, and ii) at completion of testing the total number of sets of transmitter settings, to transmit via the out-of-band electrical interface the testing iteration number indicative of the one of the tests associated with testing the selected set of transmitter settings.

In other features, a host device is disclosed and includes an out-of-band interface, a receiver and a processor. The out-of-band interface is configured to transmit out-of-band messages on an out-of-band electrical interface from the host device to an optical module. The out-of-band messages being control messages for testing a link between the host device and the optical module. The receiver is configured to receive in-band signals on an in-band electrical interface from the host device. The in-band signals are data signals transmitted to test the link. The processor is configured to perform tests to test the link and select a set of transmitter settings for a transmitter of the optical module from among a finite plurality of sets of transmitter settings based on results of the tests. Each of the finite plurality of sets of transmitter settings includes values respectively for different transmitter parameters. Each of the tests includes the processor: a) selecting a respective one of the finite plurality of sets of transmitter settings to test and transmitting, via the out-of-band electrical interface, a respective one of the out-of-band messages to the optical module to set the transmitter of the optical module for transmission of a respective one of the in-band signals on the in-band electrical interface, the respective one of the out-of-band messages including an indication identifying the respective one of the finite plurality of sets of transmitter settings for a current one of the tests; b) receiving via the receiver the one of the in-band signals; and c) determining a signal integrity value of the one of the in-band signals. The processor is further configured to: i) based on the signal integrity values of the tests, to determine the selected set of transmitter settings providing a signal integrity value greater than other signal integrity values provided respectively by the other ones of the finite plurality of sets of transmitter settings, each of the signal integrity values being indicative of at least one of a signal amplitude, a signal-to-noise ratio, and a bit error rate; and ii) signaling the optical module via the out-of-band electrical interface to set the transmitter of the optical module to the selected set of transmitter settings.

In other features, the processor is configured, for each current one of the tests, to transmit the respective one of the out-of-band messages including at least one of a) an index value identifying a respective one of the finite plurality of sets of transmitter settings to test for the current one of the tests, and b) the respective one of the finite plurality of sets of transmitter settings to test for the current one of the tests.

In other features, the processor is configured, for each of the tests, to tune the receiver to receive a respective one of the in-band signals, and determine the signal integrity value of the respective one of the in-band signals. In other features, the processor is configured, subsequent to determining the selected set of transmitter settings, to send one of the out-of-band messages to the optical module to set the transmitter of the optical module according to the selected set of transmitter settings.

In other features, an optical module is disclosed and includes an out-of-band electrical interface, a transmitter, and a processor. The out-of-band electrical interface is configured to receive out-of-band messages transmitted from a host device to the optical module. The out-of-band messages are control messages for testing a link between the host device and the optical module. The is transmitter configured to transmit in-band signals on an in-band electrical interface to the host device. The in-band signals are data signals transmitted to test the link. The processor is configured to perform tests to the link and select a set of transmitter settings from among a finite plurality of sets of transmitter settings for the transmitter based on results of the tests. Each of the finite plurality of sets of transmitter settings includes values respectively for different transmitter parameters. Each of the tests includes the processor: a) receiving, via the out-of-band electrical interface, one of the out-of-band messages from the host device to set the transmitter for transmission of one of the in-band signals on the in-band electrical interface, the one of the out-of-band messages including an indication of a respective one of the finite plurality of sets of transmitter settings to test for a current one of the tests; b) transmitting via the transmitter the one of the in-band signals; and c) determining a signal integrity value of the one of the in-band signals. The processor is further configured to: i) based on the signal integrity values of the tests, to determine the selected set of transmitter settings provides a signal integrity value greater than other signal integrity values provided respectively by the other ones of the sets of transmitter settings of the transmitter, each of the signal integrity values being indicative of at least one of a signal amplitude, a signal-to-noise ratio, and a bit error rate; and ii) setting the transmitter to the selected set of transmitter setting.

In other features, the processor is configured to, for each current one of the tests, receive a respective one of the out-of-band messages including at least one of a) an index value identifying a respective one of the finite plurality of sets of transmitter settings to test for the current one of the tests, and b) the respective one of the finite plurality of sets of transmitter settings to test for the current one of the tests.

In other features, the optical module further includes a transmitter and a receiver. The transmitter element is configured to convert an electrical signal, received from the in-band electrical interface via the receiver, to an optical signal and to transmit the optical signal. The receiver of the optical module is tuned to the selected set of transmitter settings of the transmitter of the host device during reception of the electrical signal. The receiver element is configured to receive another optical signal and to convert the another optical signal to another electrical signal for transmission to the host device via the in-band electrical interface.

In other features, the processor is configured, for each of the tests, to test a respective set of transmitter parameters of the transmitter. In other features, the processor is configured, for at least one of the tests, to test at least one of an amplitude and a filter parameter of the transmitter. In other features, the processor is configured, for at least one of the tests, to test at least one of a predetermined set of transmitter settings and a custom programmed set of transmitter settings.

In other features, the transmitter includes a finite impulse response filter. The processor is configured, for each of the tests, to test respective pre-cursor values and post cursor values of corresponding taps of the finite impulse response filter. In other features, the processor is configured, for each of the tests, to test one or more amplitudes of the transmitter.

In other features, the processor is configured, for each respective one of the tests, to receive via the out-of-band electrical interface a respective out-of-band message from the host device. The respective out-of-band message includes an index value identifying the set of transmitter settings of the transmitter of the optical module for the respective one of the tests being performed.

In other features, the processor is configured, for each respective one of the tests, to receive via the out-of-band electrical interface a respective out-of-band message from the host device. The respective out-of-band message includes the set of transmitter settings of the transmitter of the optical module for the respective one of the tests being performed.

In other features, a host device is disclosed and includes an out-of-band electrical interface, a first processor and a second processor. The out-of-band electrical interface is configured to transmit out-of-band messages from the host device to an optical module. The first processor includes a transceiver configured to receive in-band signals on an in-band electrical interface from a transmitter of the optical module. The first processor is configured to perform link training operations for the in-band electrical interface including setting and testing parameters of the transmitter of the optical module. The second processor is separate from the first processor and configured to invoke link training implemented by the first processor by transmitting the out-of-band messages to the optical module to set and test the parameters of the transmitter of the optical module.

In other features, the second processor is configured to i) to initially determine whether a first signal integrity value of a first one of the in-band signals is outside a target range, and ii) in response to the first signal integrity value being outside the target range, to invoke a multi-stage link training process including a high-level link training mode and a low-level link training mode. The high-level link training mode includes the first processor testing presets of parameters of the transmitter of the optical module. The low-level link training mode includes the first processor iteratively adjusting the parameters of the transmitter of the optical module.

In other features, the second processor is configured i) during a high-level link training mode, to invoke link training implemented by the first processor including testing presets of parameters of the transmitter of the optical module by transmitting first out-of-band messages to the optical module to set the transmitter of the optical module according to presets, ii) to determine whether one of the presets results in one of the in-band signals exhibiting a second signal integrity value in a target range, and iii) in response to none of the presets exhibiting a signal integrity value in the target range, to implement a low-level link training mode including invoking link training implemented by the first processor including iteratively adjusting the parameters of the transmitter of the optical module by sending second out-of-band messages to the optical module to test the adjusted parameters.

In other features, the second processor is configured to, for each of link training tests being performed, select a set of parameters for the transmitter of the optical module, and signal the optical module, via the out-of-band electrical interface, to jump values of the parameters of the transmitter of the optical module to the selected set of parameters.

In other features, the second processor is configured to, for each of link training tests being performed, select at least one of a predetermined set of transmitter parameters or a custom programmed set of transmitter parameters for the transmitter of the optical module, and signal the optical module, via the out-of-band electrical interface, to jump values of the parameters of the transmitter of the optical module to the selected at least one of a predetermined set of transmitter parameters or a custom programmed set of transmitter parameters.

In other features, the first processor is configured to determine intersymbol interference of one of the in-band signals, to determine whether the intersymbol interference is within a range that is able to be at least partially reduced by at least one precursor or post cursor of the transmitter of the optical module, and to signal the optical module, via the out-of-band electrical interface, to adjust the at least one precursor or post cursor to reduce the intersymbol interference.

In other features, the first processor is configured to determine intersymbol interference of one of the in-band signals, to determine which of the parameters of the transmitter of the optical module are able to reduce at least a portion of the intersymbol interference, and signal the optical module, via the out-of-band electrical interface, to adjust the parameters of the transmitter of the optical module which are able to reduce the at least a portion of the intersymbol interference.

In other features, the first processor is configured to, for each of link training tests being performed, adjust one or more of the parameters of the transmitter of the optical module by signaling, via the out-of-band electrical interface, the optical module to increment or decrement the one or more parameters. In other features, the first processor is configured to adjust, for each of link training tests being performed, one or more of the parameters of the transmitter of the optical module by signaling, via the out-of-band electrical interface, the optical module to adjust the one or more parameters by more than an incremental or decremental amount.

In other features, the first processor is configured to, via the out-of-band electrical interface, signal the optical module to test presets for the parameters of the transmitter of the optical module by sending a respective one of the in-band signals for each of the presets to the host device, to monitor a signal integrity value for each of the respective one of the in-band signals, and, in response to detecting that one of the signal integrity values is within a target range, to end link training. In other features, the first processor is configured to, via the out-of-band electrical interface, signal the optical module to adjust an amplitude of the transmitter of the optical module.

In other features, the host device further includes a transmitter, separate from the transceiver, and configured to transmit and receive other in-band signals via another in-band electrical interface from another device cascaded with the host device. The out-of-band electrical interface is configured to send and receive out-of-band messages over an out-of-band link between the host device and the another device to train the another in-band electrical interface.

In other features, the host device further includes another transceiver including the transmitter. The another transceiver is configured to perform clock data recovery to detect a frequency of a clock signal embedded in one of the other in-band signals, and to synchronize a clock of the another transceiver to the frequency of the clock signal.

In other features, a communication system is disclosed and includes: the host device; and another device cascaded with the host device and including a first transceiver and a second transceiver. The first transceiver is configured to receive a first in-band data signal via a first in-band link. The first in-band data signal includes data and an embedded clock signal. The second transceiver is configured to synchronize with the embedded clock signal and transmit a second in-band data signal to the host device via a second in-band link. The second in-band data signal includes the data and the embedded clock signal. The another device is configured to perform link training for the first in-band link with the host device via the out-of-band electrical interface or another out-of-band electrical interface.

In other features, a communication system is disclosed and includes: the host device; and another device cascaded with the host device and including a first transceiver and a second transceiver. The first transceiver is configured to receive a first in-band data signal via the in-band electrical interface. The first in-band data signal includes data and an embedded clock signal. The second transceiver is configured to synchronize with the embedded clock signal and transmit a second in-band data signal via another in-band electrical interface. The second in-band data signal includes the data and the embedded clock signal. The another device is configured to perform link training for the another in-band electrical interface with the host device via the out-of-band electrical interface or another out-of-band electrical interface.

In other features, an optical module is disclosed and includes an out-of-band interface, a transmitter, and at least one processor. The out-of-band electrical interface is configured to receive out-of-band messages from a host processor of a first transceiver of a host device. The out-of-band messages include requests from the host processor including a request to perform link training operations. The transmitter is configured to transmit in-band signals on an in-band electrical interface to a receiver of the first transceiver of the host device. At least one processor is configured to perform the link training operations for the in-band electrical interface including setting parameters of the transmitter of the optical module according to some of the requests in the received out-of-band messages.

In other features, the at least one processor of the optical module is configured i) to receive via the out-of-band electrical interface one of the out-of-band messages requesting operation in either a high-level link training mode or a low-level link training mode, ii) in response to the one of the out-of-band messages requesting operation in the high-level link training mode, to test presets of parameters of the transmitter by setting the transmitter according to each of the presets and transmitting a respective one of the in-band signals to the host device, and iii) in response to the one of the out-of-band messages requesting operation in the low-level link training mode, to perform tests each of which including adjusting the parameters of the transmitter according to one of the requests from the host processor and transmitting a respective one of the in-band signals to the host device.

In other features, the at least one processor of the optical module is configured, in response to the one of the out-of-band messages requesting operation in a low-level link training mode, to test one or more sets of parameters of the transmitter as requested by the host processor by setting the transmitter according to each of the one or more sets of parameters and transmitting a respective one of the in-band signals to the host device.

In other features, the at least one processor is configured, for each of link training tests being performed, to receive via the out-of-band electrical interface one of the requests from the host device to jump values of the parameters of the transmitter of the optical module to a set of parameters selected by the host device, and jump values of the parameters to the selected set of parameters.

In other features, the at least one processor is configured to receive via the out-of-band electrical interface one of the requests from the host device to adjust at least one precursor or post cursor of the transmitter of the optical module to reduce intersymbol interference detected by the host device. In other features, the at least one processor is configured to adjust the parameters of the transmitter of the optical module which are able to reduce at least a portion of intersymbol interference detected by the host device.

In other features, the at least one processor is configured to, for each of link training tests being performed, adjust one or more of the parameters of the transmitter of the optical module based on a respective one of the requests received via the out-of-band electrical interface including incrementing or decrementing the one or more parameters.

In other features, the at least one processor is configured to, for each of link training tests being performed, adjust one or more of the parameters of the transmitter of the optical module based on a respective one of the requests received via the out-of-band electrical interface including adjusting the one or more parameters by more than an incremental or decremental amount.

In other features, the at least one processor is configured, via the out-of-band electrical interface, to receive one of the requests from the host device requesting to test presets for the parameters of the transmitter of the optical module, to transmit a respective one of the in-band signals for each of the presets to the host device, and to receive a signal from the host device via the out-of-band electrical interface to set the parameters of the transmitter of the optical module to a resultant set of parameter values providing a signal integrity value within a target range. In other features, the at least one processor is configured to, via the out-of-band electrical interface, receive one of the requests to adjust an amplitude of the transmitter of the optical module, and to adjust the amplitude.

In other features, a host device is disclosed and includes an out-of-band interface, a second processor, and a third processor. The out-of-band electrical interface is configured to receive out-of-band messages from a first processor of an optical module, the out-of-band messages including requests from the first processor to perform link training operations of a link training process. The second processor includes a transceiver. The transceiver includes a transmitter configured to transmit in-band signals on an in-band electrical interface to the optical module. The second processor is configured to perform the link training operations including setting parameters of the transmitter based on the requests from the first processor. The third processor is separate from the second processor and configured to invoke the link training process by signaling the first processor via the out-of-band electrical interface to initiate the link training process.

In other features, the third processor is configured to i) initially receive one of the out-of-band messages indicating by the first processor of the optical module that a first signal integrity value of a first one of the in-band signals transmitted to the optical module is outside a target range, and ii) in response to the first signal integrity value being outside the target range, to invoke the link training process implemented by the first processor.

In other features, the third processor is configured to i) initially receive via the out-of-band electrical interface an indication from the optical module if a first signal integrity value of a first one of the in-band signals transmitted to the optical module is outside a target range, and ii) in response to the first signal integrity value being outside the target range, to invoke a multi-stage link training process including a high-level link training mode and a low-level link training mode by signaling the optical module via the out-of-band electrical interface to implement the multi-stage link training process for training the parameters of the transmitter.

In other features, the second processor of the host device is configured to i) receive one of the out-of-band messages from the optical module via the out-of-band electrical interface indicating whether to operate in a high-level link training mode or a low-level link training mode, ii) in response to the one of the out-of-band messages requesting operation in the high-level link training mode, testing presets of parameters of the transmitter by setting the transmitter according to each of the presets and transmitting a respective one of the in-band signals to the host device for each of the presets, and iii) in response to the one of the out-of-band messages requesting operation in the low-level link training mode, to perform tests each of which including adjusting the parameters of the transmitter according to one of the requests from the first processor and transmitting a respective one of the in-band signals to the optical module.

In other features, the second processor of the host device is configured, in response to the one of the out-of-band messages requesting operation in a low-level link training mode, to test one or more sets of parameters of the transmitter as requested by the first processor by setting the transmitter according to each of the one or more sets of parameters and transmitting a respective one of the in-band signals to the optical module.

In other features, the second processor of the host device is configured to detect interrupts received from the optical module via the out-of-band electrical interface to operate in a high-level link training mode and a low-level link training mode, and signal the first processor to operate in the high-level link training mode and the low-level link training mode based on the interrupts.

In other features, the host device further includes memory configured to store parameter values received from the optical module for each test being performed. The second processor of the host device is configured to detect an interrupt from the optical module via the out-of-band electrical interface to adjust one or more of the parameters of the transmitter for each test implemented during a low-level link training mode, and in response to detecting each of the interrupts, to signal the first processor to read the parameter values from the memory. In other features, the first processor is configured, for each test of the transmitter during a low-level link training mode, to read respective parameter values to test from the memory as provided by the optical module.

In other features, the host device further includes memory configured to store parameter values received from the optical module. The second processor of the host device is configured to detect interrupts from the optical module via the out-of-band electrical interface to adjust the parameters of the transmitter for each test implemented during a low-level link training mode, and in response to detecting each of the interrupts signal the first processor to read indications from the memory whether to increment or decrement each of a selected one or more of the parameters of the transmitter.

In other features, the host device further includes a memory configured to store parameter values received from the optical module. The second processor of the host device is configured to detect an interrupt provided by the optical module, and in response signal the first processor to adjust the parameters of the transmitter. The first processor is configured read the memory and jump from a current set of parameter values to the parameter values stored in the memory.

In other features, an optical module is provided and includes an out-of-band interface, a transceiver, and at least one processor. The out-of-band electrical interface is configured to receive first out-of-band messages from a host device and transmit second out-of-band messages to the host device. The transceiver includes a receiver configured to receive in-band signals on an in-band electrical interface from a transmitter of the host device. The at least one processor is configured to receive one of the first out-of-band messages requesting link training, in response to the one of the first out-of-band messages, to perform link training operations for the in-band electrical interface including transmitting the second out-of-band messages to the host device to set and test parameters of the transmitter of the host device.

In other features, the at least one processor is configured i) in response to the one of the first out-of-band messages, operating in a selected one of a high-level link training mode and a low-level link training mode, ii) during the high-level link training mode, testing presets of the parameters of the transmitter of the host device by transmitting some of the second out-of-band messages to the host device to set the transmitter of the host device according to the presets, iii) to determine whether one of the presets results in one of the in-band signals exhibiting a signal integrity value in a target range, and iv) in response to none of the presets exhibiting a signal integrity value in the target range, to implement the low-level link training mode including testing sets of parameters of the transmitter of the host device by transmitting some of the second out-of-band messages to the host device to set the transmitter of the host device according to the sets of parameters.

In other features, the at least one processor is configured to, for each of link training tests being performed, select a set of parameters for the transmitter of the host device, and signal the host device, via the out-of-band electrical interface, to jump values of the parameters of the transmitter of the host device to the selected set of parameters.

In other features, the at least one processor is configured to, for each of link training tests being performed, select at least one of a predetermined set of transmitter parameters or a custom programmed set of transmitter parameters for the transmitter of the optical module, and signal the host device, via the out-of-band electrical interface, to jump values of the parameters of the transmitter of the host device to the selected at least one of a predetermined set of transmitter parameters or a custom programmed set of transmitter parameters.

In other features, the at least one processor is configured to determine intersymbol interference of one of the in-band signals, to determine whether the intersymbol interference is within a range that is able to be at least partially reduced by at least one precursor or post cursor of the transmitter of the host device, and to signal the host device, via the out-of-band electrical interface, to adjust the at least one precursor or post cursor to reduce the intersymbol interference.

In other features, the at least one processor is configured to determine intersymbol interference of one of the in-band signals, to determine which of the parameters of the transmitter of the host device are able to reduce at least a portion of the intersymbol interference, and signal the host device, via the out-of-band electrical interface, to adjust the parameters of the transmitter of the host device which are able to reduce the at least a portion of the intersymbol interference.

In other features, the at least one processor is configured to, for each of link training tests being performed, adjust one or more of the parameters of the transmitter of the host device by signaling, via the out-of-band electrical interface, the host device to increment or decrement the one or more parameters. In other features, the at least one processor is configured to adjust, for each of link training tests being performed, one or more of the parameters of the transmitter of the host device by signaling, via the out-of-band electrical interface, the host device to adjust the one or more parameters by more than an incremental or decremental amount.

In other features, the at least one processor is configured to, via the out-of-band electrical interface, signal the host device to test presets for the parameters of the transmitter of the host device by sending a respective one of the in-band signals for each of the presets to the host device, to monitor a signal integrity value for each of the respective one of the in-band signals, and, in response to detecting that one of the signal integrity values is within a target range, to end link training. In other features, the at least one processor is configured to, via the out-of-band electrical interface, signal the host device to adjust an amplitude of the transmitter of the host device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
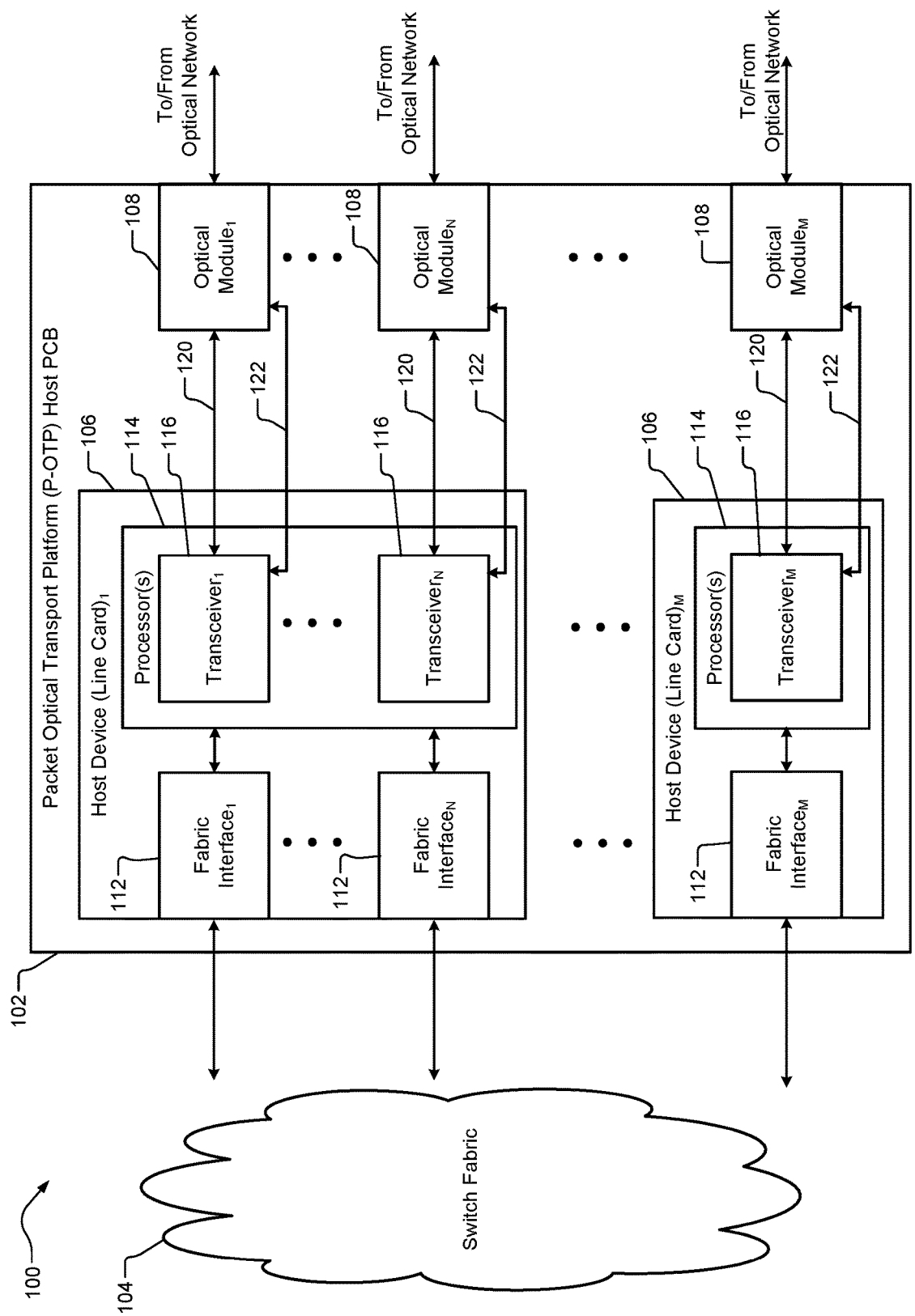
FIG. 1 is a functional block diagram of an example communication system including a P-OTP host PCB implemented between a switch fabric and an optical network and having transceivers and optical modules implementing link signal integrity checking, setup and training in accordance with the present disclosure.

Link training can be conducted using, for example, an Institute of Electrical and Electronics Engineering (IEEE)® 802.3 standard in-band link training (LT) process. The IEEE 802.3 standard LT process includes incrementing and decrementing equalizer tap values of transmitters of host devices to provide best signal-to-noise ratios (SNRs). The IEEE 802.3 standard LT process does not include selection of specific tap values and/or jumps between different sets of tap values, where each set includes coefficients for pre-cursor and post-cursor taps of the corresponding equalizer. A significant amount of time is involved in testing each of numerous tap values and tap value combinations to determine which combination of tap values provides the best SNR. This can include incrementing and/or decrementing each tap value and iteratively adjusting previously selected tap values. The testing of tap values may be done for each of multiple equalizers (or filters) of the transmitters of the host devices.

Some examples disclosed herein include host devices and optical modules performing menu-based LT using out-of-band interfaces. Menu-based LT (also referred to as high-level LT) includes the storing of a finite number of sets of transmitter settings and the testing of the finite number of sets of transmitter settings to determine the best set of transmitter settings to use for in-band signals between the host devices and the optical modules. An in-band signal refers to a data signal transmitted between a host device and an optical module over a first electrical channel between the host device and the optical module. An out-of-band signal refers to a signal transmitted over a second electrical channel (or management channel) between the host device and the optical module. Signals transmitted over the second electrical channel are at a same or different frequency as signals transmitted over the first electrical channel. The second electrical channel is used to transmit control information including, for example, coefficients, number of taps, signal integrity values, requests, status information, etc. The signal integrity values include SNRs, bit error rates (BERs), etc. As a few examples, transmitter settings include coefficients of taps of equalizers (or filters), other filter parameters, signal amplitudes, and precoder (or encoder) settings. As an example, a precoder (or encoder) setting can indicate enablement and disablement of encoding. An indication of a selected set of transmitter settings includes at least one of an index value, a preset, and the selected set of transmitter settings. Each index value and preset refers to a set of transmitter parameters including a set of coefficients for respective taps of an equalizer (or filter). Each index value identifies a set of parameters but does not include the set of parameters. In an embodiment, a preset refers to and includes a current set of transmitter settings including a set of coefficients for taps of an equalizer (or filter) or another prestored set of coefficients for the taps of the equalizer. The transmitter settings are not limited to coefficients and can include other transmitter settings, as further described below.

Other examples disclosed herein include multi-stage link optimization with host devices performing initial integrity checks based on default or last selected transmitter settings. If the initial integrity checks do not satisfy predetermined criteria, then high-level link training is invoked. In an embodiment, the predetermined criteria include determining whether signal integrity values (e.g., SNRs and/or BERs) are within predetermined signal integrity ranges. As an example, a predetermined satisfactory (or passing) SNR is a SNR that is greater than 20-25 decibels (dB). As an example, a predetermined satisfactory (or passing) BER is a BER of less than or equal to 10-12 errors per unit of time. In an embodiment, the high-level link training includes menu-based link training and includes the testing of a finite number of predetermined sets of transmitter settings. If high-level link training is unsuccessful in satisfying the predetermined criteria, low-level link training is invoked. Low-level link training includes iteratively testing different tap value combinations to obtain a set of tap values that satisfy the predetermined criteria and/or that provide best SNR and BER values. The best SNR and BER values refer to a maximum SNR and a minimum BER able to be provided. To obtain the best SNR and BER values, one or more tap values are incremented, decremented, and/or jumped until the SNR and/or BER no longer improves, a threshold number of tests are performed, and/or a timeout occurs. The jumps may include jumping values of one or more transmitter settings. Jumps refer to increases or decreases in one or more values (e.g., one or more tap coefficients), which are larger than would be done when simply incrementing or decrementing values. In an embodiment, the tap values are incremented, decremented and/or jumped until the predetermined criteria is satisfied. As further described below, the high-level link training and low-level link training may be implemented by host devices and/or optical modules.

The IEEE 802.3 standard LT process includes training equalizer settings of transmitters of two host devices to maximize a SNR for an in-band electrical communication link between the two host devices. No out-of-band interface is used for the IEEE 802.3 standard LT process. Each host device can include a SerDes Internet protocol (IP) core. The SerDes IP core includes a transmitter, a receiver, an adaptation application, and a LT application. The receiver, adaptation application and LT application can be implemented by the same or different microprocessors. The adaptation application of a first host device is configured to detect SNR values of the receiver of the first host device and report the SNR values to the LT application of the first host device. The adaptation application of the first host device is configured to adjust taps of an equalizer of the transmitter of a second host device by signaling the transmitter of the first host device to send a request via the in-band electrical interface to the second host device to adjust the taps of the equalizer of the transmitter of the second host device.

During link training between a first host device and a second host device, the LT application of each host device implements a LT process to maximize the SNR values of signals received at the receivers of the host devices. The transmitters of the host devices transmit signals based on corresponding tap values and the adaptation applications of the receivers of the host devices determine SNR values of the received signals. For example, the LT application of the first host device monitors the SNR values at the receiver of the first host device and sends a request via the transmitter of the first host device to the receiver of the second host device to adjust taps of the transmitter of the second host device. The receiver of the second host device receives the request and forwards to the adaptation application of the second host device, which either increments or decrements tap values of the transmitter of the second host device. The transmitter of the second host device then transmits another signal to the receiver of the first host device based on which the adaptation application of the first host device can determine a new SNR value. If, for example, an adjustment results in a drop in a SNR value, then the LT application of the first host device requests a change in tap values in an opposite direction. The LT application of the first host device is unaware of the actual tap values of the transmitter of the second host device. Similarly, the LT application of the second host device is unaware of the actual tap values of the transmitter of the first host device. This LT process can be repeated to tune the taps of the transmitters of the host devices until the changes in SNR values are below one or more predetermined thresholds. The described IEEE® 802.3 standard LT process is for training transmitters and receivers of host devices communicating over an electrical interface, not for training transmitters and receivers of a host device and an optical module communicating over an electrical interface. Also, the LT process is implemented according to a structured protocol that provides interoperability between the host devices.

Another link training process, referred to as Ethernet LT, can include performing a handshake between Ethernet devices using an in-band interface to adjust and set tap values of transmitters. No out-of-band interface is used for Ethernet LT. Ethernet LT includes use of an Ethernet specific protocol that is not a data agnostic-based protocol. Ethernet LT requires point-to-point link operation, where both host devices are able to operate as link training initiators. Ethernet LT becomes complex when intermediary devices and/or modules are located between two end (or host) devices. For example, if a first host device is in communication with a second host device via respective optical modules and corresponding optical link (or segment) between the optical modules, then retimers are needed between the host devices and the optical modules and eight LT applications are needed in order for link training to be implemented for these two host devices. Each segment refers to i) a channel between a host device and a retimer, ii) a channel between a retimer and an optical module, or iii) a channel between optical modules. Each segment of the entire link needs to be trained and LT frames for one segment are not permitted to propagate to another segment as this would cause confusion at a downstream device. Clock data recovery (CDR) of an optical module implementing Ethernet LT would require multiplexers and demultiplexers with a physical coding sublayer logic, which renders this implementation not suitable for serial CDR implementations and non-complementary metal-oxide semiconductor (CMOS) implementations. An optical module with Ethernet LT capability requires that the module operate as an initiator. Ethernet LT is not compatible with out-of-band LT and is too complex to be suitable for optical modules.

The examples set forth herein overcome the limitations and associated above-stated disadvantages of the IEEE® 802.3 standard LT process and Ethernet LT. This is further explained below and will become evident with respect to the examples and corresponding descriptions of FIGS. 1-21.

FIG. 1 shows a communication system 100 including a P-OTP host PCB 102 implemented between a switch fabric 104 and an optical network. The P-OTP host PCB 102 includes host devices 106 and optical modules 108, which are mounted on the P-OTP host PCB 102. Each of the host devices 106 includes one or more fabric interfaces 112 and one or more processors 114. Each of the processors 114 includes one or more transceivers 116. In the shown embodiment, the host devices 106 are implemented as line cards. The host devices 106 and the optical modules 108 may be configured and operate similarly as any of the host devices and optical modules disclosed and described herein. During operation, data is transferred between the switch fabric 104 and the fabric interfaces 112, between the transceivers 116 and the optical modules 108 via in-band links (or channels) 120, and between the optical modules 108 and the optical network. Control information is transferred via out-of-band links (or channels) 122. In an embodiment, the out-of-band links 122 each include a two-wire interface (TWI) or a high-speed differential four-wire interface that connect processors of host devices to optical modules for setting basic functions and for performing link training operations.

The in-band links 120 transmit test patterns or Ethernet data and the out-of-band links 122 is used for link signal integrity checking, setup and training of the in-band links is by utilizing 122 as further described below. The host devices 106 and optical modules 108 implement the methods of FIGS. 13-20. Communication between the host devices 106 and the optical modules 108 is conducted over very short range (VSR) electrical interfaces (or VSR in-band electrical links). Although VSR electrical interfaces typically refer to interfaces that are less than and up to 300 mm in length, the VSR electrical interfaces referred to herein are substantially shorter than 300 mm. In some embodiments, the host devices disclosed herein are directly connected to the corresponding optical modules.

Figure 2:
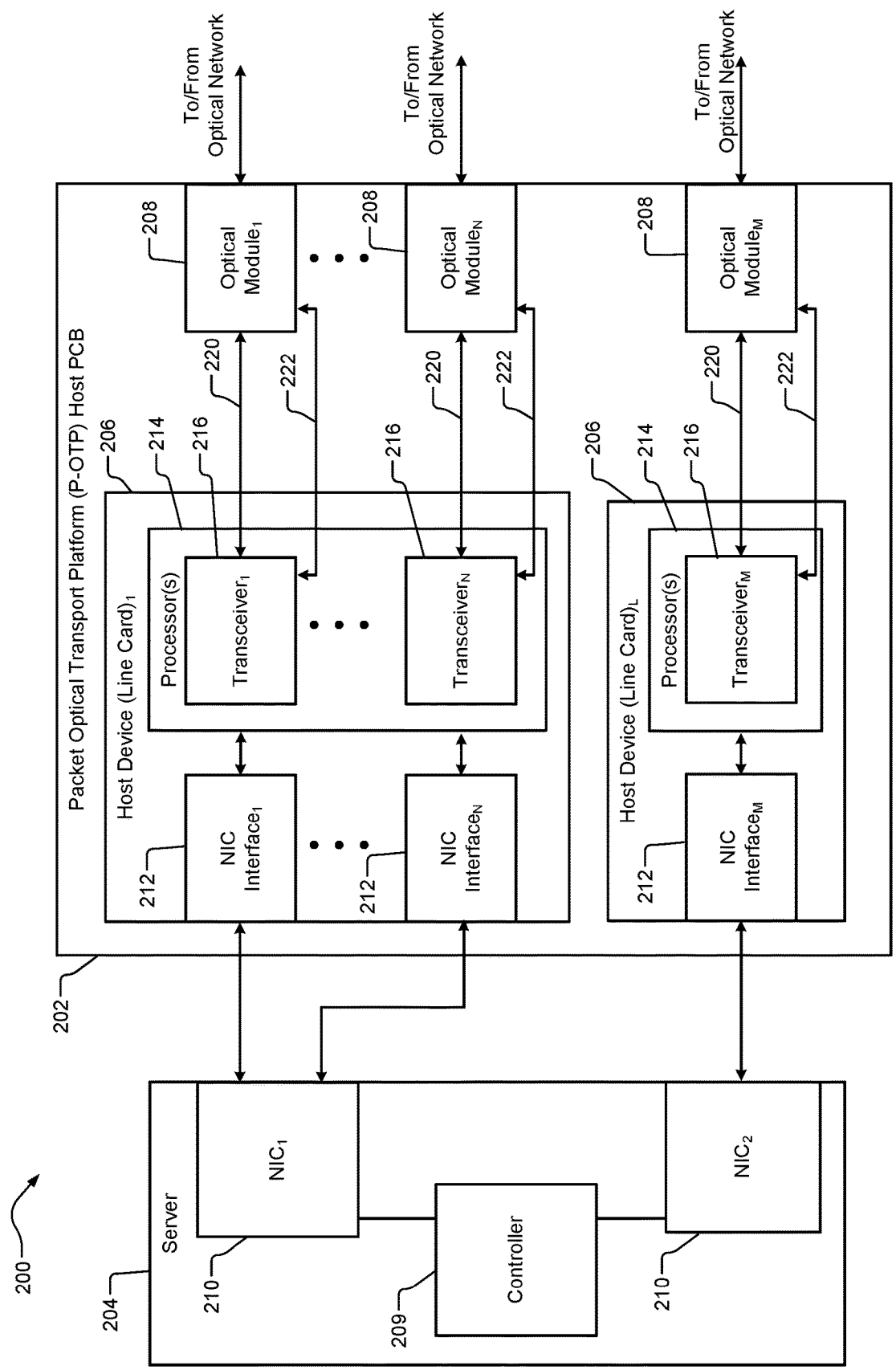
FIG. 2 is a functional block diagram of an example communication system including a P-OTP host PCB implemented between a server and an optical network and having transceivers and optical modules implementing link signal integrity checking, setup and training in accordance with the present disclosure.

FIG. 2 shows a communication system 200 including a P-OTP host PCB 202 implemented between a server 204 and an optical network. The P-OTP host PCB 202 includes host devices 206 and optical modules 208, which are mounted on the P-OTP host PCB 202. The server 204 includes a controller 209 and one or more network interface cards (NICs) 210. Each of the host devices 206 includes one or more NIC interfaces 212 connected to the NICs 210 and one or more processors 214. Each of the processors 214 includes one or more transceivers 216. In the shown embodiment, the host devices 206 are implemented as line cards. The host devices 206 and the optical modules 208 may be configured and operate similarly as any of the host devices and optical modules disclosed and described herein. During operation, data is transferred between the NICs 210 and the NIC interfaces 212, between the transceivers 216 and the optical modules 208 via in-band links (or channels) 220, and between the optical modules 208 and the optical network. Control information is transferred via out-of-band links (or channels) 222. In an embodiment, each of the out-of-band links 222 includes a TWI or a high-speed differential four-wire interface that connects processors of host devices to optical modules for setting basic functions and for performing link training operations. The in-band links 220 and the out-of-band links 222 are used for link signal integrity checking, setup and training of the in-band links 220 as further described below. The host devices 206 and optical modules 208 may implement the methods of FIGS. 13-20.

The controller 209 may refer to one or more processors and memory, where the one or more processors are configured to execute instructions to perform the described operations. In an embodiment, the instructions are stored in the memory of the one or more processors. The term "controller" may be replaced with the term "circuit". The memory of the one or more processors includes a non-transitory, tangible computer-readable medium.

Figure 3:
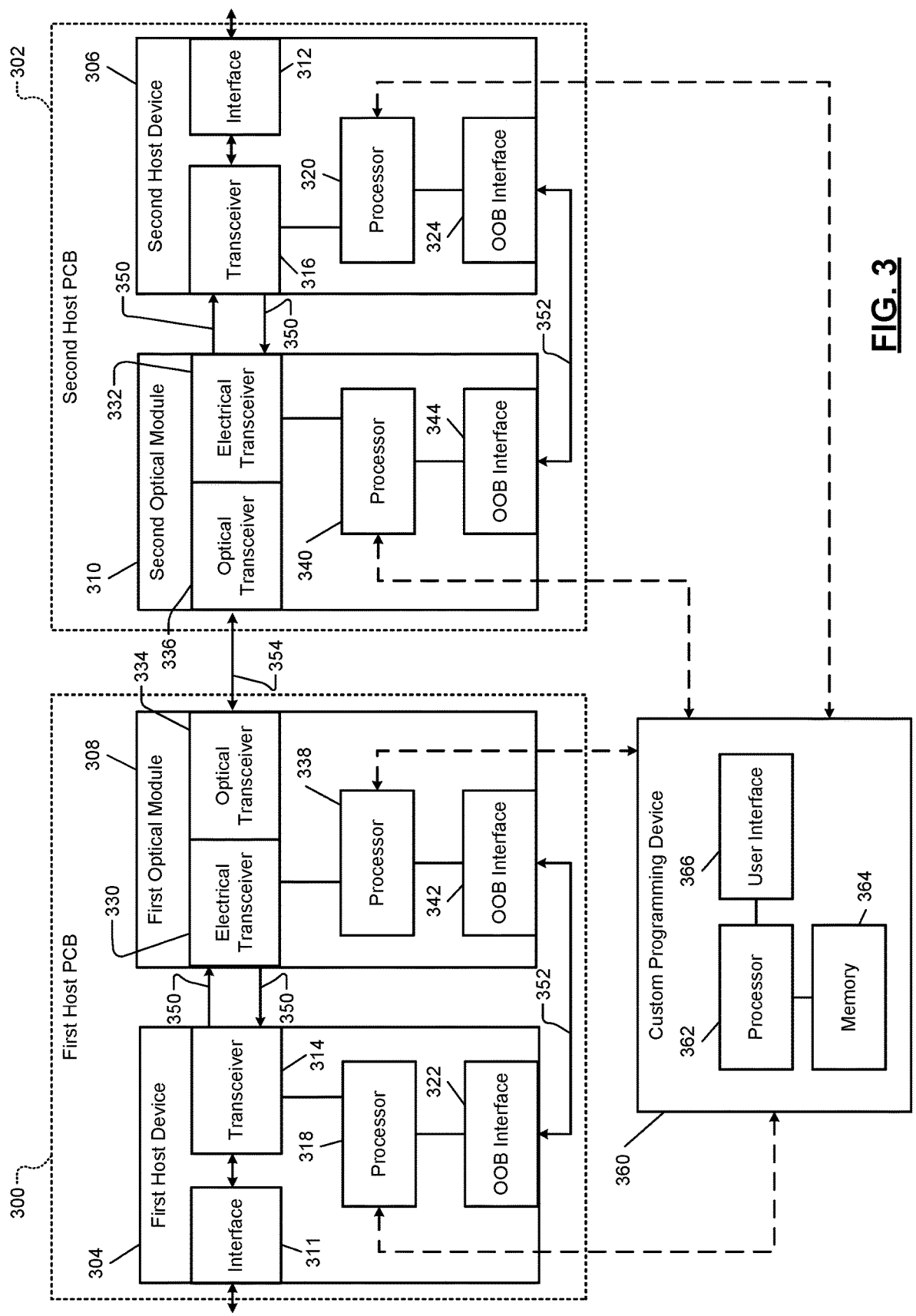
FIG. 3 is a functional block diagram of example first and second host PCBs including host devices and optical modules implementing link signal integrity checking, setup and training in accordance with the present disclosure.

FIG. 3 shows first and second host PCBs 300, 302 including host devices 304, 306 and optical modules 308, 310 implementing link signal integrity checking, setup and training. In an embodiment, the host PCBs 300, 302 are implemented as P-OTP host PCBs, such as those shown in FIGS. 1-2.

The host devices 304, 306 include interfaces 311, 312, transceivers 314, 316, processors 318, 320, and out-of-band (OOB) interfaces 322, 324. In an embodiment, the interfaces 311, 312 are in communication with a switch network, servers, and/or NICs. The optical modules 308, 310 include electrical transceivers 330, 332, optical transceivers 334, 336, processors 338, 340 and OOB interfaces 342, 344. In-band electrical links 350 exist between the transceivers 314, 330 and between the transceivers 316, 332. OOB electrical links 352 exist between the OOB interfaces 322, 342 and between the OOB interfaces 324, 344. An optical link 354 exists between the optical transceivers 334, 336. The host devices 304, 306 and optical modules 308, 310 are configured to implement the methods of FIGS. 13-20. The OOB electrical links 352, as well as other OOB electrical links and interfaces disclosed herein, are used for link training purposes and in some embodiments have a data rates that are significantly slower than data rates of an in-band links (or data communication channels). As an example, a data rate of an in-band interface (or data communication link) can have a 112 gigabits per second (Gbps) channel, whereas an out-of-band interface (or management link used to transfer control information) can have a 1 kilobits per second (kbps) to 1 megabits per second (1 Mbps) channel. In some embodiments, the OOB electrical links 352 are out-of-band TWIs or high-speed differential four-wire interfaces that connect processors of host devices to optical modules for setting basic functions and for performing link training operations.

The OOB electrical links 352 may be referred to as management channels that are used to train the In-band electrical links 350 (or in-band electrical interfaces). The communication between the host devices 304, 306 and optical modules 308, 310 is referred to as chip-to-module (C2M) communication. The host devices 304, 308 include the transceivers 314, 316, which include transmitters, receivers, adaptation applications, and LT applications, as further described below. The OOB electrical links 352 carry training commands and responses, such that corresponding exchanges are not vulnerable to signal quality of in-band data link signals on the in-band links being trained.

The OOB electrical links 352 are used for adjusting settings of transmitters of the transceivers 314, 316, 330, 332. As further described below, the settings are stored and at least some of which are predetermined and/or custom programmed. In an embodiment, a custom programming device 360 is in communication with one or more of the processors 318, 320, 338, 340 and programs settings and/or groups of settings of the transmitters of the transceivers 314, 316, 330, 332. The custom programming device 360 includes a processor 362, memory 364 and a user interface 366. The processor 318 receives selected settings from a user via the user interface 318 and signals the processors 318, 320, 338, 340 to set transmitter parameters of the transceivers 314, 316, 330, 332 based on the received inputs. The transmitter settings may refer to any of the transmitter settings referred to herein including tap values, signal amplitudes, filter parameters, etc. The filter parameters include: frequencies or frequency ranges to filter out and/or to emphasize; types of filtering to be performed; etc. The types of filtering include peak filtering, low pass filtering, high pass filtering, notch filtering, bandpass filtering, etc. Although not shown one or more transceivers and/or one or more interfaces may exist between the processor 362 and the processors 318, 320, 338, 340. The memory 364 stores settings including existing settings of the transmitters and predetermined sets of settings to be sent to program the transceivers 314, 316, 330, 332.

Figure 4:
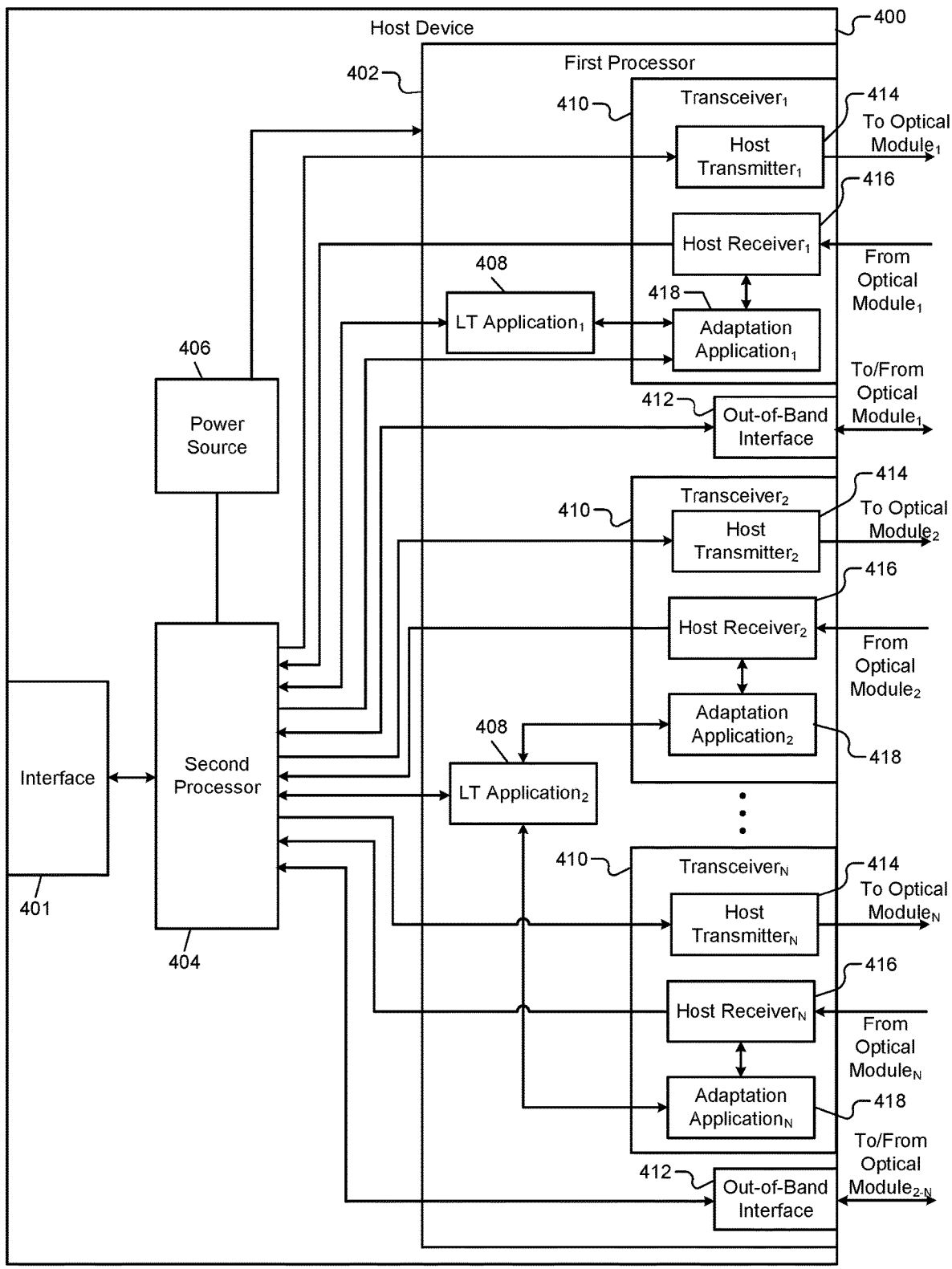
FIG. 4 is a functional block diagram of an example host device including processors, link training applications, transceivers with adaptation applications, and out-of-band interfaces in accordance with the present disclosure.

FIG. 4 shows a host device 400 including an interface 401, processors 402, 404, a power source 406, LT applications 408, transceivers 410, and out-of-band interfaces 412. In some embodiments, the host device 400 replace one of the host devices of FIGS. 1-3. The host device is configured to implement the methods of FIGS. 13, 15, 17, 19. The interface 401 is a fabric interface, a NIC interface, or other electrical interface. In an embodiment, the LT applications 408 are stored in memory of the processor 402 and executed by the processor 402. Although the LT applications 408 are shown separate from the transceivers 410, the LT applications 408 may be stored in memory of the transceivers 410 and executed by the transceivers 410. The transceivers 410 include host transmitters 414, host receivers 416, and adaptation applications 418. In an embodiment, the adaptation applications 418 are stored in memory of the transceivers 410 and executed by the transceivers 410.

The second processor 404 transfers data between the interface 401 and the host transmitters 414 and host receivers 416. The transceivers 410 transfer data between the first processor 402 and respective optical modules via in-band electrical links. The second processor 404 controls powering the first processor 402 via the power source 406. The LT applications 408 are configured to perform link training operations based on signal integrity values. The adaptation applications 418 are configured to determine the signal integrity values of signals received via the host receivers 416. The adaptation applications 418 are also configured to adjust tap values of the transmitters of the optical modules by having requests sent via the OOB interfaces 412. The adjustment of the tap values is based on instructions generated by the LT applications 408 and/or second processor 404. The adaptation applications 418 and LT applications 408 are configured similarly as other adaptation applications and LT applications disclosed herein. The second processor 404 monitors signal integrity values and, in an embodiment, controls link training of in-band electrical links between the host device 400 and the optical modules by controlling and/or signaling the LT applications and using the OOB interfaces 412 to transfer control information. The control information includes: tap coefficients; signal amplitudes; encoding enablement and disablement indicators; increment, decrement and/or jump instructions; and/or other transmitter settings and requests.

In an embodiment the second processor 404 is configured to: bring up link; check signal quality of link in current state with current transmitter parameters; if current signal quality does not pass a predetermined criteria; test a finite set of presets of transmitter settings; and if none of the presets satisfy the predetermined criteria, invoke link training. The link training is implemented by i) the second processor 404, or by ii) the first processor 402 or a processor of a corresponding link partner (i.e., a corresponding optical module).

Figure 5:
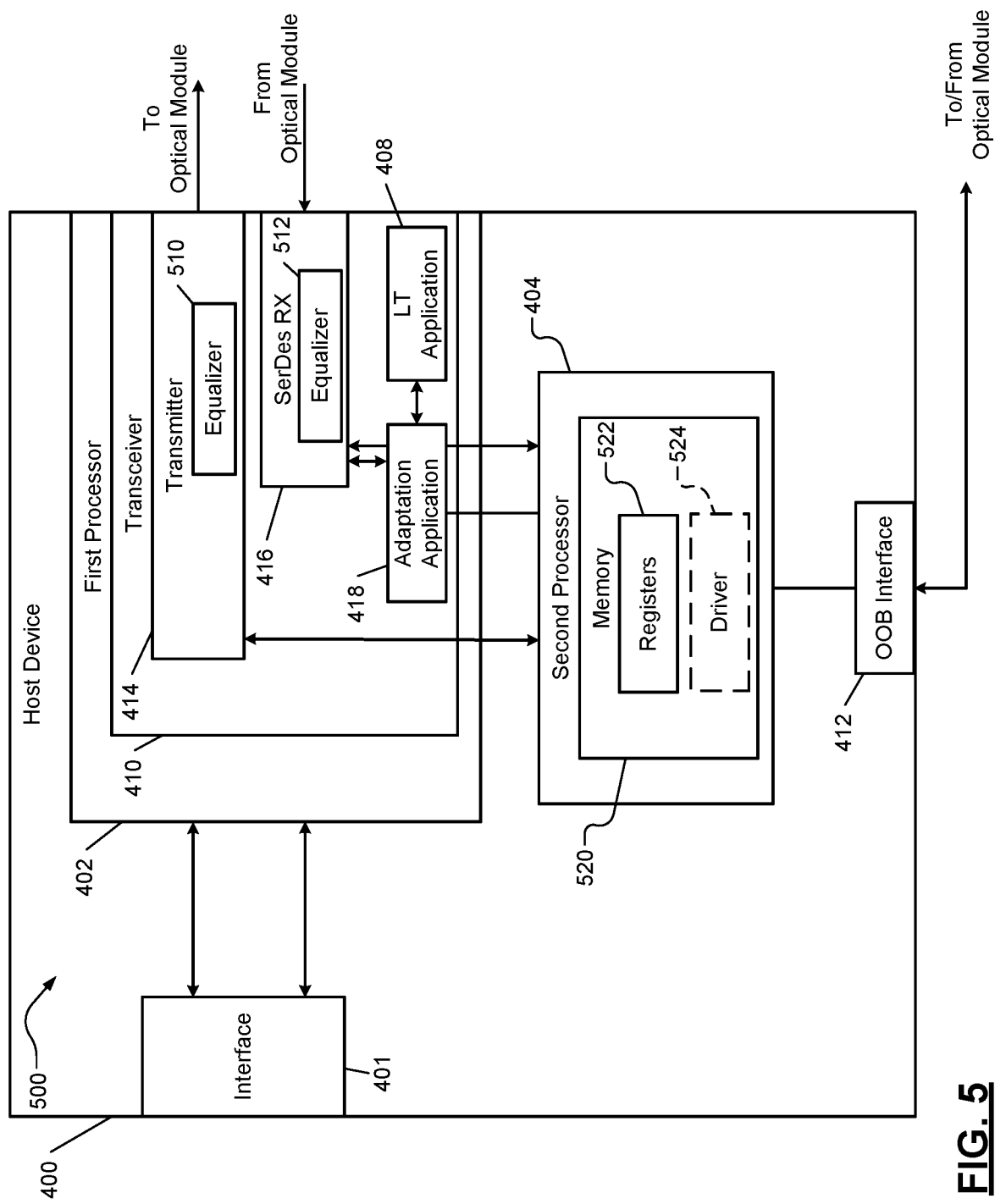
FIG. 5 is a functional block diagram illustrating an example detailed portion of the host device of FIG. 4 in accordance with the present disclosure.

FIG. 5 shows a portion 500 of the host device 400 of FIG. 4. The portion 500 includes the interface 401, the first processor 402, the second processor 404 and the OOB interface 412. The first processor 402 includes transceiver 410, which includes transmitter 414, receiver 416, adaptation application 418 and LT application 408. In the embodiment shown, the receiver 416 is implemented as a SerDes receiver that deserializes received data. The transmitter 414 and the receiver 416 include respective equalizers 510, 512, which each have taps with corresponding coefficients. The transmitter 414 may include and/or perform the function of an encoder and the receiver 416 may include and/or perform the function of a decoder. In an embodiment, the encoder and decoder include a forward error correction (FEC) encoder and a FEC decoder. The encoder and decoder provide error detection and/or correction. The adaptation applications 418 monitor received signals and determine signal integrity values. The LT application 408 and the adaptation application 418 perform low-level link training of the transmitter of the optical module (not shown in FIG. 5), which is in communication with the first processor 402 via the corresponding in-band electrical interface. Low-level link training includes iteratively tuning and testing parameters of a transmitter, as further described below. The LT application 408 and/or adaptation application 418 sends a request to the second processor 404 to signal the optical module to change tap value(s) of the transmitter of the optical module and resend data via the transmitter of the optical module over the in-band electrical interface. The request is sent from the second processor 404 via the OOB interface 412 and in an embodiment, includes transmitter parameters such as coefficients, amplitudes, and/or other transmitter parameters. This indicates to the optical module how to adjust the transmitter settings of the transmitter of the optical module.

The second processor 404 may include memory 520 that includes registers 522 and optionally stores a driver 524. In an embodiment, the second processor does not include a driver. In an embodiment, the host device 400 does not include a driver. The registers 522 store transmitter parameters to be sent to the optical module or transmitter parameters received from the optical module. In an embodiment, the optical module when adjusting parameters of the transmitter 414, stores transmitter parameters in the registers 522, which are accessed by the second processor 404 and provided to the transmitter 414.

Figure 6:
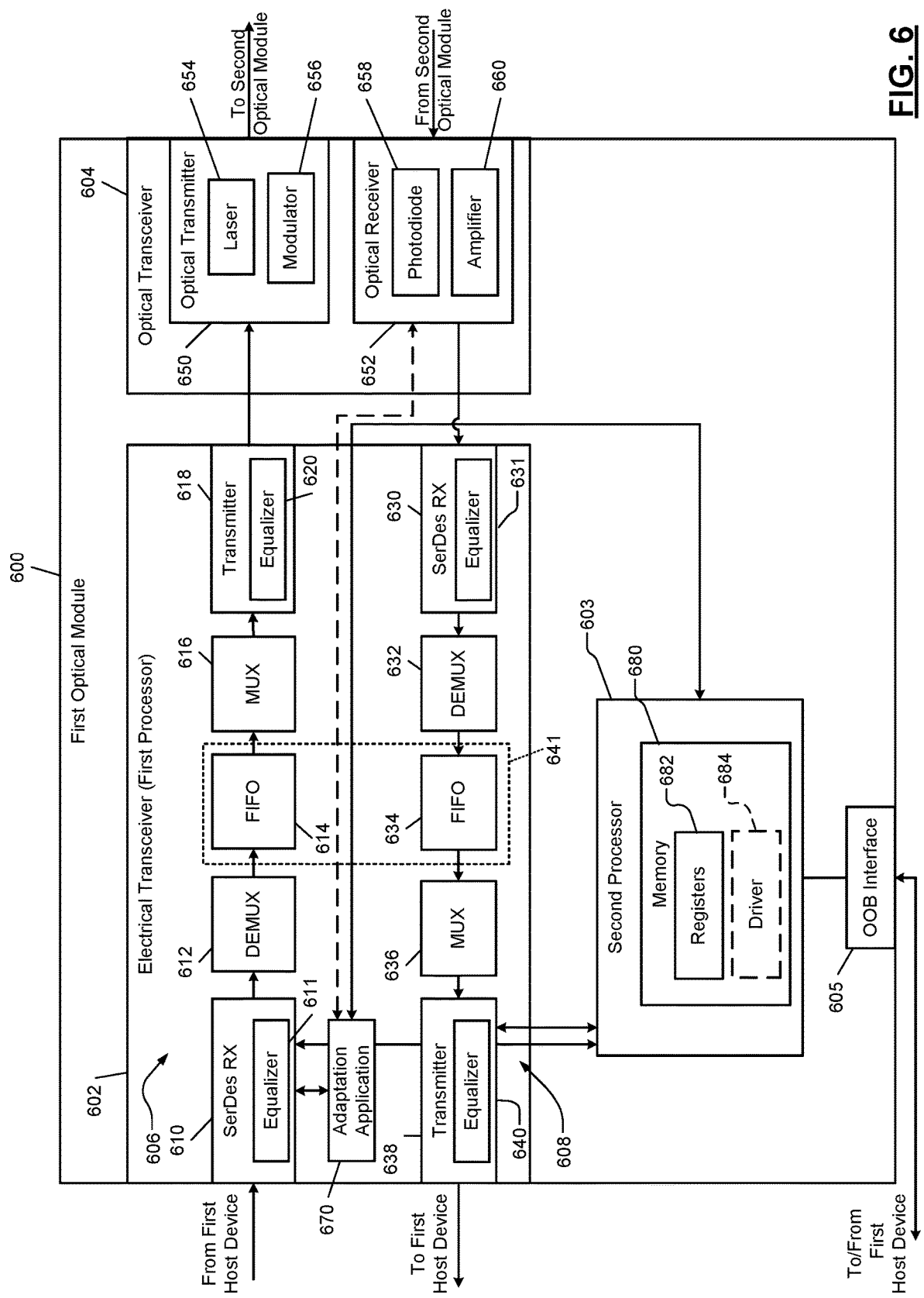
FIG. 6 is a functional block diagram of an example optical module including two processors, one of which including multiplexers, demultiplexers, and first-in-first-out (FIFO) memory in accordance with an embodiment of the present disclosure.

FIG. 6 shows an optical module 600 that may replace any of the optical modules disclosed herein. The optical module 600 includes processors 602, 603, optical transceiver 604, and an OOB interface 605. The processor 602 includes a receive path 606 and a transmit path 608. Although the processor 602 is shown having a signal transmit path and a single receive path, the processor 602 may include any number of transmit and receive paths configured similarly as the shown transmit and receive paths and thus transmit and receive in-band signals to and from any number of host processors. The receive path 606 includes: a SerDes receiver 610 with an equalizer 611; a demultiplexer 612; a FIFO memory 614; a multiplexer 616; and a transmitter 618 with an equalizer 620. The transmit path 608 includes: a SerDes receiver 630 with an equalizer 631; a demultiplexer 632; a FIFO memory 634; a multiplexer 636; and a transmitter 638 with an equalizer 640. The FIFO memories 614, 634 may be implemented as a single FIFO memory 641. The transmitters 618 and 638 may include or perform the functions of encoders. The receivers 610, 630 may include and/or perform the functions of decoders. In an embodiment, the encoders and decoders include FEC encoders and FEC decoders. The encoders and decoders provide error detection and/or correction. In an embodiment, the transmitter 618 includes and/or performs the function of a pulse amplitude module driver. The optical transceiver 604 includes an optical transmitter 650 and an optical receiver 652. The optical transmitter 650 includes a laser 654 and a modulator 656. The optical receiver 652 includes a photodiode 658 and an amplifier 660.

The first processor (also referred to as an electrical transceiver) 602 further includes an adaptation application 670, which is in communication with the second processor 603 and in an embodiment is in communication with the optical receiver 652. The adaptation application 670 monitors signal integrity values of signals received via the SerDes receiver 610, and optionally signal integrity values of signals received via the optical receiver 652 and sends requests to the second processor 603 to adjust transmitter parameters of the transmitter of the host device.

The second processor 603 includes a memory 680 that has registers 682 and optionally stores a driver 684. In an embodiment, the second processor 603 does not include a driver. In an embodiment, the optical module 600 does not include a driver. The registers 682 store transmitter parameters to be sent to a host device or transmitter parameters received from the host device. In an embodiment, the host device when adjusting parameters of the transmitter 638, stores transmitter parameters in the registers 682, which are accessed by the second processor 603 and provided to the transmitter 638.

In an embodiment, the SerDes receiver 610 is configured to receive incoming data at 25 Gbps in a pulse amplitude modulated format. The received data is processed and transmitted via the modulator 656 over an optical link to another optical module downstream from the optical module 600. As a few examples, the data is transmitted over the optical link at 40 Gbps, 100 Gbps, 400 Gbps, or at another data rate. The SerDes receiver 610 or the demultiplexer 612 includes and/or performs the function of a clock data recovery (CDR) circuit. The demultiplexer 612 demultiplexes a received signal into multiple data streams, which are stored in the FIFO memory 614. The multiplexer 616 multiplexes the data streams into a single data signal that is provided to the transmitter 618.

The amplifier 660 receive an optical data signal from the optical link and amplifies the optical data signal. The optical receiver converts the output of the amplifier 660 from an analog signal to a digital signal prior to being received at the SerDes receiver 630. The digital signal is converted into a pulse amplitude modulated form via the transceiver 602 and/or transmitter 638 prior to being transmitted by the transmitter 638. In an embodiment, the transmitter 638 transmits the data at 25 Gbps. The demultiplexer 632 demultiplexes the digital signal into multiple data streams, which are stored in the FIFO memory 634. The multiplexer 636 multiplexes the data streams into a single data signal that is provided to the transmitter 638.

Figure 7:
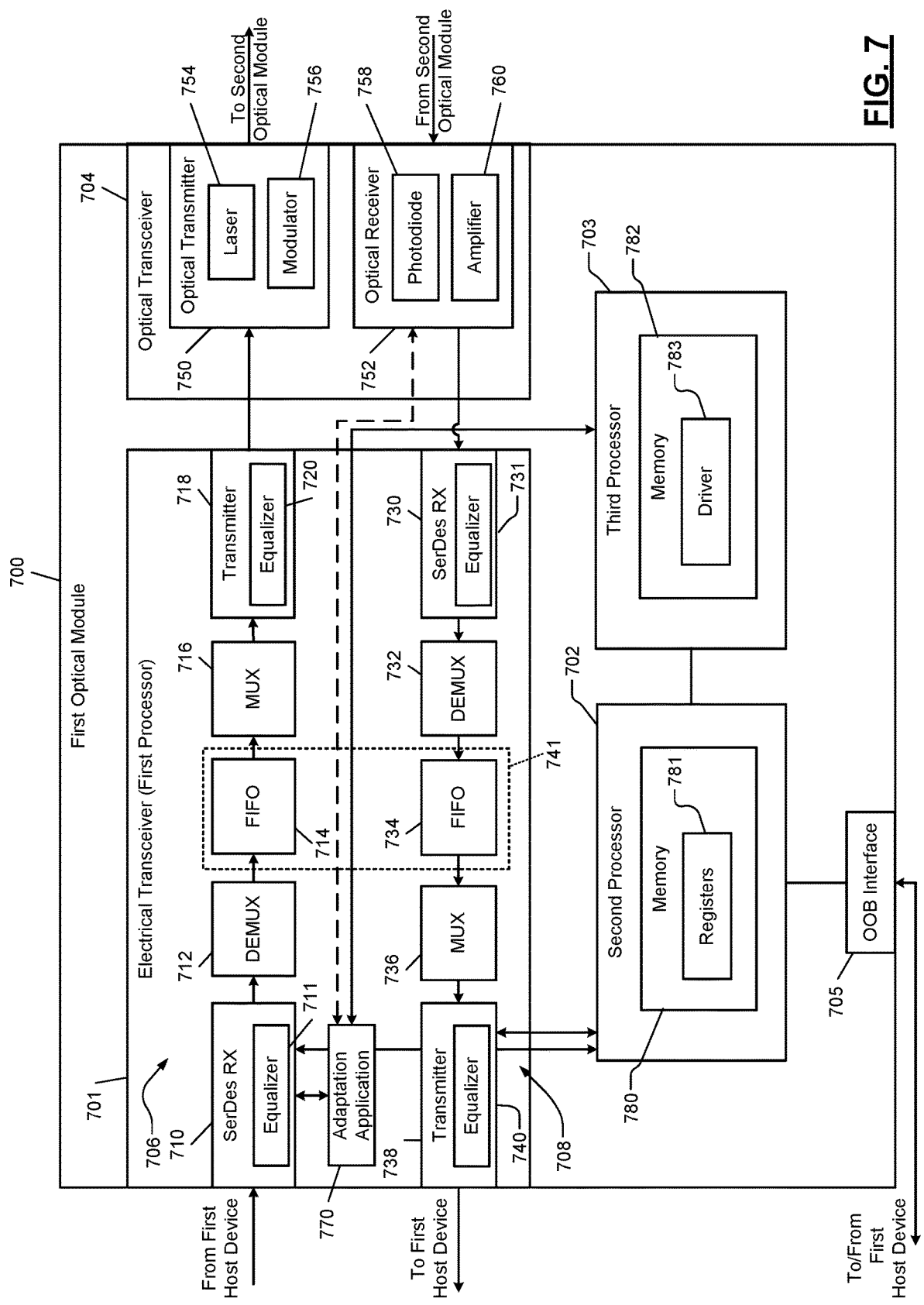
FIG. 7 is a functional block diagram of another example optical module including three processors in accordance with another embodiment of the present disclosure.

FIG. 7 shows an optical module 700 that may replace any of the optical modules disclosed herein. The optical module 700 includes processors 701, 702, 703, optical transceiver 704, and an OOB interface 705. The processor 702 includes a receive path 706 and a transmit path 708. Although the processor 702 is shown having a signal transmit path and a single receive path, the processor 702 may include any number of transmit and receive paths configured similarly as the shown transmit and receive paths and thus transmit and receive in-band signals to and from any number of host processors. The receive path 706 includes: a SerDes receiver 710 with an equalizer 711; a demultiplexer 712; a FIFO memory 714; a multiplexer 716; and a transmitter 718 with an equalizer 720. The transmit path 708 includes: a SerDes receiver 730 with an equalizer 731; a demultiplexer 732; a FIFO memory 734; a multiplexer 736; and a transmitter 738 with an equalizer 740. The demultiplexers 712, 732 convert serial data to parallel data. The data is then processed prior to and/or subsequent to being stored in the FIFO memories 714, 734. The processed parallel data is then converted to serial data via the multiplexers 716, 736. The FIFO memories 714, 734 may be implemented as a single FIFO memory 741. The optical transceiver 704 includes an optical transmitter 750 and an optical receiver 752. The optical transmitter 750 includes a laser 754 and a modulator 756. The optical receiver 752 includes a photodiode 758 and an amplifier 760.

The first processor (also referred to as an electrical transceiver) 701 further includes an adaptation application 770, which is in communication with the third processor 703 and in an embodiment is in communication with the optical receiver 752. The adaptation application 770 monitors signal integrity values of signals received via the SerDes receiver 710, and optionally signal integrity values of signals received via the optical receiver 752. The adaptation application 770 then sends requests to the third processor 703 to adjust transmitter parameters of the transmitter of a host device. In an embodiment, the driver 783 monitors signal integrity values received from the adaptation application 770 and determines whether to send a request to the second processor to adjust parameters of the transmitter of the host device. This may include storing transmitter parameter values (or transmitter settings) in the registers 781, which are then transferred via the OOB interface 705 to the host device.

The second processor 702 includes a memory 780 that has registers 781. The third processor 703 includes memory 782 that stores a driver 783. The registers 781 store transmitter parameters to be sent to the host device or transmitter parameters received from the host device. In an embodiment, the host device when adjusting parameters of the transmitter 738, stores transmitter parameters in the registers 781, which are accessed by the second processor 702 and provided to the transmitter 738.

Figure 8:
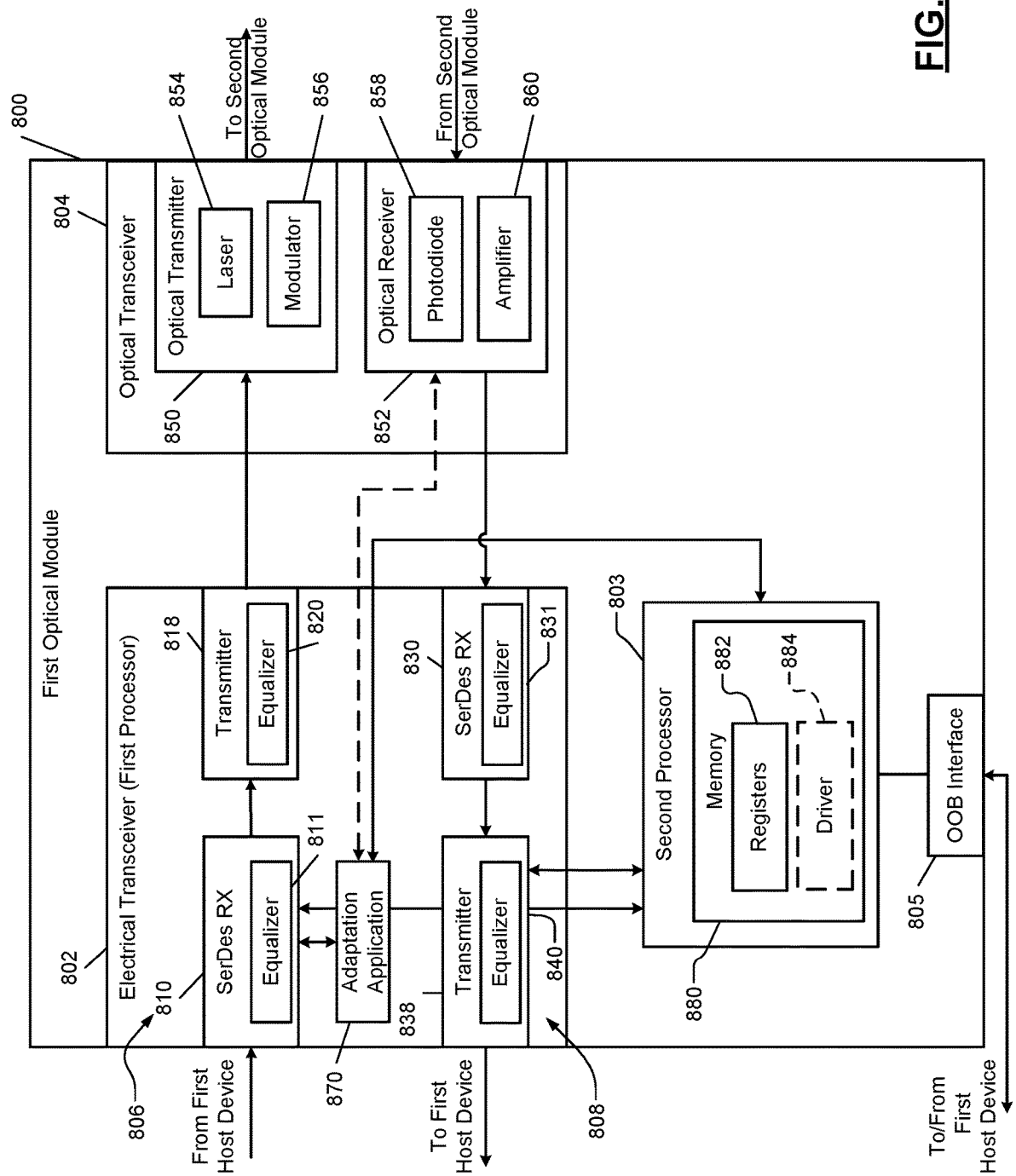
FIG. 8 is a functional block diagram of another example optical module including two processors, one of which including receivers and transmitters in accordance with an embodiment of the present disclosure.

FIG. 8 shows an optical module 800 that may replace any of the optical modules disclosed herein. The optical module 800 includes processors 802, 803, optical transceiver 804, and an OOB interface 805. The processor 802 includes a receive path 806 and a transmit path 808. Although the processor 802 is shown having a signal transmit path and a single receive path, the processor 802 may include any number of transmit and receive paths configured similarly as the shown transmit and receive paths and thus transmit and receive in-band signals to and from any number of host processors. The receive path 806 includes: a SerDes receiver 810 with an equalizer 811; and a transmitter 818 with an equalizer 820. The transmit path 808 includes: a SerDes receiver 830 with an equalizer 831; and a transmitter 838 with an equalizer 840. The optical transceiver 804 includes an optical transmitter 850 and an optical receiver 852. The optical transmitter 850 includes a laser 854 and a modulator 856. The optical receiver 852 includes a photodiode 858 and an amplifier 860.

The first processor (also referred to as an electrical transceiver) 802 further includes an adaptation application 870, which is in communication with the second processor 803 and in an embodiment is in communication with the optical receiver 852. The adaptation application 870 monitors signal integrity values of signals received via the SerDes receiver 810, and optionally signal integrity values of signals received via the optical receiver 852. The adaptation application 870 then sends requests to the second processor 803 to adjust transmitter parameters of the transmitter of the host device.

The second processor 803 includes a memory 880 that has registers 882 and optionally stores a driver 884. In an embodiment, the second processor 803 does not include a driver. In an embodiment, the optical module 800 does not include a driver. The registers 882 store transmitter parameters to be sent to a host device or transmitter parameters received from the host device. In an embodiment, the host device when adjusting parameters of the transmitter 838, stores transmitter parameters in the registers 882, which are accessed by the second processor 803 and provided to the transmitter 838.

Figure 9:
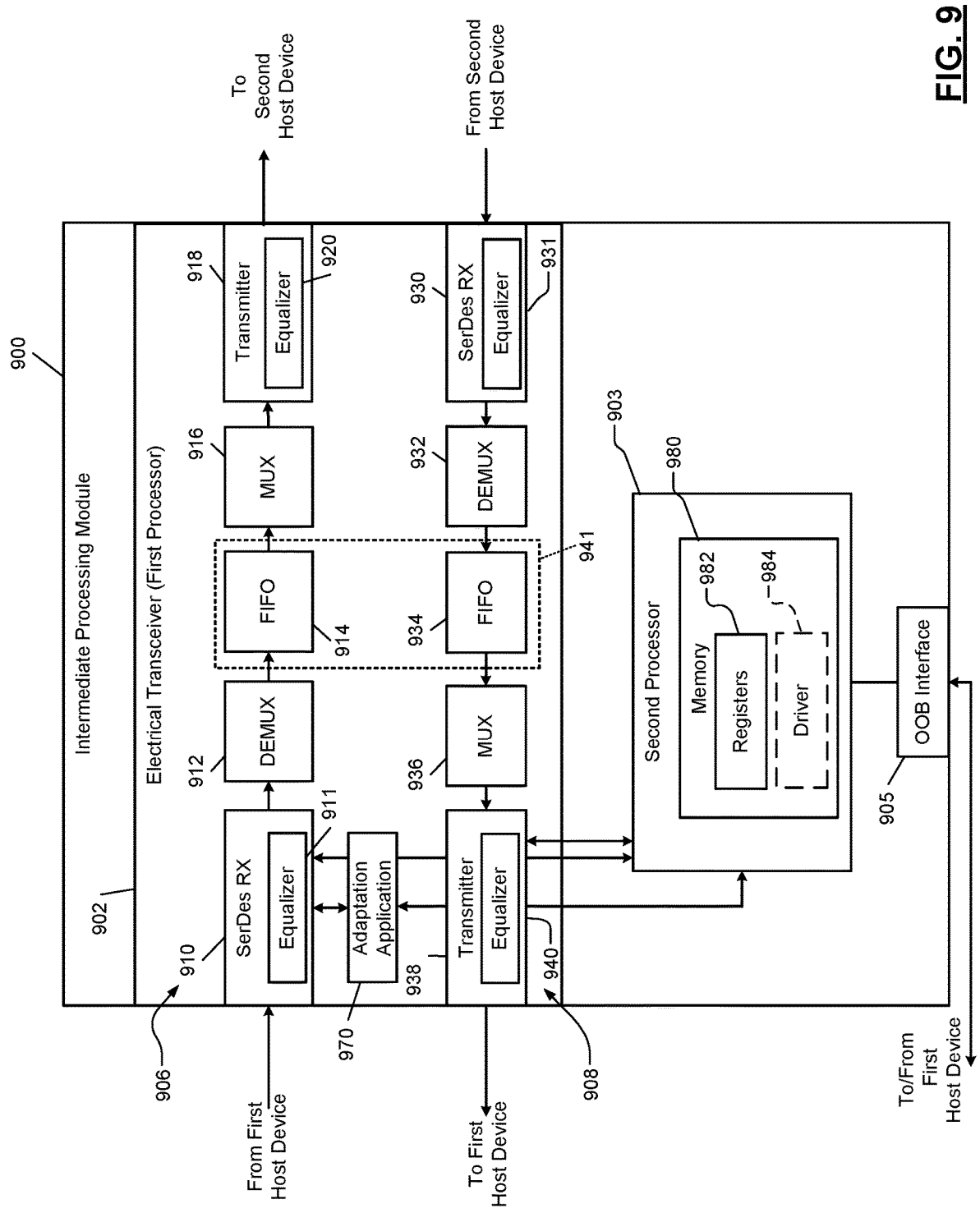
FIG. 9 is a functional block diagram of an example intermediate processing module implemented between two host devices in accordance with another embodiment of the present disclosure.

FIG. 9 shows an intermediate processing module 900 implemented between two host devices. The host devices may be similar to other host device disclosed herein, but instead of communicating with respective optical modules via in-band electrical interfaces, communicate with the intermediate processing module 900 via in-band electrical interfaces. The intermediate processing module 900 includes processors 902, 903 and an OOB interface 905. The processor 902 includes a first transmit path 906 and a second transmit path 908. Although the processor 902 is shown having a signal transmit path and a single receive path, the processor 902 may include any number of transmit and receive paths configured similarly as the shown transmit and receive paths and thus transmit and receive in-band signals to and from any number of host processors. The first transmit path 906 includes: a SerDes receiver 910 with an equalizer 911; a demultiplexer 912; a FIFO memory 914; a multiplexer 916; and a transmitter 918 with an equalizer 920. The second transmit path 908 includes: a SerDes receiver 930 with an equalizer 931; a demultiplexer 932; a FIFO memory 934; a multiplexer 936; and a transmitter 938 with an equalizer 940. The FIFO memories 914, 934 may be implemented as a single FIFO memory 941.

The first processor (also referred to as an electrical transceiver) 902 further includes an adaptation application 970, which is in communication with the second processor 903. The adaptation application 970 monitors signal integrity values of signals received via the SerDes receiver 910 and sends requests to the second processor 903 to adjust transmitter parameters of the transmitter of the first host device that is in communication with the SerDes receiver 910.

The second processor 903 includes a memory 980 that has registers 982 and optionally stores a driver 984. In an embodiment, the second processor 903 does not include a driver. In an embodiment, the intermediate processing module 900 does not include a driver. The registers 982 store transmitter parameters to be sent to a host device or transmitter parameters received from the host device. In an embodiment, the host device when adjusting parameters of the transmitter 938, stores transmitter parameters in the registers 982, which are accessed by the second processor 903 and provided to the transmitter 938.

The equalizers 510, 512, 611, 620, 631, 640, 711, 720, 731, 740, 811, 820, 831, 840, 911, 920, 931, 940 of FIGS. 5-9 are feedforward equalizers (FFEs), continuous time linear equalizers (CTLEs), or decision feedback equalizers (DFEs) and/or include finite impulse response filters (FIRs).

The registers 522 of the host device 400 of FIGS. 4-5 allow the processors 602, 701, 802, 902 of the optical modules 600, 700, 800, 900 of FIGS. 6-9 to adjust the parameters of the transmitter 414 of the host device 400. For example, the processors 602, 701, 802, 902 send requests, updated parameters and/or signal integrity ranges via the processors 603, 702, 802, 903 and OOB interfaces 605, 705, 805, 905 to the host device 400, which stores the requests, updated parameters and/or signal integrity ranges in the registers 522. The requests, updated parameters, and/or signal integrity ranges in the registers 522 are then retrieved by the processor 404 and used to set the parameters of the transmitter 414. The requests include increment, decrement, and/or jump requests. Optimized parameter settings are stored and used after a reset and/or power cycling event.

The registers 682, 781, 882, 982 of the optical modules 600, 700, 800, 900 of FIGS. 6-9 allow the first processor 402, the transceiver 410, and/or the second processor 404 of the host device 400 to adjust parameters of the transmitters 638, 738, 838, 938 of the corresponding optical module. For example, the first processor 402, the transceiver 410, and/or the second processor 404 send via the second processor 404 and the OOB interface 412 requests, updated parameters and/or signal integrity ranges to the optical modules 600, 700, 800, 900, which store the requests, updated parameters and/or signal integrity ranges in the registers 682, 781, 882, 982. The requests, updated parameters, and/or signal integrity ranges in the registers 682, 781, 882, 982 are then retrieved by the processors 603, 702, 802, 903 and used to set the parameters of the transmitters 638, 738, 838, 938. The requests include increment, decrement, and/or jump requests. Optimized parameter settings are stored and used after a reset and/or power cycling event.

In an embodiment, the lengths of the registers 520, 682, 781, 882, 982 are the same or greater than cursor (pre and post cursor) lengths. Any number of pre and post cursor coefficients are stored for each equalizer. As an example, an equalizer can have 3 precursors and 1 post cursor. As another example, an equalizer can have 4-6 precursors and 1 post cursor. As another example, an equalizer can have 1-2 precursors and 1-3 post cursors. In an embodiment, the registers 520, 682, 781, 882, 982 are configured to store up to 7 pre cursors and up to 8 post cursors. Any step size can be used to adjust tap coefficients when incrementing and decrementing the tap coefficients. As an example, for the implementation having 3 pre cursors $C(-3)$, $C(-2)$, $C(-1)$ and 1 post cursor $C(1)$, the pre cursor $C(-3)$ has a step size of 0.01, the pre cursor $C(-2)$ has a step size 0.02, the pre cursor $C(-1)$ has a step size 0.025, and the post cursor $C(1)$ has a step size 0.04.

In some embodiments, the OOB signaling performed by the host devices and optical modules disclosed herein includes encoded signaling for reading and writing tap values and/or other transmitter parameters, such as power, wavelength, etc. The encoding is weighted and signed or unsigned, such as S8, U8 or U16 encoding, where 'S' refers to signed and 'U' refers to unsigned. S8 refers to signed eight bit encoding supporting 64 increments, where each increment is 0.01 with a normalized tap weight up to ±0.64. U8 encoding includes 128 increments with an increment size of 0.01 and a normalized tap weight of 1.28. In an embodiment, S8 encoding is used to read content for AUI-S and AUI-L presets including current transmitter parameters of a host device and an optical module transmitter parameters from corresponding registers of the host device and optical module.

In an embodiment, the transceiver 410 of the host device 400 of FIGS. 4-5 makes adjustments to parameters of the transmitter 414 based on feedback from the corresponding optical module to, for example, improve a BER of the corresponding in-band link. The transceiver 410 writes via the second processor 404 and the OOB interface 412 to a register of the optical module a length of the equalizer 510 and cursor values for the transmitter 414 of the host device 400. The optical module indicates to the host device 400 via the corresponding OOB interface (e.g., the OOB interface 605) of FIG. 6 whether residual ISI estimation for current cursors is supported. Based on this indication, the transceiver 410 reads a register indicating the cursors of the transmitter of the host device. The transmitter of the host device then sends an in-band signal to the optical module and the optical module determines signal integrity values for the in-band signal. The host device receives feedback from the optical module and adjusts the cursor values of the transmitter of the host device without reading from the register. This process is iteratively performed until a predetermined criteria is satisfied, a predetermined number of iterations are performed, a timeout period has elapsed, and/or the signal integrity values are no longer improving. The host device than records the resultant parameters for the transmitter of the host device that provided the best signal integrity values for subsequent usage. These parameters are stored as a preset for quick access and efficient setting of the transmitter of the host device.

Figure 10:
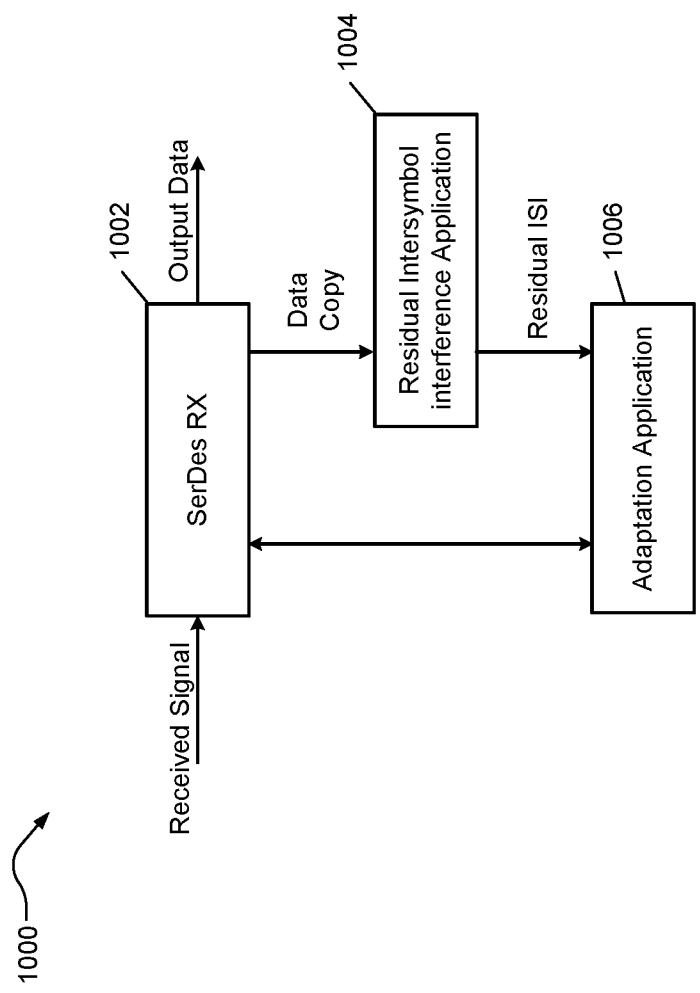
FIG. 10 is a functional block diagram of an example portion of a host device or an optical module having a serializer and deserializer (SerDes) receiver and a residual intersymbol interference (ISI) application for adjusting taps of one or more equalizers in accordance with the present disclosure.

FIG. 10 shows a portion 1000 of a host device or an optical module having a SerDes receiver 1002, a residual ISI application 1004 and an adaptation application 1006. The SerDes receiver 1002 may replace any of the SerDes receivers disclosed herein. The SerDes receiver 1002 receives a signal from a sending device (host device or optical module) and, in an embodiment, equalizes and deserializes the data to provide output data. A copy of the equalized and deserialized output data is provided to the residual ISI application 1004. The residual ISI application 1004 estimates residual ISI of the output data and provides the residual ISI to the adaptation application. The adaptation application 1006 monitors signal integrity values of the received signal and the residual ISI and, based on known aspects of the transmitter of the sending device (host device or optical module) in terms of precursor and postcursor compensation, generates a request to adjust transmitter parameters of the sending device.

Figure 11:
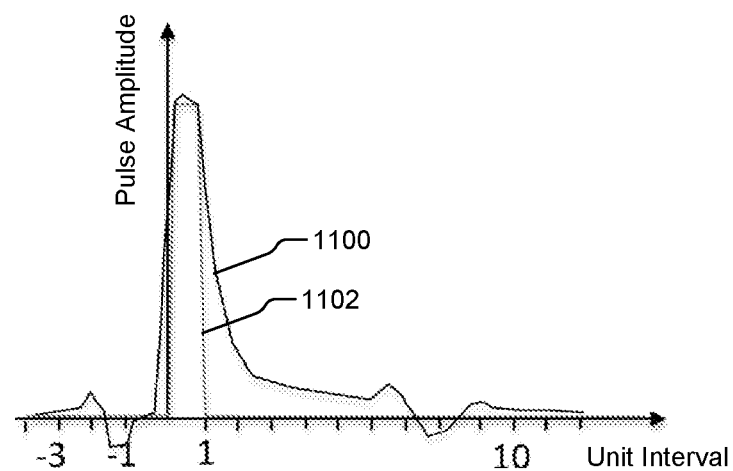
FIG. 11 is an example plot of a received signal pulse received by the SerDes receiver of FIG. 10 and an example plot of a corresponding ideal pulse.
Figure 12:
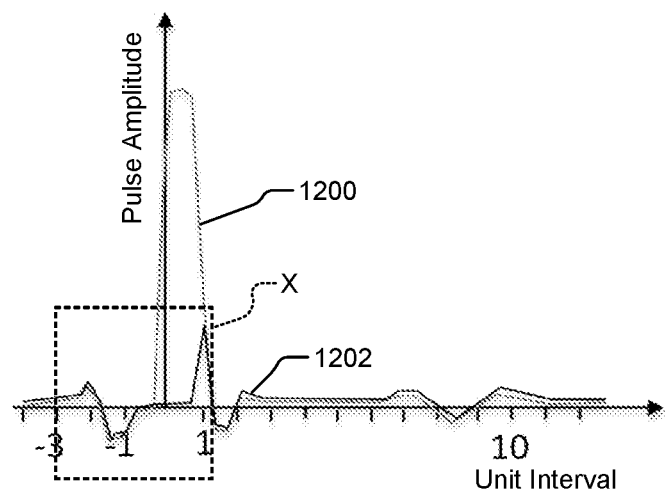
FIG. 12 is an example plot of the received signal pulse of FIG. 11 after equalization and an example plot of the corresponding residual ISI.

The received signal may have significant ISI and distortion. An example of a received signal pulse 1100 is shown in FIG. 11 along with a corresponding ideal pulse 1102. The SerDes receiver 1002 of FIG. 10 operates to restore the received signal to be as close as possible to the ideal pulse. Practically, however the received signal has residual ISI, an example of which is shown in FIG. 12. FIG. 12 shows an example plot of the received signal pulse 1100 of FIG. 11 after equalization, represented as curve 1200, and an example plot of the corresponding residual ISI 1202.

The adaptation application 1006 of FIG. 10 knows the precursor and postcursor ranges. The adaptation application 1006 detects peaks of the residual ISI corresponding to the precursor and postcursor ranges. The peaks are indicative of which cursors to adjust to minimize the ISI. As an example, and for an equalizer having three precursors at unit intervals of −1, −2, −3 and one post cursor at a unit interval of 1, cursors −3, −1 and 1 are adjusted in view of the plot of FIG. 12. Peaks exist at unit time intervals −3, −1 and 1, which correspond respectively to the precursor taps −3 and −1 and postcursor tap 1. The adaptation application 1006, based on the known relationship between the detected peaks and the cursors, generates a request for the taps (the taps −3, −1 and 1) of the transmitter of the sending device to be adjusted. In an embodiment, the taps are of a FFE and the adaptation application 1006 requests for a jump in the tap values invoking a quick reduction in residual ISI.

In an embodiment, the residual ISI application 1004 is used during mission mode operation to detect signal degradation and make small and/or incremental adjustments to settings of the transmitter of the sending device. This is done without introducing errors and to, for example, improve a SNR and/or reduce probability of an error occurring. Mission mode refers to normal operation when: initial status checks have already been performed; link training has been performed or is not being performed; and data is being transmitted between host device and optical module.

In one embodiment, the SerDes receiver 1002, the residual ISI application 1004 and the adaptation application 1006 are implemented at the optical module. In this example, the residual ISI application detects residual ISI and sends a warning message to the host device, which is transmitting data to the optical module. The warning message is an indication of detected degradation in signal quality. In an embodiment, the warning message requests performing high-level or low-level link training. In an embodiment, the residual ISI application 1004 and/or the adaptation application 1006 sends an interrupt to the host device to cause the host device to cease current operation and perform link training.

In another embodiment, the SerDes receiver 1002, the residual ISI application 1004 and the adaptation application 1006 are implemented at the host device. In this example, the residual ISI application detects residual ISI and sends a warning message to the optical module, which is transmitting data to the host device. The warning message is an indication of detected degradation in signal quality. In an embodiment, the warning message requests performing high-level or low-level link training. In an embodiment, the residual ISI application 1004 and/or the adaptation application 1006 sends a request to the optical module to perform link training.

Menu-Based Link Training

Figure 13:
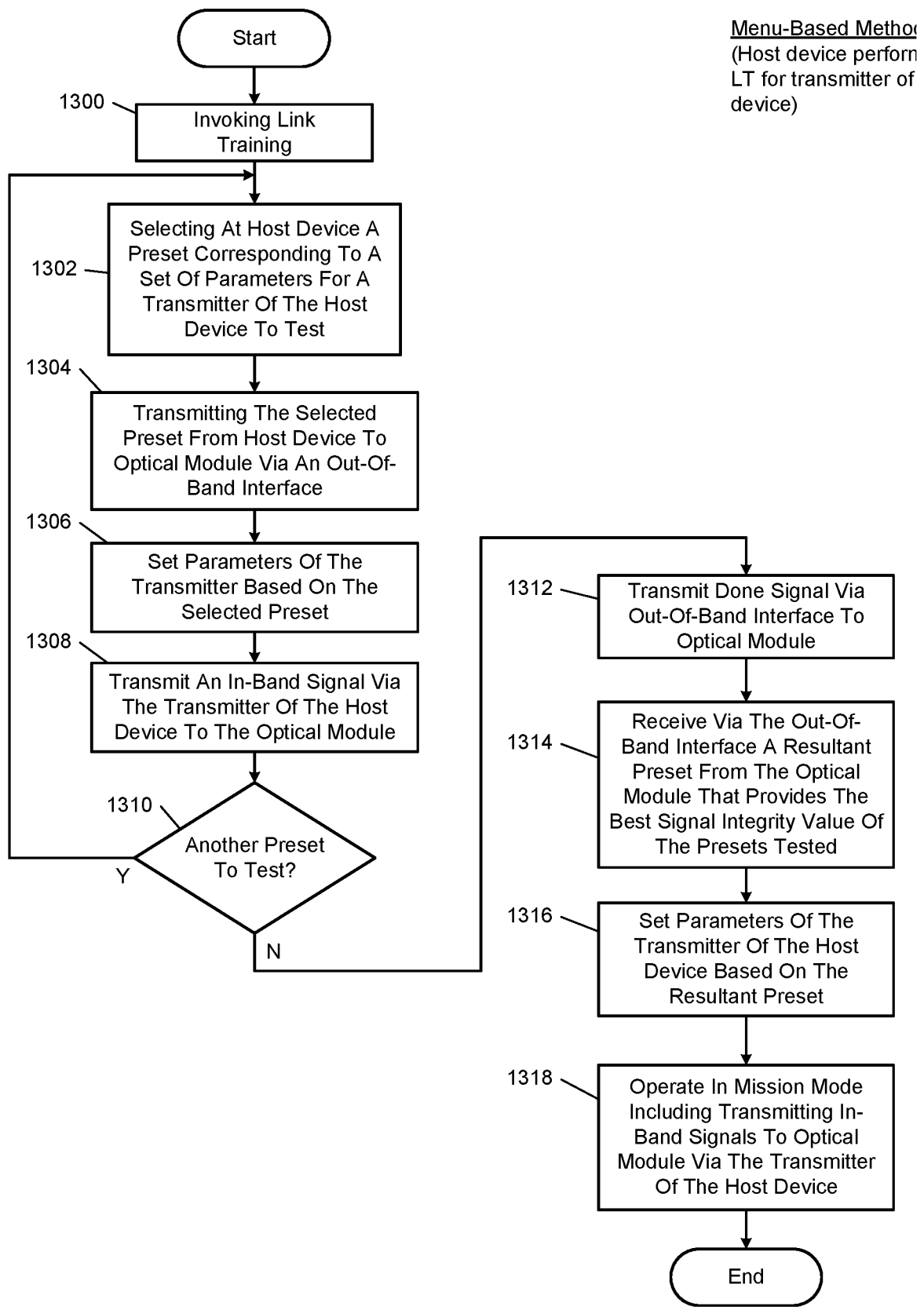
FIG. 13 illustrates a menu-based link training (LT) method implemented by a host device for link training a transmitter of the host device in accordance with the present disclosure.

FIG. 13 shows a menu-based link training (LT) method implemented by a host device 400 for link training a transmitter of the host device 400. Although the following operations are described with respect to the embodiments of FIGS. 5-6, the operations are applicable to the other embodiments disclosed herein.

At 1300, the host device 400 invokes link training (e.g., high-level link training). In an embodiment, this includes the second processor 404, the LT application 408, and/or the adaptation application 418 initiating high-level link training to test a predetermined number of presets of transmitter settings. The presets are part of a "menu" of presets and in one embodiment have respective index values. In one embodiment, the predetermined number of presets is selected, where each of the presets includes predetermined coefficients for the equalizer 510 of the transmitter 414. The presets may be predetermined and stored in the memory 520 and retrieved by the second processor 404.

At 1302, the second processor 404 and/or the LT application 408 selects one of the presets to test. The preset corresponding to a set of parameters for the transmitter 414 of the host device 400 to test. At 1304, the second processor 404 transmits the selected preset, the index value and/or the corresponding transmitter settings to an optical module (e.g., the optical module 600 of FIG. 6) via the OOB interface 412. The optical module 600 stores the presets and corresponding index values and transmitter settings, for example, in memory 680. This allows the optical module 600 to adjust taps of the equalizer 611 for reception of a signal to be transmitted via the in-band interface (or link) between the transmitter 414 and the SerDes receiver 610.

At 1306, the second processor 404 sets parameters of the transmitter 414 based on the selected preset. At 1308, the transmitter 414 transmits an in-band signal from the host device 400 to the SerDes receiver 610 of the optical module 600. At 1310, the second processor 404 determines whether there is another preset to test. In an embodiment, this is based on communication with the LT application 408, which requests for another preset to test. If yes, operation 1302 is performed, otherwise operation 1312 is performed.

At 1312, the second processor 404 transmits a done signal via the OOB interface to the optical module 600 indicating that there are no further presets to test. At 1314, the second processor 404 receives, via the OOB interface 412, a resultant preset (or corresponding index value) from the optical module 600 for the preset that provided a best signal integrity value of the presets tested. In this example, the determination of which preset provided the best signal integrity value is determined at the optical module.

At 1316, the second processor 404 sets the parameters of the transmitter 414 according to the preset (referred to as the "best preset") that provided the best signal integrity value if not already set according to the best preset. At 1318, the host device 400 transitions to operating in a mission mode including transmitting in-band signals to the optical module 600 with the transmitter set according to the best preset. The method may end subsequent to operation 1318.

Figure 14:
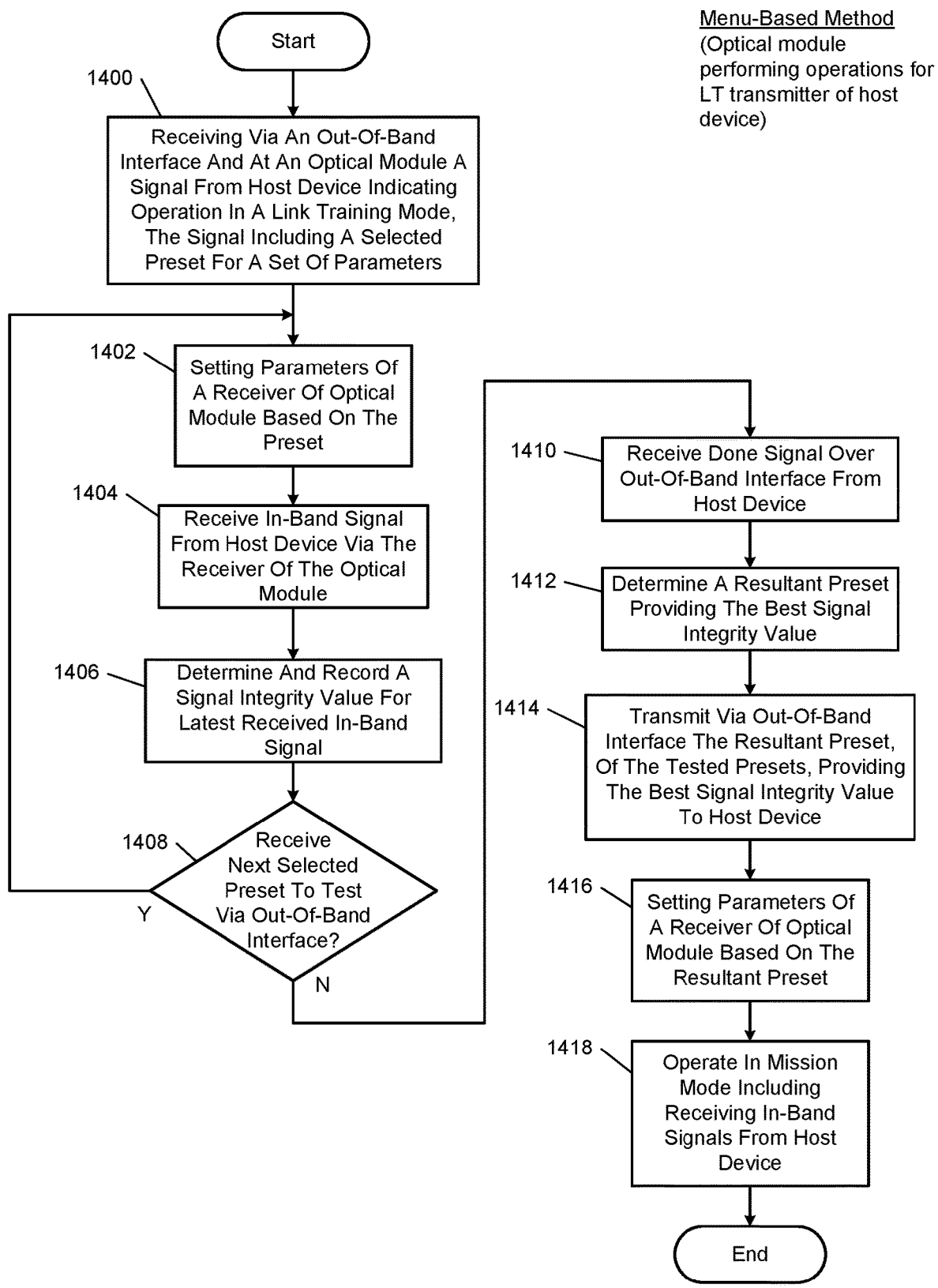
FIG. 14 illustrates a menu-based LT method implemented by an optical module for link training a transmitter of the host device referred to by the method of FIG. 13 in accordance with the present disclosure.

FIG. 14 shows a menu-based LT method implemented by an optical module 600 for link training a transmitter 414 of the host device 400. The method of FIG. 14 may be concurrently performed with the method of FIG. 13. Although the following operations are described with respect to the embodiments of FIGS. 5-6, the operations are applicable to the other embodiments disclosed herein.

At 1400, the second processor 603 receives via the OOB interface 605 a signal from the host device 400 indicating operation in a link training mode. The signal includes a selected preset for a set of parameters of the transmitter 414 of the host device 400. At 1402, the second processor 603 sets parameters of the equalizer 611 of the SerDes receiver 610 based on the selected preset. In an embodiment, this includes adjusting tap values of the equalizer 611 to match or be similar to the tap values associated with the selected preset.

At 1404, the SerDes receiver 610 receives an in-band signal from the transmitter 414. The transmitter 414 being set according to the selected preset. At 1406, the adaptation application 670 determines and records one or more signal integrity values for the latest received in-band signal. The signal integrity values may be stored in the memory 680. At 1408, the second processor 603 determines whether another preset has been selected and indicated via the OOB interface 605. If yes, operation 1402 is performed, otherwise operation 1410 is performed.

At 1410, the second processor 603 may receive a done signal indicating that the testing of presets is done. At 1412, the second processor 603 determines which one of the presets provided the best signal integrity value. For example, the preset that provided the highest SNR and/or the lowest BER is selected. At 1414, the second processor 603 transmits via the OOB interface 605 to the host device 400 the preset and/or index value that provided the best signal integrity value.

At 1416, the second processor 603 sets the SerDes receiver 610 according to the selected preset if not already set according to the selected preset. At 1418, the optical module 600 operates in a mission mode including receiving in-band signals from the host device 400 at the SerDes receiver 610.

Figure 15:
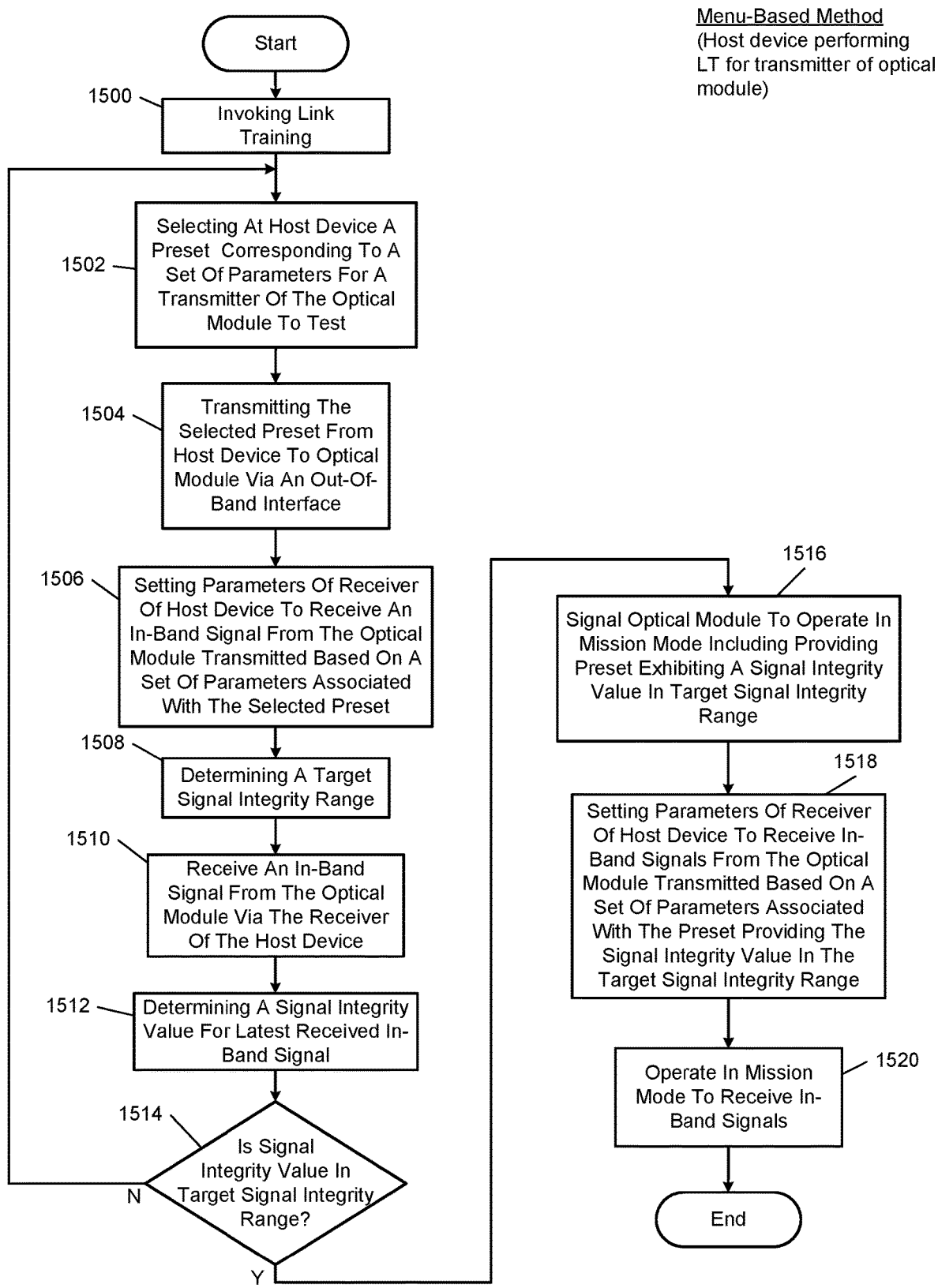
FIG. 15 illustrates a menu-based LT method implemented by a host device for link training a transmitter of an optical module in accordance with the present disclosure.

FIG. 15 shows a menu-based LT method implemented by the host device 400 for link training the transmitter 638 of the optical module 600. Although the following operations are described with respect to the embodiments of FIGS. 5-6, the operations are applicable to the other embodiments disclosed herein.

At 1500, the host device 400 invokes link training (e.g., high-level link training). In an embodiment, this includes the second processor 404 and/or the LT application 408 initiating high-level link training to test a predetermined number of presets of transmitter settings. At 1502, the second processor 404 and/or the LT application 408 selects one of the presets to test. The preset corresponding to a set of parameters for the transmitter 638 of the optical module 600 to test.

At 1504, the second processor 404 transmits the selected preset, the index value and/or the corresponding transmitter settings to an optical module (e.g., the optical module 600 of FIG. 6) via the OOB interface 412. At 1506, the second processor 404 sets parameters of the SerDes receiver 416. In an embodiment, this includes setting taps of the equalizer 512 to match or be similar to coefficients associated with the selected preset.

At 1508, the second processor 404 and/or LT application 408 may determine one or more target signal integrity ranges. In an embodiment, this includes the second processor 404 and/or LT application 408 selecting or obtaining a SNR range and/or a BER range that is acceptable. In an embodiment, the target SNR range and/or a BER range is stored in the memory 520 and accessed by the second processor 404. At 1510, the SerDes receiver 416 receives an in-band signal from the transmitter 638 of the optical module 600.

At 1512, the adaptation application 418 determines one or more signal integrity values for the latest received in-band signal. The signal integrity values include a SNR value, a BER, and/or other signal integrity values. At 1514, the second processor 404 and/or LT application 408 determines whether the one or more signal integrity values are in the target signal integrity range(s). If yes, operation 1516 is performed, otherwise operation 1502 is performed.

At 1516, the second processor 404 signals the optical module to operate in mission mode including providing the preset and/or index value exhibiting one or more signal integrity values in the one or more target signal integrity ranges via the OOB interface 605. If more than one preset satisfies this criteria, then the preset providing the best signal integrity values is provided. At 1518, the second processor 404 sets parameters of the SerDes receiver 416 according to the preset indicated at 1516 such that the SerDes receiver 416 is configured to receive in-band signals from the optical module 600. At 1520, the host device 400 transitions to operating in a mission mode such that the SerDes receiver 416 receive in-band signals from the optical module while being configured according to the preset indicated at 1516.

Figure 16:
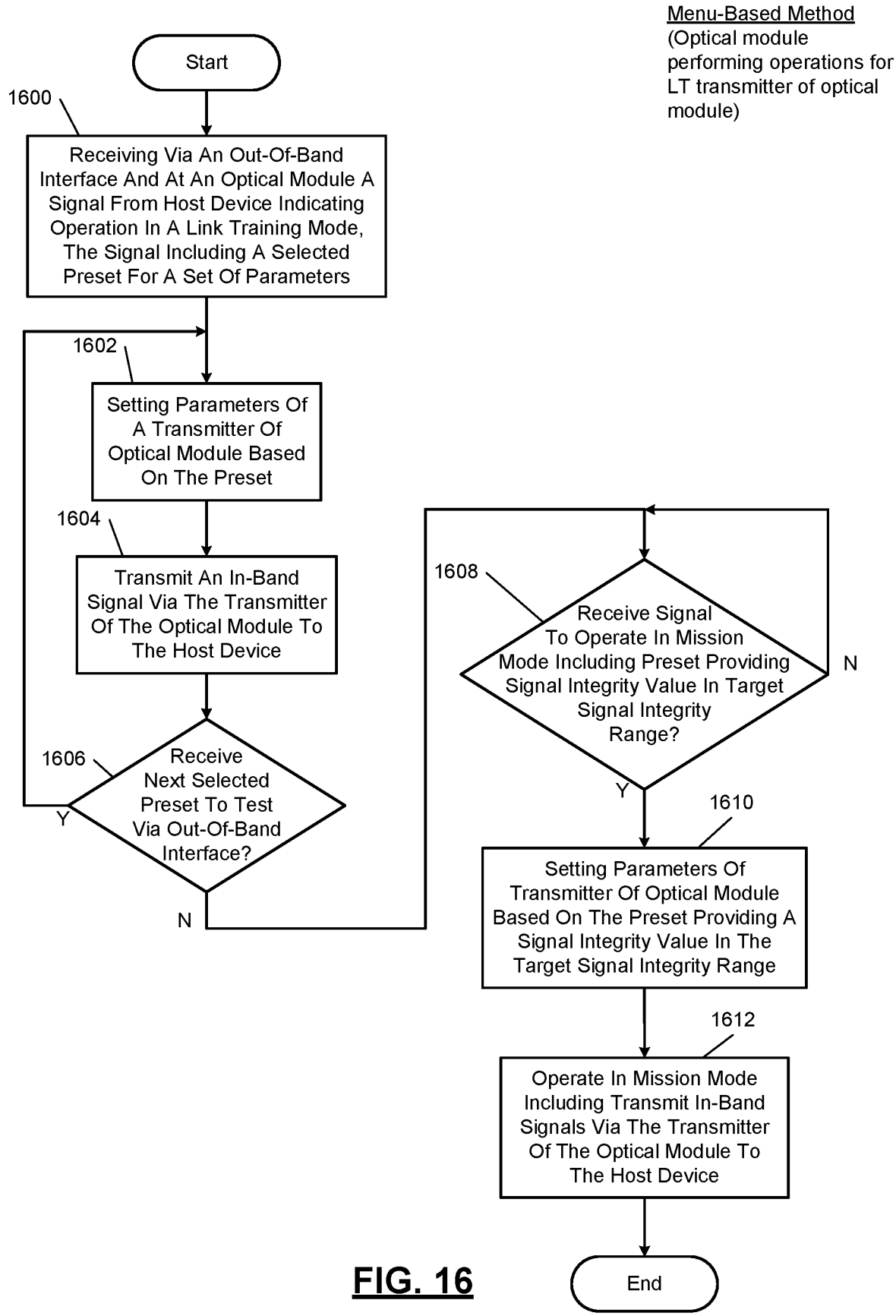
FIG. 16 illustrates a menu-based LT method implemented by an optical module for link training a transmitter of the optical module referred to by the method of FIG. 15 in accordance with the present disclosure.

FIG. 16 shows a menu-based LT method implemented by the optical module 600 for link training the transmitter 638 of the optical module 600. The method of FIG. 16 may be concurrently performed with the method of FIG. 15. Although the following operations are described with respect to the embodiments of FIGS. 5-6, the operations are applicable to the other embodiments disclosed herein. As an example, at least some of the below described operations may be performed by the third processor 703 and/or driver 783 of FIG. 7.

At 1600, the second processor 603 receives via the OOB interface 605 a signal from the host device 400 indicating operation in a link training mode. The link training mode is a high-level link training mode. The signal includes a selected preset, a corresponding index, and/or the corresponding transmitter settings for the transmitter 638. The preset is for a selected set of transmitter settings, such as a set of coefficients for taps of the transmitter 638.

At 1602, the second processor 603 sets parameters of the transmitter 638 according to the selected preset. At 1604, the transmitter 638 transmits an in-band signal from the optical module 600 to the host device 400. At 1606, the second processor 603 determines whether another preset has been received via the OOB interface 605 to test. If yes, operation 1608 is performed, otherwise operation 1602 is performed.

At 1608, the second processor 603 determines whether a signal has been received via the OOB interface 605 to operate in a mission mode. If yes, operation 1610 is performed. In an embodiment, the signal includes a selected preset providing one or more signal integrity values in one or more target signal integrity ranges and/or providing best signal integrity values.

At 1610, the second processor 603 sets parameters of the transmitter 638 according to the preset providing one or more signal integrity values in one or more target signal integrity ranges and/or providing best signal integrity values if not already set according to this preset. At 1612, the optical module 600 operates in the mission mode including transmitting in-band signals via the transmitter 638 to the host device 400 with the transmitter 638 set according to the preset providing one or more signal integrity values in one or more target signal integrity ranges and/or providing best signal integrity values.

In an embodiment, the above-described menu-based methods of FIGS. 15-16 are performed in addition to and/or subsequent to performing attachment unit interface (AUI) short (AUI-S) and AUI long (AUI-L) checks. Which includes setting transmitter (or equalizers thereof) i) to a first predetermined set of parameter settings for an AUI-S check, and ii) to a second predetermined set of parameter settings for an AUI-L check. The AUI-S check is used for checking the first predetermined set of parameters used for a shorter range of communication of in-band signals than that associated with used of the second predetermined set of parameters associated with the AUI-L check. In an embodiment, if either of the AUI-S or AUI-L check pass a predetermined criteria, then the methods of FIGS. 15-16 are not performed and the set of parameters associated with the pass are used. In an embodiment, the second processor 404 of the host device 400 of FIGS. 4-5 selects an AUI-S or an AUI-L set of parameter settings for the transmitter of the corresponding optical module.

In one embodiment, the menu-based (or high-level) link training methods include checking 2-15 presets. In another embodiment, the menu-based method includes checking 2 presets. In another embodiment, the menu-based method includes checking 10-15 presets. In one embodiment, 16 presets with 16 respective index values 0-15 are used including an AUI-S preset, and AUI-L preset, a last used AUI preset, a second to last used AUI preset, four reserved presets, and eight user presets. The transmitter settings are not limited to equalizer tap settings and, in some embodiments, include transmission amplitudes, indications of whether encoding is enabled, and/or other transmitter settings.

In some embodiment, the host device and optical module (or link partners) are configured to compare signal integrity values in order to determine a best set of transmitter parameters. In an embodiment and referring again to FIGS. 5-6, this occurs at the first processors 402 and 602. The processors 402, 602 are configured to compare signal integrity values and in an embodiment perform machine learning to determine the best set of signal parameters using digital signal processing. The signal integrity values for each set of transmitter settings can be stored and compared to determine the best set of transmitter settings. The signal integrity values can be measured at multiple different sampling times for each set of transmitter settings, averaged and compared to averages determined for the other sets of transmitter settings. A weighted average can be provided for each set of transmitter settings.

In another embodiment, the processors 402, 602 are configured to use pulse responses to minimize ISI. According to this methodology, after tuning the processors 402, 602 measure the pulse responses and computes a cost function value C, an example of which is represented by equation 1, where $h_i$=the pulse response of the $i^{th}$ cursor of the receiver, and the response of the main tap is excluded from the sum.

$$C = \sum_{i=0}^{N} h_i^2 \qquad (1)$$

In this case, C is determined for each filter (or equalizer) setting of the corresponding transmitter. The set of transmitter parameters (or filter settings) with the lowest C value is selected. A variant of this technique includes determining a weighted sum in computation of the cost function, as represented by equation 2.

$$C = \sum_{i=0}^{N} wi * h_i^2 \qquad (2)$$

During optimization of the link between the link partners, messages are transmitted over the OOB interfaces via the OOB link. In an embodiment, the messages include a common data block (CDB) indicating the selected set of transmitter parameters and/or corresponding index value. The optimization may be performed for each in-band lane (or channel) between the link partners, when there is more than one in-band lane between the link partners.

Multi-Stage Link Setup and Training

Figure 17A:
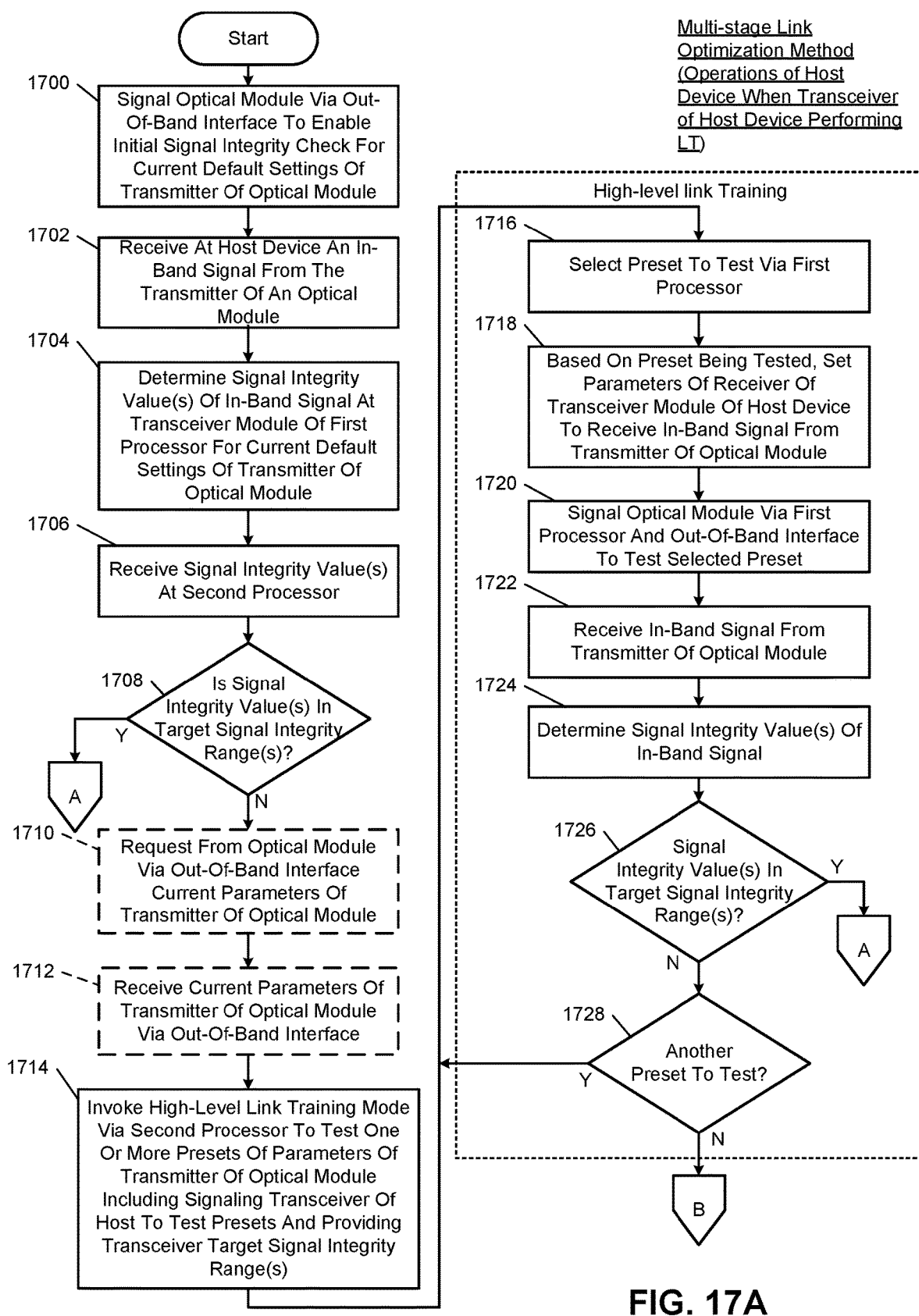
FIGS. 17A-17B (collectively FIG. 17) illustrate a multi-stage link optimization method including operations implemented by a host device when a transceiver of the host device is optionally to perform link training in accordance with the present disclosure.
Figure 17B:
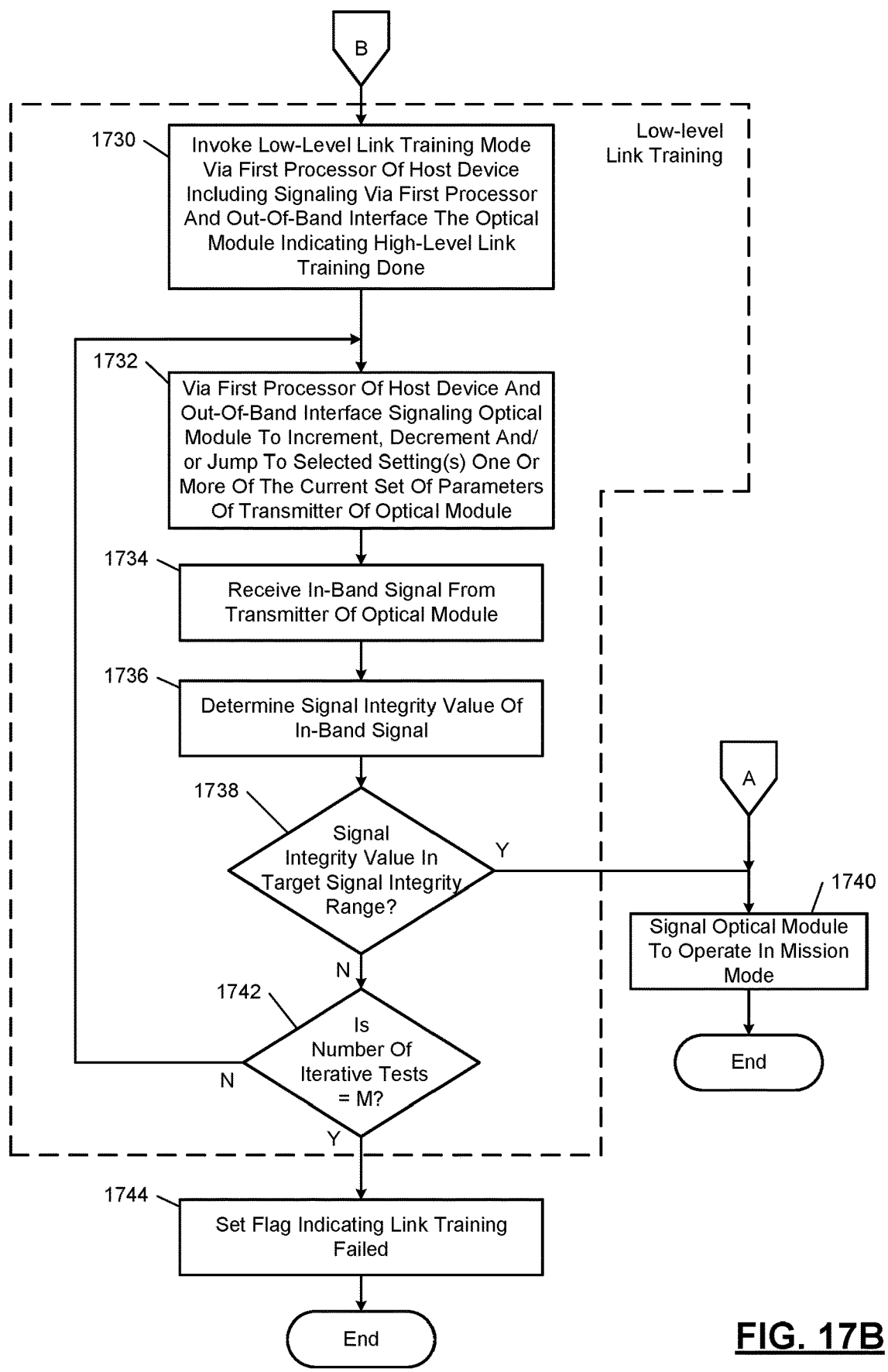

FIG. 17 shows a multi-stage link optimization method including operations implemented by the host device 400 when the transceiver 410 of the host device 400 is optionally to perform link training. Although the following operations are described with respect to the embodiments of FIGS. 5-6, the operations are applicable to the other embodiments disclosed herein.

At 1700, the second processor 404 signals the optical module 600 via the OOB interface 412 to enable an initial signal integrity check for current default settings of the transmitter 638 of the optical module 600. In an embodiment, the default settings are the last settings used or predetermined initial settings. The last settings are settings previously determined as satisfying target criteria and/or are the settings that provided the best signal integrity values of previously tested sets of transmitter parameters. In an embodiment, the current settings include normalized equalizer coefficients for taps of the equalizer 640. In an embodiment, the initial integrity check includes testing presets associated with AUI-S and/or AUI-L, as similarly described above. In an embodiment, the initial signal integrity check includes checking a BER for a pseudorandom binary sequence.

At 1702, the SerDes receiver 416 receives an in-band signal from the transmitter 638 of the optical module 600. In an embodiment, the in-band signal is received based on the signal sent at 1700. At 1704, the adaptation application 418 determines one or more signal integrity values associated with the received in-band signal.

At 1706, the one or more signal integrity values are provided from the first processor 402 and adaptation application 418 to the second processor 404. At 1708, the second processor 404 determines whether the one or more signal integrity values satisfy the predetermined criteria, such as are within one or more target signal integrity ranges. If yes, operation 1740 is performed, otherwise one of operations 1710 and 1714 is performed. Operations 1710 and 1712 are optionally performed.

At 1710, the second processor 404 may send a request to the optical module 600 via the OOB interface requesting what the current parameter settings are for the transmitter 638. The current parameter settings include coefficients of taps of the equalizer 640, transmission amplitude of the transmitter 638, whether encoding of the transmitter 638 is enabled, etc. At 1712, the second processor 404 may receive the current parameter settings of the transmitter 638 from the optical module 600 via the OOB interface 412.

At 1714, the second processor 404 invokes the high-level link training mode to test one or more presets of parameters for the transmitter 638 of the optical module 600. This includes signaling the transceiver 410 of the host device 400 to test presets and providing the transceiver 410 one or more target signal integrity ranges.

The following operations 1716, 1718, 1720, 1722, 1724, 1726 and 1728 are performed during the high-level link training. At 1716, the first processor 402, the adaptation application 418, and/or the LT application 408 selects one of the one or more presets to test. The selected preset includes transmitter parameter settings such as coefficients of taps of the equalizer 640, a transmission amplitude of the transmitter 638, whether encoding of the transmitter 638 is enabled, etc.

At 1718, the first processor 402, the adaptation application 418, and/or the LT application 408, based on the selected preset, sets parameters of the SerDes receiver 416 of the host device 400 to receive an in-band signal from the transmitter 638. At 1720, the first processor 402 signals the optical module 600 via the second processor 404 and the OOB interface 412 to test the selected preset.

At 1722, the SerDes receiver 416 receives an in-band signal from the transmitter 638. At 1724, the adaptation application 418 determines one or more signal integrity values of the in-band signal. At 1726, the adaptation application 418, the LT application 408 and/or the first processor 402 determines whether the signal integrity values satisfy a predetermined criteria (e.g., are within target signal integrity ranges). If yes, operation 1740 is performed, otherwise operation 1728 is performed.

At 1728, the adaptation application 418, the LT application 408 and/or the first processor 402 determines whether there is another preset to test. If yes, operation 1716 is performed, otherwise operation 1730 is performed.

The following operations 1730, 1732, 1734, 1736, 1738, 1742 are performed during the low-level link training mode. At 1730, the first processor 402 invokes the low-level link training mode including signaling the optical module 600 via the second processor 404 and the OOB interface 412 that high-level link training is completed.

At 1732, the first processor 402 signals the optical module 600 via the second processor 404 and the OOB interface 412 to increment, decrement, or jump to one or more selected parameter settings for the transmitter 638. In one embodiment, when a jump is performed, a different (or new) set of tap coefficient values are used. One or more coefficients are adjusted. Each coefficient is incremented, decremented, maintained at a same value, or jumped to a new value.

At 1734, the SerDes receiver 416 receives an in-band signal from the transmitter 638 while the transmitter 638 is configured according to the selected parameter settings. At 1736, the adaptation application 418 determines one or more signal integrity values for the in-band signal.

At 1738, the adaptation application 418, the LT application 408 and/or the first processor 402 determines whether the one or more signal integrity values are within the one or more target signal integrity ranges. If yes, operation 1740 is performed, otherwise operation 1742 is performed.

At 1740, the second processor 404 signals the optical module 600 to operate in a mission mode including transmitting in-band signals via the transmitter 638 while the transmitter 638 is configured according to the last set of the parameter settings and/or the best set of parameter settings for the test performed. The signal transmitted to the optical module 600 via the OOB interface 412 indicates the selected parameter settings for the transmitter 638. The method may end subsequent to operation 1740.

At 1742, the adaptation application 418, the LT application 408 and/or the first processor 402 determines whether a number of iterative tests of parameter settings performed for the current iteration of the low-level link training process is equal to a predetermined number of tests M, where M is an integer greater than 1. Each test includes performing operations 1730, 1732, 1734, 1736, 1738, 1742. In an embodiment, M is equal to 10-50. If yes, operation 1744 is performed, otherwise operation 1732 is performed.

At 1744, the first processor 402 and/or the second processor 404 may generate set a flag indicating link training failed and prevent operation in the mission mode. Setting of the flag may be indicative of a faulty host device, optical module, and/or the predetermined target signal integrity values are set too high or low causing the flag to be set.

Figure 18A:
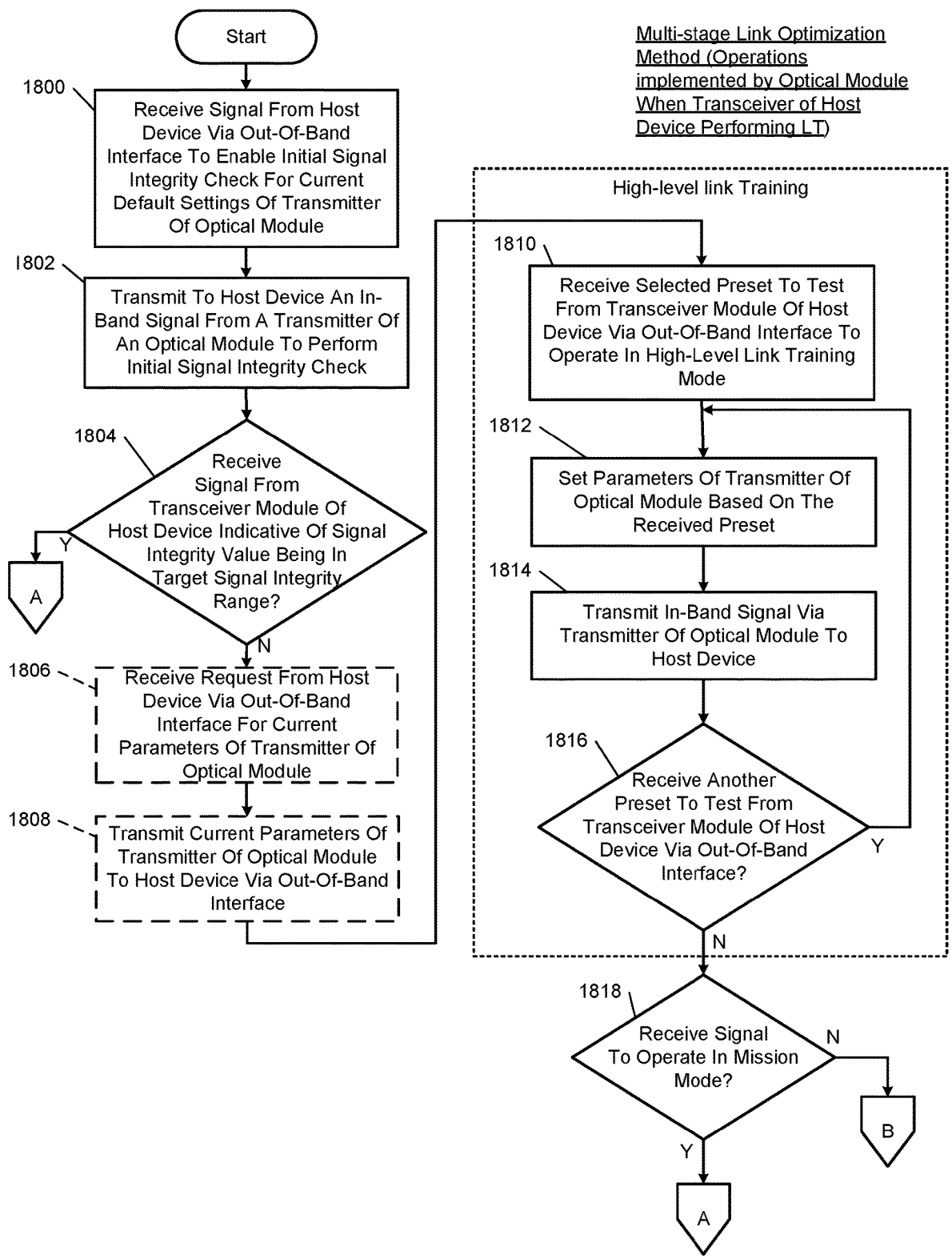
FIGS. 18A-18B (collectively FIG. 18) illustrate a multi-stage link optimization method including operations implemented by an optical module when a transceiver of host device is optionally to perform link training in accordance with the present disclosure.
Figure 18B:
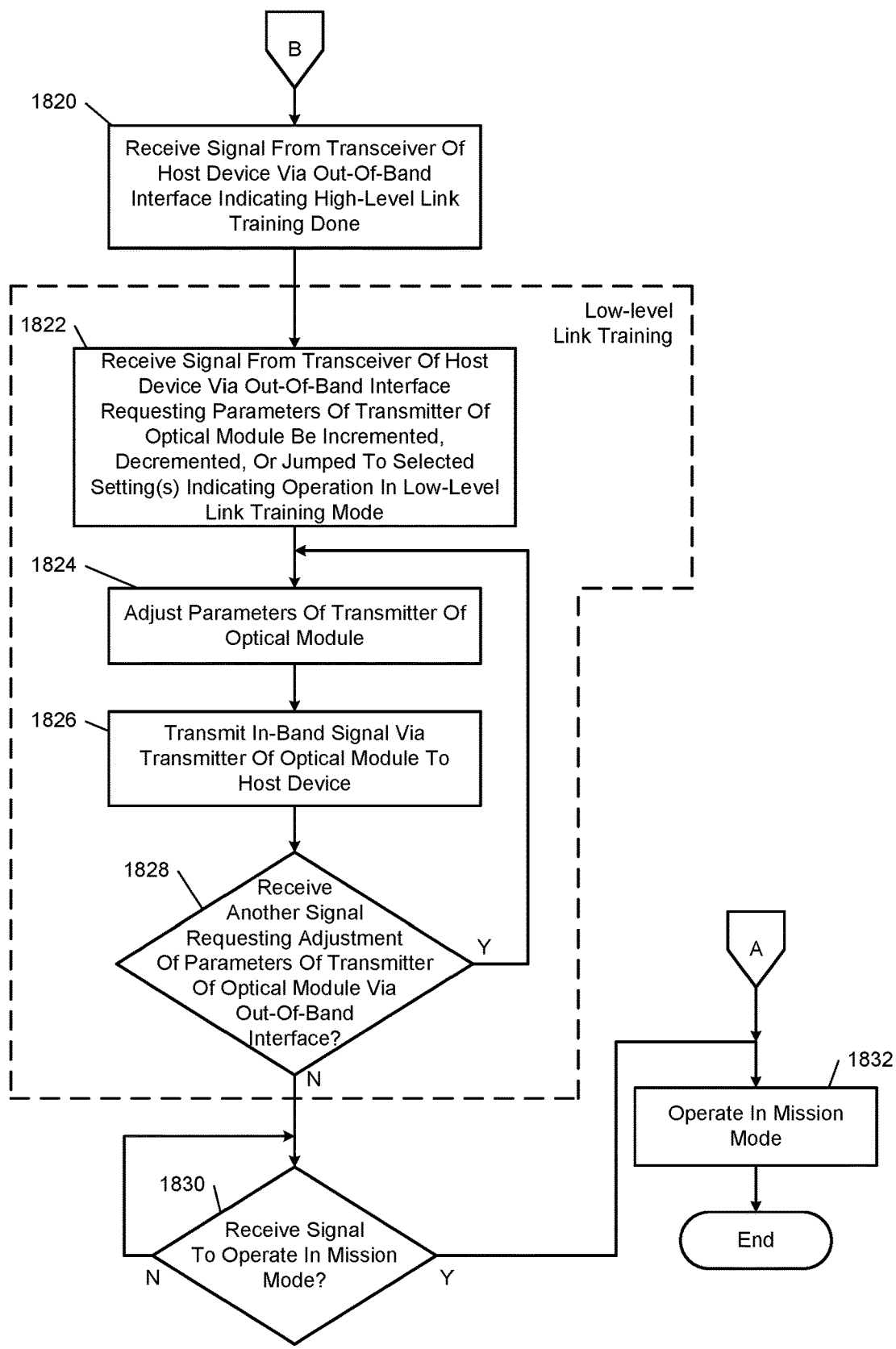

FIG. 18 shows a multi-stage link optimization method including operations implemented by the optical module 600 when the transceiver 402 of the host device 400 is optionally to perform link training. This method may be performed concurrently with the method of FIG. 17. Although the following operations are described with respect to the embodiments of FIGS. 5-6, the operations are applicable to the other embodiments disclosed herein.

At 1800, the second processor 603 receives a signal from the host device 400 via the OOB interface 605 to enable an initial signal integrity check for current default settings of the transmitter 638. At 1802, the transmitter 638 transmits to the host device an in-band signal to perform the initial integrity check.

At 1804, the second processor 603 determines whether a signal has been received from the host device 400 via the OOB interface 605, where the signal indicates whether one or more signal integrity values for the in-band signal are within the one or more target signal integrity ranges. If yes, operation 1832 is performed, otherwise one of operations 1806 or 1810 is performed.

At 1806, the second processor 603 receives a request from the host device 400 via the OOB interface 605 request the current parameter settings of the transmitter 638. At 1808, the second processor 603 transmits the current parameter settings of the transmitter 638 to the host device 400 via the OOB interface 605.

The following operations 1810, 1812, 1814, 1816 are performed during the high-level link training mode. At 1810, the second processor 603 receives a selected preset, corresponding index value and/or corresponding parameter settings to test from the host device via the OOB interface 605.

At 1812, the second processor 603 sets parameters of the transmitter 638 based on the selected preset. At 1814, the transmitter 638 transmits an in-band signal to the host device 400. At 1816, the second processor 603 determines whether another selected preset has been received to test. If yes, operation 1812 is performed, otherwise operation 1818 is performed.

At 1818, the second processor 603 determines whether a signal has been received via the OOB interface 605 to operate in the mission mode. If yes, operation 1832 is performed, otherwise operation 1820 is performed. At 1820, the second processor 603 receives a signal from the transceiver 410 of the host device 400 via the OOB interface 605 indicating high-level link training is completed.

The following operations 1822, 1824, 1826, 1828 are performed during the low-level link training mode. At 1822, the second processor 603 receives a signal from the transceiver 410 of the host device via the OOB interface 605 indicating to operate in the low-level link training mode and to increment, decrement, or jump to one or more selected parameter settings.

At 1824, the second processor 603 adjusts parameters of the transmitter 638 according to the signal received at 1822. At 1826, the transmitter 638 transmits an in-band signal to the host device while the transmitter 638 is configured according to the signal received at 1822.

At 1828, the second processor 603 determines whether another signal has been received from the host device via the OOB interface 605 to adjust one or more parameters of the transmitter 638. If yes, operation 1824 is performed, otherwise operation 1830 is performed.

At 1830, the second processor 603 determines whether a signal has been received to operate in the mission mode. If yes, operation 1832 is performed. The signal indicates the selected parameter settings for the transmitter 638. At 1832, the optical module 600 operates in the mission mode including the transmitter 638 transmitting in-band signals to the host device 400 while being configured according to the selected parameter settings.

Figure 19A:
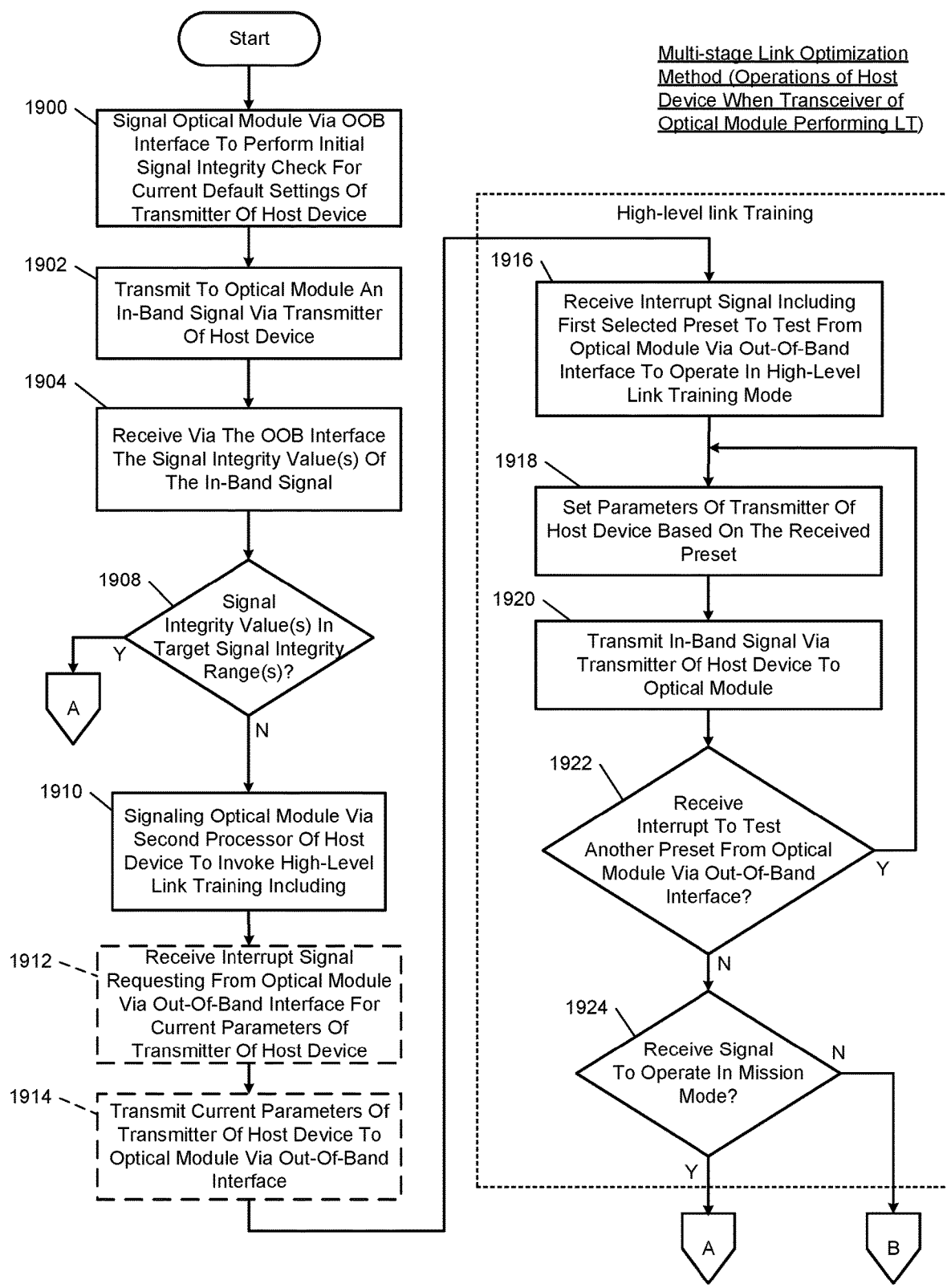
FIGS. 19A-19B (collectively FIG. 19) illustrate a multi-stage link optimization method including operations implemented by a host device when a transceiver of an optical module is optionally to perform link training in accordance with the present disclosure.
Figure 19B:
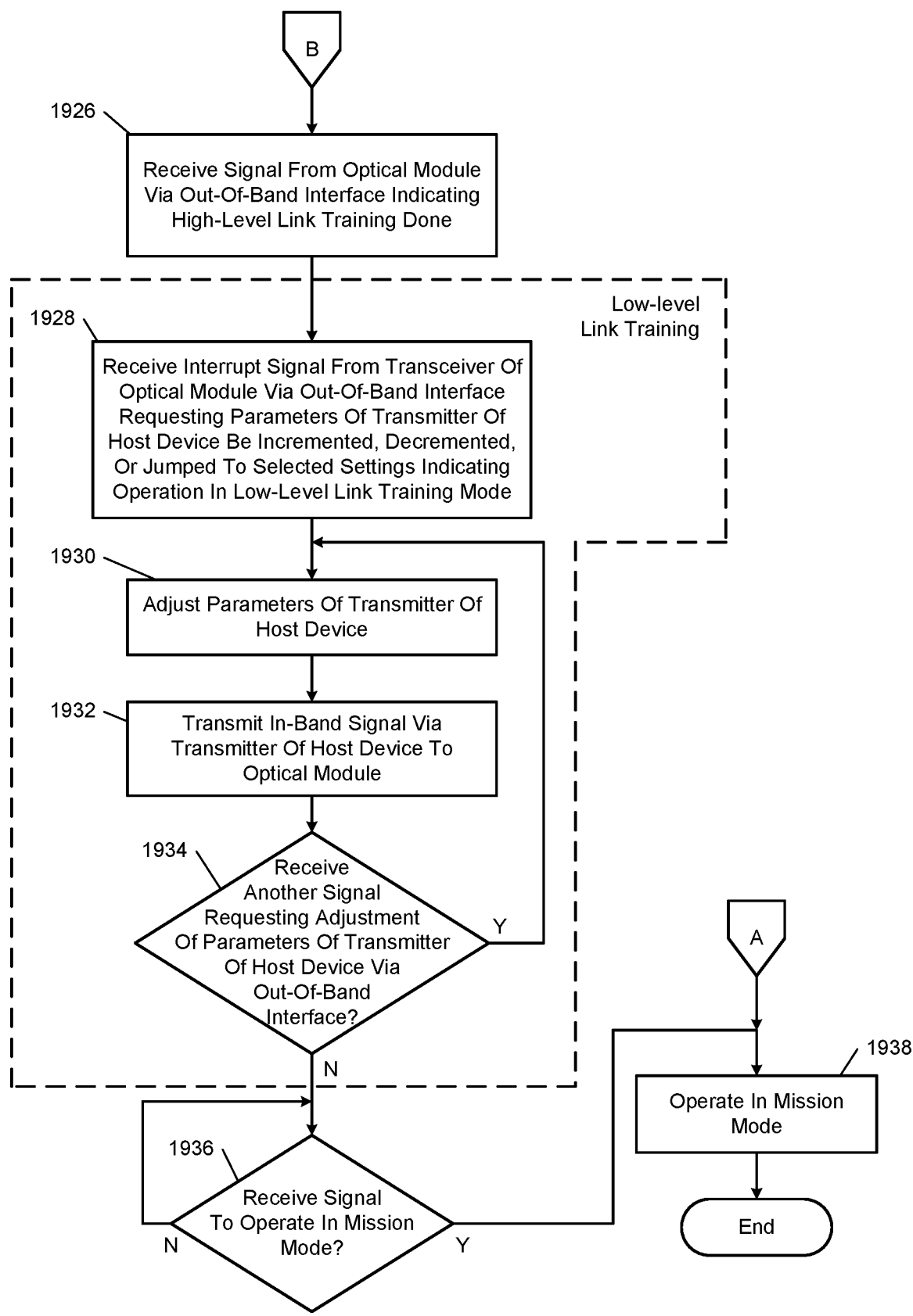

FIG. 19 shows a multi-stage link optimization method including operations implemented by the host device 400 when the transceiver 410 of an optical module 600 is optionally to perform link training. Although the following operations are described with respect to the embodiments of FIGS. 5-6, the operations are applicable to the other embodiments disclosed herein.

At 1900, the second processor 404 enables an initial signal integrity check for current default settings of the transmitter 414 of the host device 400. This includes the second processor 404 signaling the optical module via the OOB interface 412 to perform the initial signal integrity check. In an embodiment, this further includes the second processor 404 determining a predetermined criteria such as one or more target signal integrity ranges and indicating the predetermined criteria to the optical module via the OOB interface 412. In an embodiment, the current settings include normalized equalizer coefficients for taps of the equalizer 510. In an embodiment, the initial signal integrity check includes testing presets associated with AUI-S and/or AUI-L, as similarly described above. In an embodiment, the initial signal integrity check includes checking a BER for a pseudorandom binary sequence.

At 1902, the transmitter 414 transmits an in-band signal to the optical module for signal integrity checking purposes. At 1904, the second processor 404 receives via the OOB interface 412 i) one or more signal integrity values for the in-band signal, and/or ii) an indication of whether the in-band signal satisfied the predetermined criteria such as having signal integrity values that are within the one or more predetermined target signal integrity ranges.

At 1908, the second processor 404 determines whether the in-band signal passed the predetermined criteria. If yes, operation 1938 is performed, otherwise operation 1910 is performed. At 1910, the second processor 404 invokes high-level link training by signaling the optical module 600 via the OOB interface 412. In an embodiment, this includes transmitting the predetermined criteria including the one or more target signal integrity values to the optical module if not already provided to the optical module.

Operations 1912 or 1916 may be performed subsequent to operation 1910. At 1912, the second processor 404 receives an interrupt signal requesting from the optical module via the OOB interface 412 to provide the current parameters of the transmitter 414 of the host device 400. The current parameter settings include coefficients of taps of the equalizer 510, transmission amplitude of the transmitter 414, whether encoding of the transmitter 414 is enabled, etc. At 1914, the second processor 404 transmits the current parameters of the transmitter 414 to the optical module via the OOB interface 412.

The following operations 1916, 1918, 1920, 1922, 1924 are performed during the high-level link training mode. At 1916, the second processor 404 operates in the high-level link training mode and receives an interrupt signal and a first selected preset to test from the optical module via the OOB interface 412. The selected preset and other presets include corresponding parameter settings such as coefficients of taps of the equalizer 510, transmission amplitude of the transmitter 414, whether encoding of the transmitter 414 is enabled, etc.

At 1918, the second processor 404 sets the parameters of the transmitter 414 according to the received and selected preset. At 1920, the transmitter 414, while configured according to the selected preset, transmits an in-band signal to the optical module.

At 1922, the second processor 404 determines whether an interrupt signal has been received from the optical module to test another preset to test. If yes, operation 1918 is performed, otherwise operation 1924 is performed. At 1924, the second processor 404 determines whether a signal has been received to operate in the mission mode. If yes, operation 1938 is performed, otherwise operation 1926 is performed. At 1926, the second processor 404 receives a signal from the optical module via the OOB interface 412 indicating that high-level link training is completed.

The following operations 1928, 1930, 1932, and 1934 are performed during the low-level link training mode. At 1928, the second processor 404 receives an interrupt signal from transceiver 602 of the optical module via the OOB interface 412 requesting one or more parameters of the transmitter 414 be incremented, decremented, or jumped to one or more selected parameter settings. The signal may be transmitted by the second processor 603 to the second processor 404 via the OOB interface 605.

At 1930, the second processor 603 adjusts parameters of the transmitter 414 according to the selected parameter settings. At 1932, the transmitter 414 transmits an in-band signal to the optical module while configured according to the selected parameter settings.

At 1934, the second processor 404 determines whether another signal has been received via the OOB interface 412 requesting adjustment of one or more parameters of the transmitter 414. If yes, operation 1930 is performed, otherwise operation 1936 is performed.

At 1936, the second processor 404 determine whether a signal has been received via the OOB interface 412 to operate in the mission mode. If yes, operation 1938 is performed. The signal indicates a preset, an index value and/or a selected set of parameters for the transmitter 414. This is a result of performing the low-level link training mode. The selected set of parameters have satisfied the predetermined criteria and/or have been provided the best signal integrity values of the sets of parameters tested. At 1938, the host device 400 operates in the mission mode including transmitting in-band signals via the transmitter 414 to the optical module while the transmitter 414 is configured according to the selected set of parameter settings.

Figure 20A:
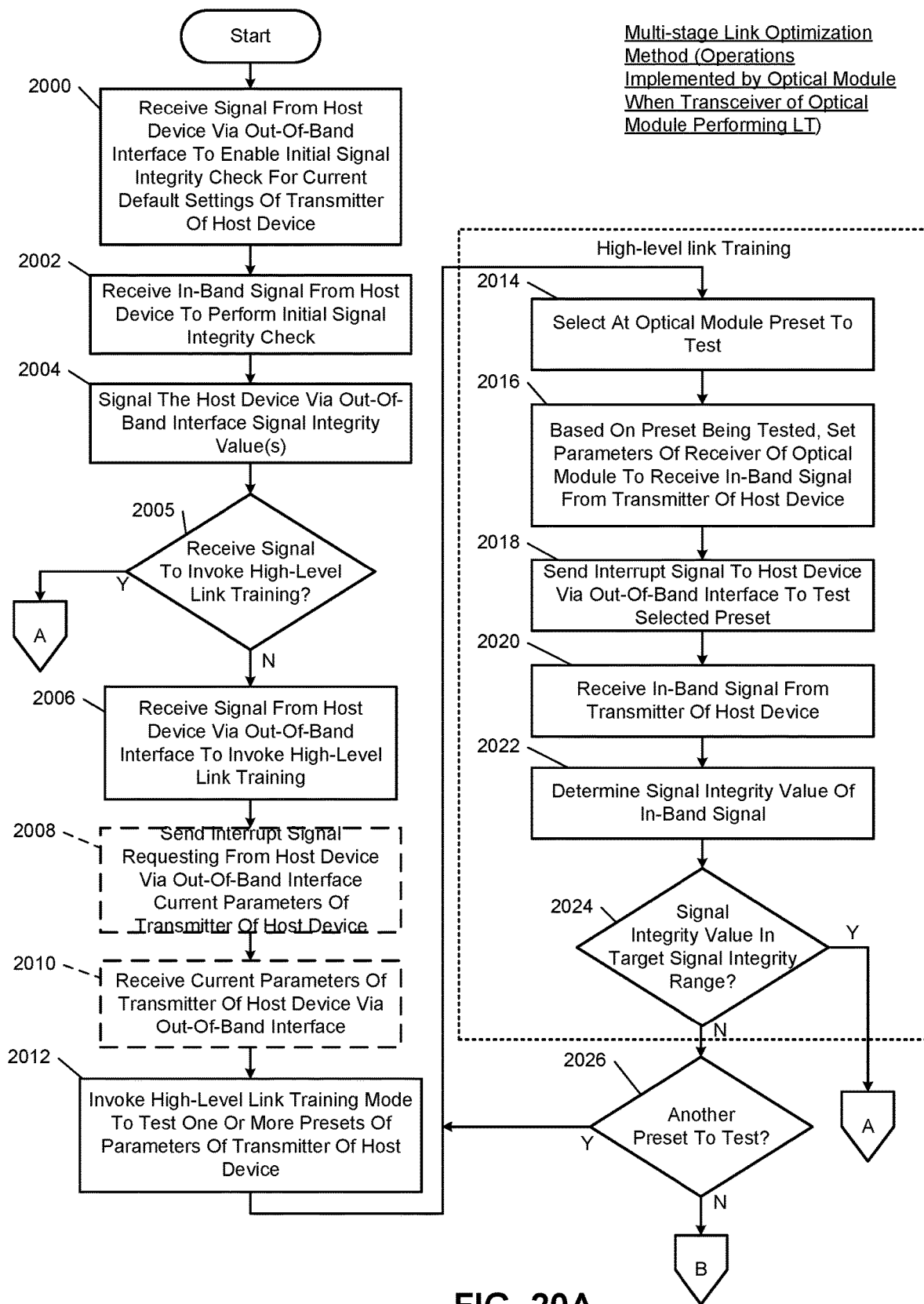
FIGS. 20A-20B (collectively FIG. 20) illustrate a multi-stage link optimization method including operations implemented by an optical module when a transceiver of the optical module is optionally to perform link training in accordance with the present disclosure.
Figure 20B:
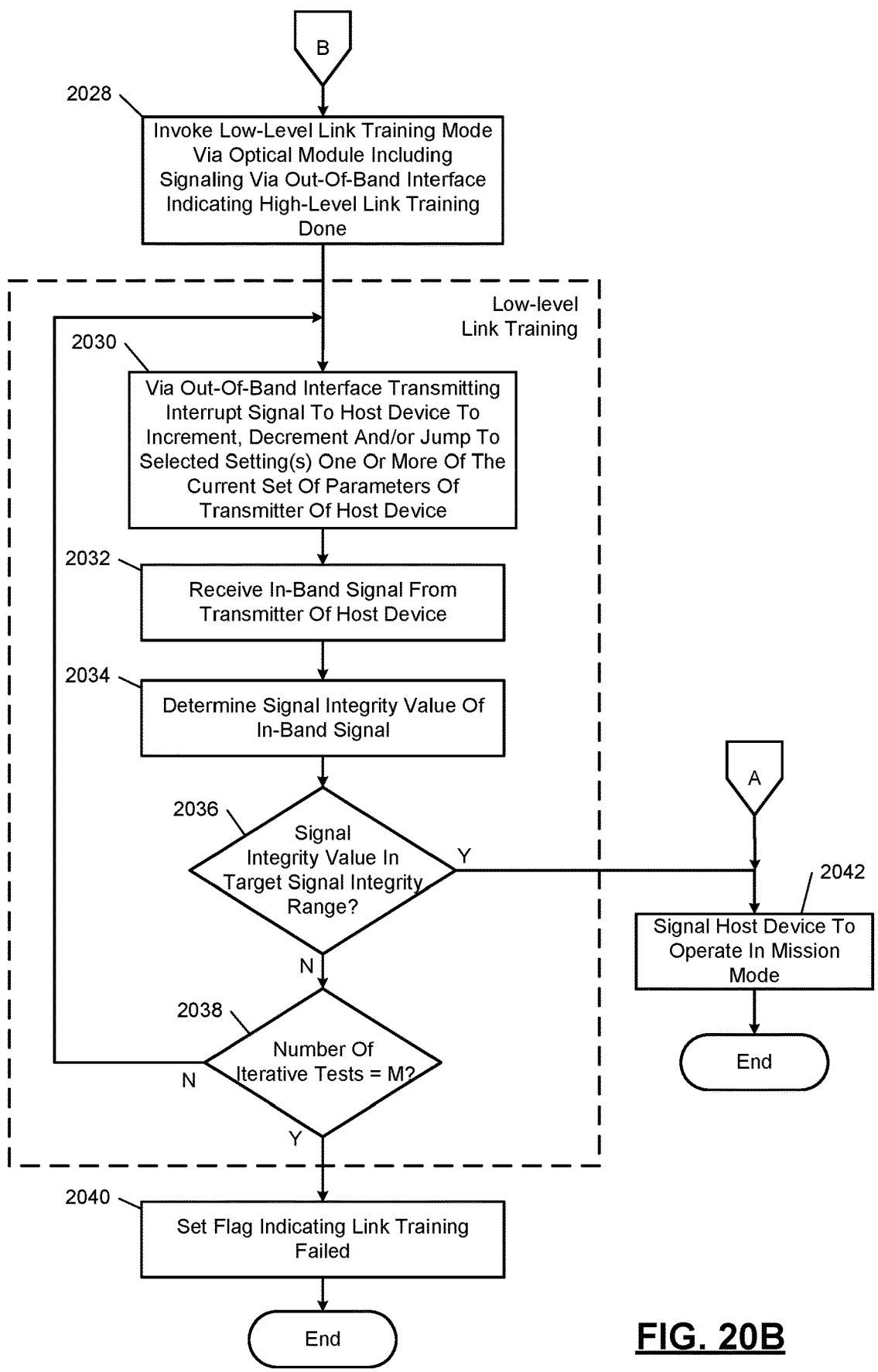

FIG. 20 shows a multi-stage link optimization method including operations implemented by the optical module 600 when the transceiver 602 of the optical module 600 is optionally to perform link training. Although the following operations are described with respect to the embodiments of FIGS. 5-6, the operations are applicable to the other embodiments disclosed herein. As an example, at least some of the operations of FIG. 20 are optionally performed by the third processor 703 and/or driver 783 of FIG. 7.

At 2000, the second processor 603 of the optical module receives a signal from the host device 400 via the OOB interface 605 enabling an initial signal integrity check for current default settings of the transmitter 414 of the host device 400. At 2002, the SerDes receiver 610 receives an in-band signal from the transmitter 414.

At 2004, the adaptation application 670 and/or the second processor 603 signals the host device via the OOB interface 605 the signal integrity values and the host device 400 determines whether the signal integrity values satisfy the predetermined criteria. At 2005, the second processor 603 determines whether a signal has been received from the host device 400 via the OOB interface to invoke the high-level link training mode. If yes, operation 2006 is performed, otherwise operation 2042 is performed.

As an alternative to operations 2004 and 2005, the adaptation application 670 and/or the second processor 603 optionally determines whether one or more signal integrity values for the in-band signal satisfy the predetermined criteria such that the one or more signal integrity values are within one or more predetermined target signal integrity ranges and signals the host device 400 via the OOB interface 605 this information. In an embodiment, the second processor 603 proceeds to operation 2008 or 2012 and operates in the high-level link training mode.

At 2006, the second processor 603 optionally receives a signal from the host device 400 via the OOB interface 412 to invoke the high-level link training mode. In an embodiment, this includes receiving the predetermined target signal integrity ranges from the host device 400.

At 2008, the second processor 603 sends interrupt signal via the OOB interface 605 requesting from the host device 400 current parameters of the transmitter 414. At 2010, the second processor 603 receives the current parameters of the transmitter 414 from the host device 400 via the OOB interface 605.

At 2012, the second processor 603 invokes the high-level link training mode to test one or more presets of parameter settings for the transmitter 414. In an embodiment, this includes signaling the transceiver 410 of the host device 400 via the OOB interface 605 presets to be tested. At 2014, the second processor 603 selects one of the presets to test.

At 2016, the second processor 603 sets parameters of the SerDes receiver 610 of optical module 600 according to the selected preset such that tap values of the SerDes receiver 610 match or are similar to the coefficients of the selected preset. At 2018, the second processor 603 sends interrupt signal to the host device via the OOB interface to test the selected preset.

At 2020, the SerDes receiver 610 receives an in-band signal from the transmitter 414 while the transmitter 414 is configured according to the selected preset. At 2022, the adaptation application 670 determines one or more signal integrity values for the in-band signal.

At 2024, the second processor 603 determines whether the one or more signal integrity values satisfy the predetermined criteria such that the one or more signal integrity values are within the one or more predetermined target signal integrity ranges. If yes, operation 2042 is performed, otherwise operation 2026 is performed.

At 2026, the second processor 603 determines whether another preset of parameters is to be tested. If yes, operation 2014 is performed, otherwise operation 2028 is performed. At 2028, the second processor invokes the low-level link training mode including signaling via the OOB interface that high-level link training is completed and to operate in the low-level link training mode.

The following operations 2030, 2032, 2034, 2036, 2038 are performed during the low-level link training mode. At 2030, the second processor 603 transmits interrupt signal to the host device 400 to increment, decrement, or jump one or more parameter settings of the transmitter 414.

At 2032, the SerDes receiver 610 receives an in-band signal from the transmitter 414. At 2034, the second processor 603 determines one or more signal integrity values for the received in-band signal.

At 2036, the second processor 603 determines whether the one or more signal integrity values satisfy the predetermined criteria. If yes, operation 2042 is performed, otherwise operation 2038 is performed.

At 2038, the second processor 603 determines whether a number of iterative tests of parameter settings performed for the current iteration of the low-level link training process is equal to a predetermined number of tests M, where M is an integer greater than 1. Each test includes performing operations 2030, 2032, 2034, 2036, 2038. In an embodiment, M is equal to 10-50. If yes, operation 2040 is performed, otherwise operation 2030 is performed.

At 2040, the second processor 603 sets a flag indicating link training failed. Setting of the flag may be indicative of a faulty host device, optical module, and/or the predetermined target signal integrity values are set too high or low causing the flag to be set.

At 2042, the second processor 603 signals the host device to operate in the mission mode. This includes receiving in-band signals from the host device 400 at the SerDes receiver 610.

The above-described operations of FIGS. 13-20 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Figure 21:
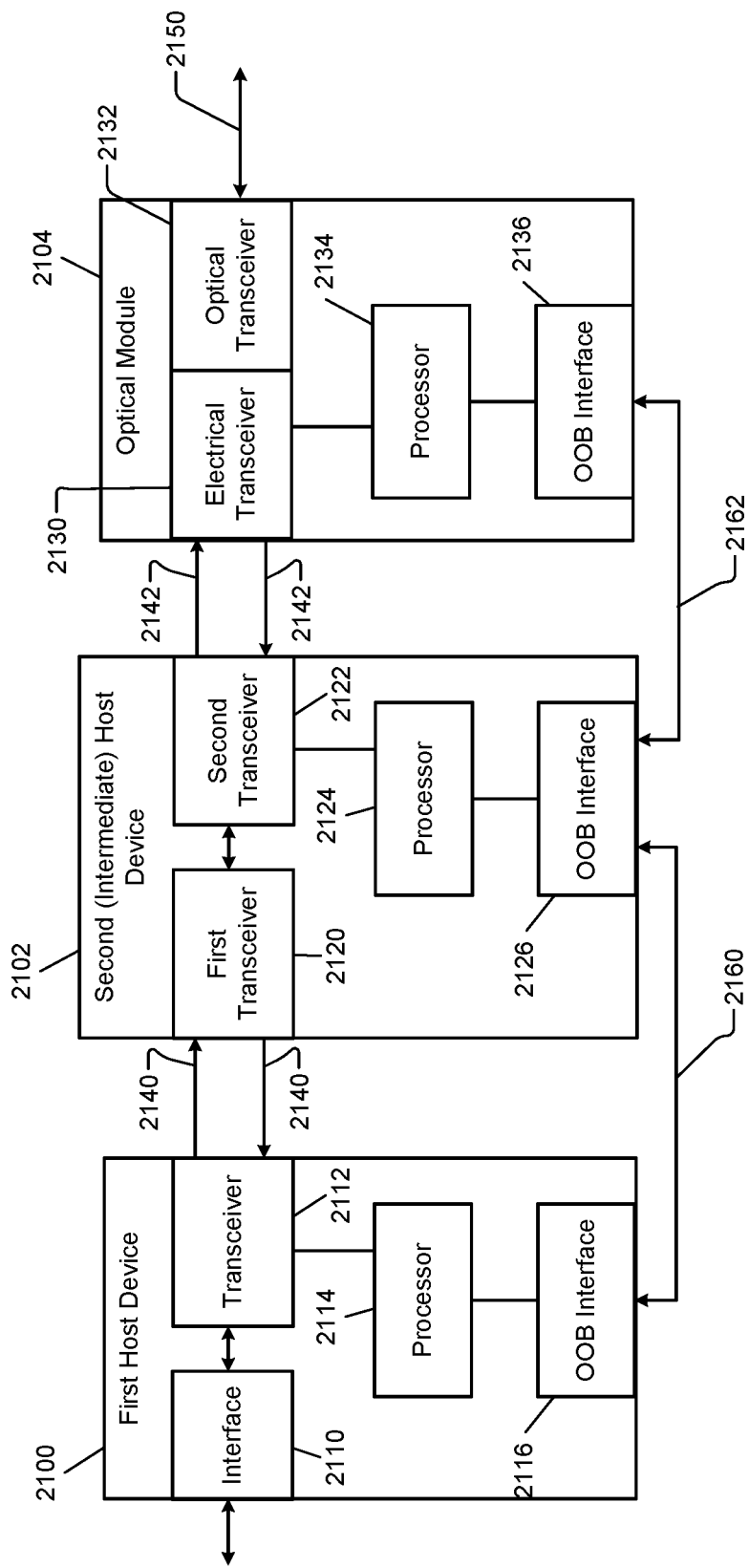
FIG. 21 is a functional block diagram of host devices in cascaded arrangement in accordance with the present disclosure.

FIG. 21 shows a shows a first (or end) host device 2100, a second (or intermediate) host device 2102, and an optical module 2104. In an embodiment, the second host device 2102 and the optical module 2104 are disposed on a same PCB. The first host device 2100 includes an interface 2110, a transceiver 2112, a processor 2114, and an OOB interface 2116. The second host device 2102 includes a first transceiver 2120, a second transceiver 2122, a processor 2124 and an OOB interface 2126. The optical module 2104 includes an electrical transceiver 2130, an optical transceiver 2132, a processor 2134 and an OOB interface 2136. A first in-band electrical link 2140 exists between the transceivers 2112, 2120. A second in-band electrical link 2142 exists between the transceivers 2122, 2130. The interface 2110 is in communication with a switch network, servers, and/or NICs. The optical transceiver 2132 is in communication with another host device via an optical link 2150. OOB electrical links 2160, 2162 exist between the OOB interfaces 2116, 2126, 2136.

Although a single intermediate host device is shown between the host device 2100 and the optical module 2104, any number of intermediate host devices can be connected in series between the first host device 2100 and the optical module 2104. This is referred to as a cascaded configuration having multiple cascaded segments. The in-band electrical links 2140, 2142 are trained using the methods disclosed herein. The in-band electrical links 2140, 2142 are trained serially, concurrently, and/or independently. In an embodiment, clock forwarding dependencies are honored. For example, the transceiver 2112 transmits a first in-band data signal to the transceiver 2120. In an embodiment, the first in-band data signal is a non-return to zero (NRZ) data signal having an embedded clock signal. The first transceiver 2120 performs clock data recovery and synchronizes a clock of the transceiver 2120 to match a frequency of the embedded clock signal. The second transceiver 2122 propagates the received data of the first in-band data signal in a second in-band data signal to the transceiver 2130 via the second in-band electrical link 2142. The second in-band data signal also includes the embedded clock signal, which is then recovered by the transceiver 2130. In this way, the data and clock signal are propagated from segment to segment of the cascaded arrangement. The segments refer to the devices 2100, 2102 and the optical module 2104. This propagation can also occur in the opposite direction from the transceiver 2130 to the second transceiver 2122 and then from the first transceiver 2120 to the transceiver 2112.

Each of the transceivers 2120, 2122 have respective transmitters, SerDes receivers, adaptation applications, and LT applications similar to the transceiver 410 of FIG. 4. Although the host device 2102 is shown having a single OOB interface 2126, in an embodiment, the host device 2102 includes multiple OOB interfaces. For example, the host device 2102 can include two OOB interfaces respectively communicating with the OOB interfaces 2116, 2136. Each of the transceivers 2112, 2120, 2122, 2130 may be referred to as an in-band interface and/or include an in-band interface.

The examples disclosed herein provided bounded and efficient signal integrity checking, setup and link training with minimal associating processing time and memory usage. The examples allow for a link to be quickly evaluated and set after a reset and after a power up. This can occur without link training. Some of the embodiments disclosed herein include link setup and training without use of a host driver. Lack of a host driver is enabled by having a receiver, an adaptation application, and a LT application being implemented in same entity (e.g., a transceiver) and being able to receive and analyze raw in-band signal data. A host processor that is separate from the entity does not receive and analyze raw in-band signal data but rather sends and receives messages to and from the entity and a corresponding link partner (or optical module) via an OOB interface. The disclosed examples also allow the receivers and/or corresponding transceivers of host devices and optical modules to drive link training decisions. The parameter tuning disclosed herein is able to be performed during manufacturing of host devices and optical modules and/or subsequent to manufacturing when the host devices and optical modules are in use.

The above disclosed examples allow for adjusting transmitter settings for in-band links between host devices and optical modules due to, for example, changes caused by changes in temperature, humidity, component performance due to aging, etc. The adjustments are able to be performed when not in a mission mode and while operating in a mission mode.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure. Also, as used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A host device comprising:
 a transmitter configured to transmit in-band signals on an in-band electrical interface from the host device to an optical module, the in-band signals being data signals transmitted to test a link between the host device and the optical module;
 an out-of-band electrical interface configured to transmit first out-of-band messages from the host device to the optical module, and receive second out-of-band messages from the optical module, the first out-of-band messages and the second out-of-band messages being control messages for testing the link; and
 a processor configured to:
  i) perform a plurality of tests to test the link and to select a set of transmitter settings for the transmitter from among a finite plurality of sets of transmitter settings based on a result of the of the tests, wherein each of the finite plurality of sets of transmitter settings includes respective values for a corresponding plurality of different transmitter parameters and wherein each of the plurality of tests includes the processor:
   a) setting the transmitter according to a respective one of the finite plurality of sets of transmitter settings;
   b) transmitting via the out-of-band electrical interface a respective one of the first out-of-band messages to the optical module to tune the optical module for reception of a respective one of the in-band signals on the in-band electrical interface; and
   c) transmitting the respective one of the in-band signals via the transmitter to the optical module, the respective one of the first out-of-band messages including an indication of the respective one of the finite plurality of sets of transmitter settings to test for a current one of the plurality of tests;
  ii) subsequent to performing the plurality of tests, receive via the out-of-band electrical interface one of the second out-of-band messages including an indication of the selected set of transmitter settings; and
  iii) in response to receiving the indication of the selected set of transmitter settings, set the transmitter according to the selected set of transmitter settings, the indication of the selected set of transmitter settings comprising at least one of an index value, a preset, and the selected set of transmitter settings.

2. The host device of claim 1, wherein the processor is configured to test each of the finite plurality of sets of transmitter settings to determine which set of transmitter settings results in a signal integrity value that is greater than signal integrity values exhibited by the other ones of the finite plurality of sets of transmitter settings, each of the signal integrity values being indicative of at least one of signal amplitude, a signal-to-noise ratio, and a bit error rate.

3. The host device of claim 1, wherein the processor is configured to, for each current one of the plurality of tests, transmit via the out-of-band electrical interface a respective one of the first out-of-band messages including at least one of i) an index value indicative of a respective one of the finite plurality of sets of transmitter settings to test for the current one of the plurality of tests, and ii) the respective one of the finite plurality of sets of transmitter settings to test for the current one of the plurality of tests.

4. The host device of claim 3, wherein the processor is configured to receive via the out-of-band electrical interface one of the index values as the indication of the selected set of transmitter settings.

5. The host device of claim 4, wherein the one of the index values is a testing iteration number indicating a number of the one of the plurality of tests associated with the selected set of transmitter settings.

6. The host device of claim 1, wherein the processor is configured, for each of the plurality of tests, to test a respective set of filter parameter values of the transmitter.

7. The host device of claim 1, wherein:
the transmitter comprises a finite impulse response filter; and
the processor is configured, for at least one of the plurality of tests, to test respective pre-cursor values and post cursor values of corresponding taps of the finite impulse response filter.

8. The host device of claim 1, wherein the processor is configured, for at least one of the plurality of tests, to test one or more amplitudes of the transmitter for transmission of a respective one of the in-band signals.

9. The host device of claim 1, wherein the processor is configured, for at least one of the plurality of tests, to test filter parameters of the transmitter for transmission of a respective one of the in-band signals.

10. The host device of claim 1, wherein the processor is configured, for at least one of the plurality of tests, to test a predetermined set of parameters of the transmitter or a custom programmed set of parameters of the transmitter.

11. The host device of claim 1, wherein the processor is configured, for each respective one of the plurality of tests, to transmit via the transmitter a respective one of the first out-of-band messages from the host device to the optical module, the respective one of the first out-of-band messages comprising an index value identifying the set of transmitter settings of the transmitter for the respective one of the plurality of tests being performed.

12. The host device of claim 1, wherein the processor is configured, for each respective one of the plurality of tests, to transmit via the transmitter a respective one of the first out-of-band messages from the host device to the optical module, the respective one of the first out-of-band messages comprising the set of transmitter settings of the transmitter for the respective one of the plurality of tests being performed.

13. The host device of claim 1, wherein the processor is configured i) for each respective one of the plurality of tests, to transmit via the out-of-band electrical interface a respective index value from the host device to the optical module identifying the respective one of the plurality of tests, ii) to receive via the out-of-band electrical interface and at completion of the plurality of tests, the one of the index values identifying the selected set of transmitter settings of the transmitter, and iii) in response to receiving the one of the index values, to adjust one or more parameters of the transmitter according to one or more setting values corresponding to the one of the index values.

14. The host device of claim 1, wherein the processor is configured to i) transmit from the host device to the optical module and via the out-of-band electrical interface a total number of sets of transmitter settings to be tested, and, prior to each of the plurality of tests, an index value for a next one of the plurality of tests to be performed, ii) at completion of testing the total number of sets of transmitter settings, to receive via the out-of-band electrical interface one of the index values for the selected set of transmitter settings, and iii) in response to receiving the one of the index values for the selected set of transmitter settings, to adjust one or more parameters of the transmitter according to one or more setting values associated with the one of the index values.

15. The host device of claim 1, wherein the processor is configured to i) transmit from the host device to the optical module and via the out-of-band electrical interface a total number of sets of transmitter settings to be tested, and, prior to each of the plurality of tests, a testing iteration number for a next one of the plurality of tests to be performed, ii) at completion of testing the total number of sets of transmitter settings, to receive via the out-of-band electrical interface the testing iteration number indicative of the one of the plurality of tests associated with testing the selected set of transmitter settings, and iii) in response to receiving the testing iteration number, to adjust one or more parameters of the transmitter according to one or more setting values associated with the selected set of transmitter settings.

16. The host device of claim 1, further comprising a transceiver, separate from the transmitter, and configured to transmit and receive other in-band signals via another in-band electrical interface from another device cascaded with the host device; and
wherein the out-of-band electrical interface is configured to send and receive out-of-band messages over an out-of-band link between the host device and the another device to train the another in-band electrical interface.

17. The host device of claim 16, wherein the transceiver is configured to perform clock data recovery to detect a frequency of a clock signal embedded in one of the other in-band signals, and to synchronize a clock of the transceiver to the frequency of the clock signal.

18. A communication system comprising:
the host device of claim 1; and
another device cascaded with the host device and comprising a first transceiver and a second transceiver, the first transceiver configured to receive a first in-band data signal via another link, the first in-band data signal comprising data and an embedded clock signal, the second transceiver configured to synchronize with the embedded clock signal and transmit a second in-band data signal to the host device via the link being tested, the second in-band data signal comprising the data and the embedded clock signal,
wherein the another device is configured to perform link training for the another link with the host device via the out-of-band electrical interface or another out-of-band electrical interface.

19. A communication system comprising:
the host device of claim 1; and
another device cascaded with the host device and comprising a first transceiver and a second transceiver, the first transceiver configured to receive a first in-band data signal via the in-band electrical interface, the first in-band data signal comprising data and an embedded clock signal, the second transceiver configured to synchronize with the embedded clock signal and transmit a second in-band data signal via another in-band electrical interface, the second in-band data signal comprising the data and the embedded clock signal,
wherein the another device is configured to perform link training for the another in-band electrical interface with the host device via the out-of-band electrical interface or another out-of-band electrical interface.

20. A communication system comprising:
the host device of claim 1; and
the optical module transmitting data received from the host device via the in-band electrical interface to another optical module via an optical interface.

21. An optical module comprising:
an out-of-band interface configured to receive first out-of-band messages on an out-of-band electrical interface transmitted from a host device to the optical module, and transmit second out-of-band messages from the optical module to the host device on the out-of-band electrical interface, the first out-of-band messages and the second out-of-band messages being control messages for testing a link between the host device and the optical module;
a receiver configured to receive in-band signals on an in-band electrical interface transmitted from the host device to the optical module, the in-band signals being data signals transmitted to test the link; and
a processor configured to:
   i) perform a plurality of tests to test the link and to select a set of transmitter settings for a transmitter of the host device from among a finite plurality of sets of transmitter settings based on a result of the tests, wherein each of the finite plurality of sets of transmitter settings includes values respectively for a plurality of different transmitter parameters, wherein each of the plurality of tests includes the processor:
      a) receiving, via the receiver and on the out-of-band electrical interface, a respective one of the first out-of-band messages from the host device to tune the optical module for reception of a respective one of the in-band signals on the in-band electrical interface; and
      b) receiving the respective one of the in-band signals via the receiver from the host device, the respective one of the first out-of-band messages including an indication of a respective one of the finite plurality of sets of transmitter settings of the host device to test for a current one of the plurality of tests;
   ii) determine the selected set of transmitter settings that provides a signal integrity value greater than other signal integrity values provided respectively by the other ones of the finite plurality of sets of transmitter settings; and
   iii) transmit via the out-of-band electrical interface one of the second out-of-band messages including an indication of the selected set of transmitter settings, the indication of the selected set of transmitter settings comprising at least one of an index value, a preset, and the selected set of transmitter settings, and each of the signal integrity values being indicative of at least one of a signal amplitude, a signal-to-noise ratio, and a bit error rate.

22. The optical module of claim 21, wherein the processor is configured to, for each current one of the plurality of tests, receive a respective one of the first out-of-band messages including at least one of a) an index value identifying a respective one of the finite plurality of sets of transmitter settings of the host device to test for a current one of the plurality of tests, and b) the respective one of the finite plurality of sets of transmitter settings of the host device to test for a current one of the plurality of tests.

23. The optical module of claim 22, wherein the processor is configured to transmit via the out-of-band electrical interface the one of the index values of the one of the plurality of tests providing the signal integrity value greater than the other signal integrity values.

24. The optical module of claim 23, wherein the one of the index values is a testing iteration number indicating a number of the one of the plurality of tests providing the signal integrity value greater than the other signal integrity values.

25. The optical module of claim 21, further comprising:
a transmitter element configured to convert an electrical signal, received from the in-band electrical interface via the receiver, to an optical signal and to transmit the optical signal, the receiver of the optical module being tuned to the selected set of transmitter settings of the transmitter of the host device during reception of the electrical signal; and
a receiver element configured to receive another optical signal and to convert the another optical signal to another electrical signal for transmission to the host device via the in-band electrical interface.

26. The optical module of claim 21, wherein the processor is configured, for each respective one of the plurality of tests, to receive via the receiver a respective one of the first out-of-band messages from the host device, the respective one of the first out-of-band messages comprising an index value identifying the transmitter setting of the transmitter for the respective one of the plurality of tests being performed.

27. The optical module of claim 21, wherein the processor is configured, for each respective one of the plurality of tests, to receive via the receiver a respective one of the first out-of-band messages from the host device, the respective one of the first out-of-band messages comprising the set of transmitter settings of the transmitter for the respective one of the plurality of tests being performed.

28. The optical module of claim 21, wherein the processor is configured i) for each respective one of the plurality of tests, to receive a respective index value from the host device identifying the respective one of the plurality of tests, and ii) to transmit, at completion of the plurality of tests via the out-of-band interface, the one of the index values identifying the transmitter setting of the transmitter of the host device for the one of the plurality of tests providing the signal integrity value greater than the other signal integrity values.

29. The optical module of claim 21, wherein the processor is configured to i) receive from the host device and via the receiver a total number of sets of transmitter settings of the host device to be tested, and, prior to each of the plurality of tests, an index value for a next one of the plurality of tests to be performed, and ii) at completion of testing the total number of sets of transmitter settings, to transmit via the out-of-band electrical interface the one of the index values for the selected set of transmitter settings.

30. The optical module of claim 21, wherein the processor is configured to i) receive from the host device and via the receiver a total number of sets of transmitter settings of the host device to be tested, and, prior to each of the plurality of tests, a test iteration number for a next one of the plurality of tests to be performed, and ii) at completion of testing the total number of sets of transmitter settings, to transmit via the out-of-band electrical interface the testing iteration number indicative of the one of the plurality of tests associated with testing the selected set of transmitter settings.

31. A host device comprising:
an out-of-band interface configured to transmit a plurality of out-of-band messages on an out-of-band electrical interface from the host device to an optical module, the plurality of out-of-band messages being control messages for testing a link between the host device and the optical module;
a receiver configured to receive a plurality of in-band signals on an in-band electrical interface from the host device, the in-band signals being data signals transmitted to test the link; and
a processor configured to
  i) perform a plurality of tests to test the link and select a set of transmitter settings for a transmitter of the optical module from among a finite plurality of sets of transmitter settings based on results of the plurality of tests, wherein each of the finite plurality of sets of transmitter settings includes values respectively for a plurality of different transmitter parameters, wherein each of the plurality of tests includes the processor:
    a) selecting a respective one of the finite plurality of sets of transmitter settings to test and transmitting, via the out-of-band electrical interface, a respective one of the plurality of out-of-band messages to the optical module to set the transmitter of the optical module for transmission of a respective one of the plurality of in-band signals on the in-band electrical interface, the respective one of the plurality of out-of-band messages including an indication identifying the respective one of the finite plurality of sets of transmitter settings for a current one of the plurality of tests;
    b) receiving via the receiver the one of the plurality of in-band signals; and
    c) determining a signal integrity value of the one of the plurality of in-band signals;
  ii) based on the signal integrity values of the plurality of tests, to determine the selected set of transmitter settings providing a signal integrity value greater than other signal integrity values provided respectively by the other ones of the finite plurality of sets of transmitter settings, each of the signal integrity values being indicative of at least one of a signal amplitude, a signal-to-noise ratio, and a bit error rate; and
  iii) signaling the optical module via the out-of-band electrical interface to set the transmitter of the optical module to the selected set of transmitter settings.

32. The host device of claim 31, wherein the processor is configured, for each current one of the plurality of tests, to transmit the respective one of the out-of-band messages including at least one of a) an index value identifying a respective one of the finite plurality of sets of transmitter settings to test for the current one of the plurality of tests, and b) the respective one of the finite plurality of sets of transmitter settings to test for the current one of the plurality of tests.

33. The host device of claim 31, wherein the processor is configured, for each of the plurality of tests, to tune the receiver to receive a respective one of the plurality of in-band signals, and determine the signal integrity value of the respective one of the plurality of in-band signals.

34. The host device of claim 31, wherein the processor is configured, subsequent to determining the selected set of transmitter settings, to send one of the plurality of out-of-band messages to the optical module to set the transmitter of the optical module according to the selected set of transmitter settings.

35. An optical module comprising:
an out-of-band electrical interface configured to receive a plurality of out-of-band messages transmitted from a host device to the optical module, the plurality of out-of-band messages being control messages for testing a link between the host device and the optical module;
a transmitter configured to transmit a plurality of in-band signals on an in-band electrical interface to the host device, the in-band signals being data signals transmitted to test the link; and
a processor configured to:
  i) to perform a plurality of tests to the link and select a set of transmitter settings from among a finite plurality of sets of transmitter settings for the transmitter based on results of the plurality of tests, wherein each of the finite plurality of sets of transmitter settings includes values respectively for a plurality of different transmitter parameters, wherein each of the plurality of tests includes the processor:
    a) receiving, via the out-of-band electrical interface, one of the plurality of out-of-band messages from the host device to set the transmitter for transmission of one of the plurality of in-band signals on the in-band electrical interface, the one of the out-of-band messages including an indication of a respective one of the finite plurality of sets of transmitter settings to test for a current one of the plurality of tests;
    b) transmitting via the transmitter the one of the plurality of in-band signals; and
    c) determining a signal integrity value of the one of the plurality of in-band signals;
  ii) based on the signal integrity values of the plurality of tests, to determine the selected set of transmitter settings provides a signal integrity value greater than other signal integrity values provided respectively by the other ones of the sets of transmitter settings of the transmitter, each of the signal integrity values being indicative of at least one of a signal amplitude, a signal-to-noise ratio, and a bit error rate; and
  iii) setting the transmitter to the selected set of transmitter setting.

36. The optical module of claim 35, wherein the processor is configured to, for each current one of the plurality of tests, receive a respective one of the out-of-band messages including at least one of a) an index value identifying a respective one of the finite plurality of sets of transmitter settings to test for the current one of the plurality of tests, and b) the respective one of the finite plurality of sets of transmitter settings to test for the current one of the plurality of tests.

37. The optical module of claim 35, further comprising:
a transmitter element configured to convert an electrical signal, received from the in-band electrical interface via the receiver, to an optical signal and to transmit the optical signal, the receiver of the optical module being tuned to the selected set of transmitter settings of the transmitter of the host device during reception of the electrical signal; and
a receiver element configured to receive another optical signal and to convert the another optical signal to another electrical signal for transmission to the host device via the in-band electrical interface.

38. The optical module of claim 35, wherein the processor is configured, for each of the plurality of tests, to test a respective set of transmitter parameters of the transmitter.

39. The optical module of claim 35, wherein the processor is configured, for at least one of the plurality of tests, to test at least one of an amplitude and a filter parameter of the transmitter.

40. The optical module of claim 35, wherein the processor is configured, for at least one of the plurality of tests, to test at least one of a predetermined set of transmitter settings and a custom programmed set of transmitter settings.

41. The optical module of claim 35, wherein:
the transmitter comprises a finite impulse response filter; and
the processor is configured, for each of the plurality of tests, to test respective pre-cursor values and post cursor values of corresponding taps of the finite impulse response filter.

42. The optical module of claim 35, wherein the processor is configured, for each of the plurality of tests, to test one or more amplitudes of the transmitter.

43. The optical module of claim 35, wherein the processor is configured, for each respective one of the plurality of tests, to receive via the out-of-band electrical interface a respective out-of-band message from the host device, the respective out-of-band message comprising an index value identifying the set of transmitter settings of the transmitter of the optical module for the respective one of the plurality of tests being performed.

44. The optical module of claim 35, wherein the processor is configured, for each respective one of the plurality of tests, to receive via the out-of-band electrical interface a respective out-of-band message from the host device, the respective out-of-band message comprising the set of transmitter settings of the transmitter of the optical module for the respective one of the plurality of tests being performed.

* * * * *